(12) United States Patent
Yamashita

(10) Patent No.: US 10,958,809 B2
(45) Date of Patent: Mar. 23, 2021

(54) METHOD FOR GENERATING COLOR CONVERSION INFORMATION, COLOR CONVERSION INFORMATION GENERATION PROGRAM, AND COLOR CONVERSION INFORMATION GENERATION DEVICE

(71) Applicant: SEIKO EPSON CORPORATION, Tokyo (JP)

(72) Inventor: Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/856,088

(22) Filed: Apr. 23, 2020

(65) Prior Publication Data

US 2020/0344383 A1 Oct. 29, 2020

(30) Foreign Application Priority Data

Apr. 25, 2019 (JP) .............................. JP2019-083984

(51) Int. Cl.
*H04N 1/60* (2006.01)
(52) U.S. Cl.
CPC ......... *H04N 1/6022* (2013.01); *H04N 1/6008* (2013.01); *H04N 1/6027* (2013.01)
(58) Field of Classification Search
None
See application file for complete search history.

(56) References Cited

U.S. PATENT DOCUMENTS

| | | | |
|---|---|---|---|
| 2005/0190390 A1* | 9/2005 | Yamada | H04N 1/6058 358/1.9 |
| 2015/0098098 A1* | 4/2015 | Nagai | H04N 1/6066 358/1.9 |
| 2017/0272611 A1* | 9/2017 | Sagimori | H04N 1/6027 |
| 2018/0152603 A1* | 5/2018 | Seko | H04N 1/6058 |
| 2019/0109963 A1* | 4/2019 | Ito | H04N 1/60 |

FOREIGN PATENT DOCUMENTS

JP 2007-116465 A 5/2007

* cited by examiner

*Primary Examiner* — Dung D Tran
(74) *Attorney, Agent, or Firm* — Global IP Counselors, LLP

(57) ABSTRACT

A color conversion information generation device generates one or a plurality of intermediate points located on a first line segment connecting a first coordinate value representing a first color in a first color space and a second coordinate value representing a second color, in such a way that a number of intermediate points included in each of a plurality of reference spaces corresponding to a plurality of reference points is one or fewer. The color conversion information generation device generates modified conversion information in such a way that, when a coordinate value on the first line segment is converted into a coordinate value in a second color space by the modified conversion information, the coordinate value resulting from the conversion reflects one of a first adjustment value, a second adjustment value, and a third adjustment value. The color conversion information generation device generates color conversion information for converting a fourth coordinate value on the first line segment generated based on an operation by a user, into a coordinate value in the second color space, based on the modified conversion information.

9 Claims, 27 Drawing Sheets

| C | M | Y | K | L | a | b |
|---|---|---|---|---|---|---|
| $C_1$ | $M_1$ | $Y_1$ | $K_1$ | $L_1$ | $a_1$ | $b_1$ |
| ... | ... | ... | ... | ... | ... | ... |
| $C_{N1}$ | $M_{N1}$ | $Y_{N1}$ | $K_{N1}$ | $L_{N1}$ | $a_{N1}$ | $b_{N1}$ |

| L | a | b | c | m | y | k |
|---|---|---|---|---|---|---|
| $L_1$ | $a_1$ | $b_1$ | $c_1$ | $m_1$ | $y_1$ | $k_1$ |
| ... | ... | ... | ... | ... | ... | ... |
| $L_{N2}$ | $a_{N2}$ | $b_{N2}$ | $c_{N2}$ | $m_{N2}$ | $y_{N2}$ | $k_{N2}$ |

| c | m | y | k | L | a | b |
|---|---|---|---|---|---|---|
| $c_1$ | $m_1$ | $y_1$ | $k_1$ | $L_1$ | $a_1$ | $b_1$ |
| ... | ... | ... | ... | ... | ... | ... |
| $c_{N3}$ | $m_{N3}$ | $y_{N3}$ | $k_{N3}$ | $L_{N3}$ | $a_{N3}$ | $b_{N3}$ |

*FIG. 11*

|   | L | a | b | c | m | y | k |   |
|---|---|---|---|---|---|---|---|---|
| SP_Lab1 → | SP_L$_1$ | SP_a$_1$ | SP_b$_1$ | SP_c$_1$ | SP_m$_1$ | SP_y$_1$ | SP_k$_1$ | ← pcmyk_SP1 |
| SP_Lab2 → | SP_L$_2$ | SP_a$_2$ | SP_b$_2$ | SP_c$_2$ | SP_m$_2$ | SP_y$_2$ | SP_k$_2$ | ← pcmyk_SP2 |
| R_Lab1 → | R_L$_1$ | R_a$_1$ | R_b$_1$ | R_c$_1$ | R_m$_1$ | R_y$_1$ | R_k$_1$ | ← pcmyk_R1 |
| R_Lab2 → | R_L$_2$ | R_a$_2$ | R_b$_2$ | R_c$_2$ | R_m$_2$ | R_y$_2$ | R_k$_2$ | ← pcmyk_R2 |
| R_Lab3 → | R_L$_3$ | R_a$_3$ | R_b$_3$ | R_c$_3$ | R_m$_3$ | R_y$_3$ | R_k$_3$ | ← pcmyk_R3 |

| c0 | m0 | y0 | k0 | c1 | m1 | y1 | k1 |
|---|---|---|---|---|---|---|---|
| $c0_1$ | $m0_1$ | $y0_1$ | $k0_1$ | $c1_1$ | $m1_1$ | $y1_1$ | $k1_1$ |
| ... | ... | ... | ... | ... | ... | ... | ... |
| $c0_i$ | $m0_i$ | $y0_i$ | $k0_i$ | $c1_i$ | $m1_i$ | $y1_i$ | $k1_i$ |
| ... | ... | ... | ... | ... | ... | ... | ... |
| $c0_{N5}$ | $m0_{N5}$ | $y0_{N5}$ | $k0_{N5}$ | $c1_{N5}$ | $m1_{N5}$ | $y1_{N5}$ | $k1_{N5}$ | cmyk0 · cmyk1

| c | m | y | k | L | a | b |
|---|---|---|---|---|---|---|
| $c_1$ | $m_1$ | $y_1$ | $k_1$ | $L_1$ | $a_1$ | $b_1$ |
| ... | ... | ... | ... | ... | ... | ... |
| $c_{N6}$ | $m_{N6}$ | $y_{N6}$ | $k_{N6}$ | $L_{N6}$ | $a_{N6}$ | $b_{N6}$ |

$\underbrace{\qquad\qquad}_{ccmyk}$ $\underbrace{\qquad\qquad}_{cLab_{ECL\_P}}$

| L | a | b | ΔL | Δa | Δb |
|---|---|---|---|---|---|
| $L_1$ | $a_1$ | $b_1$ | $(\Delta L_{T-P})_1$ | $(\Delta a_{T-P})_1$ | $(\Delta b_{T-P})_1$ |
| ... | ... | ... | ... | ... | ... |
| $L_j$ | $a_j$ | $b_j$ | $(\Delta L_{T-P})_j$ | $(\Delta a_{T-P})_j$ | $(\Delta b_{T-P})_j$ |
| ... | ... | ... | ... | ... | ... |
| $L_{N7}$ | $a_{N7}$ | $b_{N7}$ | $(\Delta L_{T-P})_{N7}$ | $(\Delta a_{T-P})_{N7}$ | $(\Delta b_{T-P})_{N7}$ |

$\underbrace{\qquad}_{cLab_P}$ $\underbrace{\qquad\qquad}_{\Delta cLab_{T-P}}$

METHOD FOR GENERATING COLOR CONVERSION INFORMATION, COLOR CONVERSION INFORMATION GENERATION PROGRAM, AND COLOR CONVERSION INFORMATION GENERATION DEVICE

The present application is based on, and claims priority from JP Application Serial Number 2019-083984, filed Apr. 25, 2019, the disclosure of which is hereby incorporated by reference herein in its entirety.

BACKGROUND

1. Technical Field

The present disclosure relates to a method for generating color conversion information, a color conversion information generation program, and a color conversion information generation device.

2. Related Art

According to the related art, a technique of printing taking characteristics of a printer into account is known. For example, JP-A-2007-116465 discloses a technique of printing taking characteristics of a printer into account when printing a color-gradient image successively changing in color according to the position from one end of the image to the other end. Specifically, this technique converts a coordinate value in a space representing an arbitrary color displayed at an end of the image into a coordinate value in a space representing a color that can be reproduced by the printer, and thus executes printing taking characteristics of the printer into account. In the description below, for the sake of convenience of the description, a space representing an arbitrary color is referred to as a "device-independent color space". A color prescribed as a coordinate value in the device-independent color space is referred to a "device-independent color". A space representing a color that can be reproduced by the printer is referred to as a "device-dependent color space". A color prescribed as a coordinate value in the device-dependent color space is referred to as a "device-dependent color". Information for converting a device-independent color into a device-dependent color is referred to as "conversion information".

However, in the related-art technique, when the printer outputs a color-gradient image, conversion information is adjusted in order to accurately convert device-independent color from a coordinate value in the device-independent color space into a coordinate value in the device-dependent color space. The adjustment causes a problem in that the accuracy of a color reproduction range that can be expressed by the printer drops and therefore the color reproduction accuracy of the device-dependent color drops.

SUMMARY

A method for generating color conversion information according to an aspect of the present disclosure includes causing a computer to execute: an acceptance step of accepting first information prescribing a first color in a first color space and second information prescribing a second color in the first color space; a first generation step of generating one or a plurality of intermediate points located on a first line segment connecting a first coordinate value representing the first color in the first color space and a second coordinate value representing the second color in the first color space, based on a plurality of reference points arranged in a grid-like form in the first color space; a first conversion step of converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information; a setting step of setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value; a specification step of specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value; a second generation step of generating modified conversion information for converting a coordinate value in the first color space into a coordinate value in the second color space, based on the first conversion information; a third generation step of generating a fourth coordinate value located on the first line segment, based on an operation by a user; and a fourth generation step of generating color conversion information for converting the first information into a fifth coordinate value in the second color space, converting the second information into a sixth coordinate value in the second color space, and converting information about the fourth coordinate value into a seventh coordinate value in the second color space, based on the modified conversion information. The first generation step includes generating one or a plurality of the intermediate points in such a way that a number of the intermediate points corresponding to the plurality of reference points is one or fewer. The second generation step includes generating the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

A non-transitory computer-readable storage medium according to another aspect of the present disclosure stores a color conversion information generation program. The program causes a computer to function as: an acceptance unit accepting first information prescribing a first color in a first color space and second information prescribing a second color in the first color space; a first generation unit generating one or a plurality of intermediate points located on a first line segment connecting a first coordinate value representing the first color in the first color space and a second coordinate value representing the second color in the first color space, based on a plurality of reference points arranged in a grid-like form in the first color space; a first conversion unit converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information; a setting unit setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value; a specification unit specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value; a second generation unit generating modified conversion information for converting a coordinate value in the first color space into a coordinate value in the second color space, based on the first conversion information; a third generation unit generating a fourth coordinate value located on the first line segment, based on an operation by a user; and a fourth generation unit generating color conversion information for converting the first information into a fifth coordinate value in the second color space, converting the second information into a sixth coordinate value in the second color space, and converting information about the fourth coordinate value into a seventh coordinate value in the second color space, based on the modified conversion information. The first generation unit generates one or a plurality of the intermediate points in such a way that a number of the intermediate points corresponding to the plurality of reference points is one or fewer. The second generation unit generates the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

A color conversion information generation device according to still another aspect of the present disclosure includes: an acceptance unit accepting first information prescribing a first color in a first color space and second information prescribing a second color in the first color space; a first generation unit generating one or a plurality of intermediate points located on a first line segment connecting a first coordinate value representing the first color in the first color space and a second coordinate value representing the second color in the first color space, based on a plurality of reference points arranged in a grid-like form in the first color space; a first conversion unit converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information; a setting unit setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value; a specification unit specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value; a second generation unit generating modified conversion information for converting a coordinate value in the first color space into a coordinate value in the second color space, based on the first conversion information; a third generation unit generating a fourth coordinate value located on the first line segment, based on an operation by a user; and a fourth generation unit generating color conversion information for converting the first information into a fifth coordinate value in the second color space, converting the second information into a sixth coordinate value in the second color space, and converting information about the fourth coordinate value into a seventh coordinate value in the second color space, based on the modified conversion information. The first generation unit generates one or a plurality of the intermediate points in such a way that a number of the intermediate points corresponding to the plurality of reference points is one or fewer. The second generation unit generates the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

BRIEF DESCRIPTION OF THE DRAWINGS

FIG. 2 shows an A2B table 1211.
FIG. 3 shows a B2A table 1212.
FIG. 4 shows an A2B table 1221.
FIG. 11 shows the color conversion table 126.

FIG. 23 shows the configuration of a color conversion table generation system 1a.

FIG. 24 shows a calibration DLP 127.

FIG. 26 shows an example of a second printer characteristic A2B table 1276.

FIG. 27 shows an example of color measurement result difference table 1274.

DESCRIPTION OF EXEMPLARY EMBODIMENTS

Embodiments of the present disclosure will now be described with reference to the drawings. In each drawing, the dimension and scale of each component are changed from reality according to need. The embodiments described below are suitable specific examples of the present disclosure and therefore include various technically preferably limitations. However, the scope of the present disclosure is not limited to these embodiments unless it is stated in the description below that the present disclosure is limited in any particular way.

A. First Embodiment

First, a color conversion table generation system 1 according to a first embodiment is described.

A.1. Outline of Color Conversion Table Generation System 1

Figure 1:
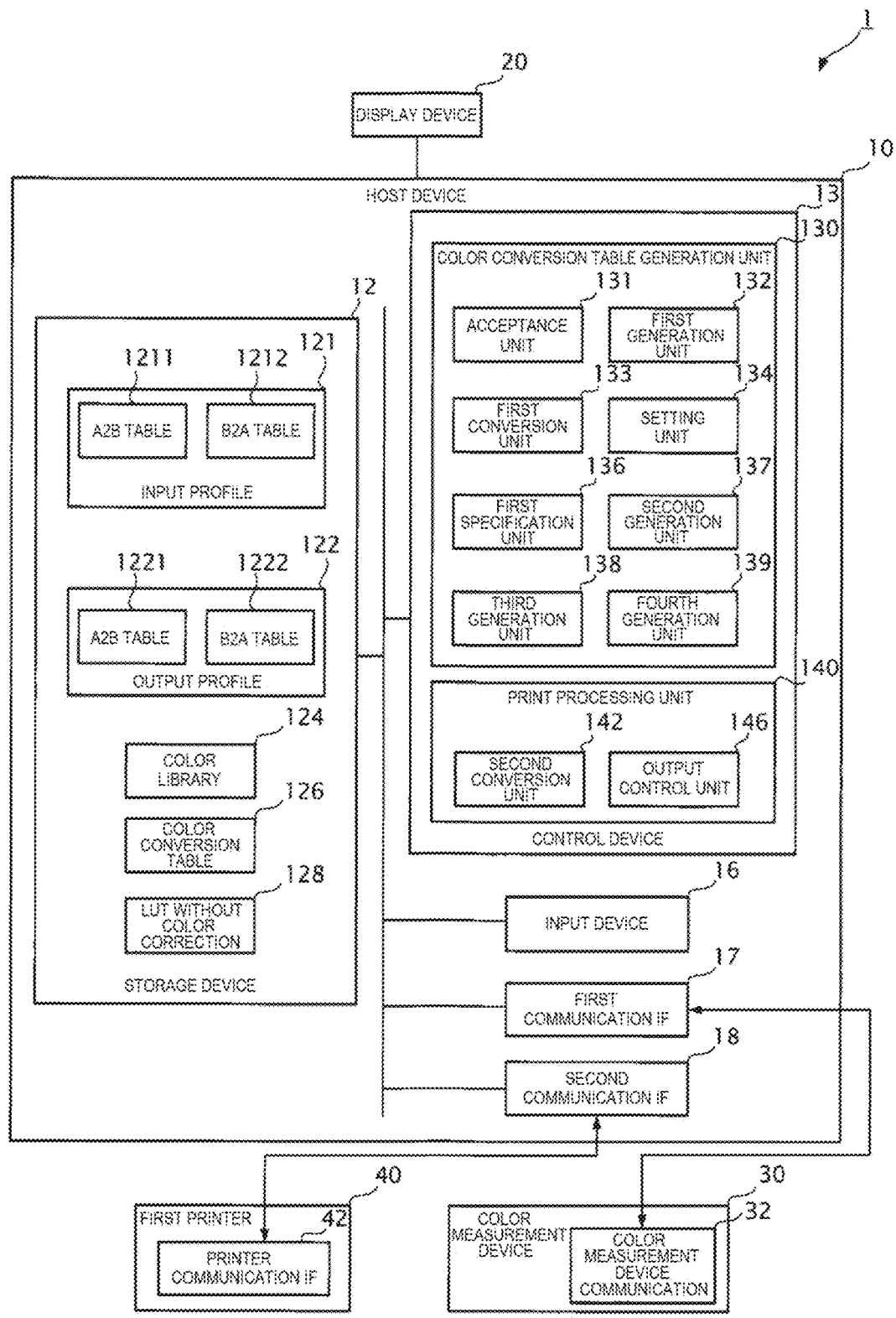
FIG. 1 shows the configuration of a color conversion table generation system 1.

FIG. 1 shows the configuration of the color conversion table generation system 1. The color conversion table generation system 1 includes a host device 10, a display device 20, a color measurement device 30, and a first printer 40. The host device 10 is an example of the "color conversion information generation device". The first printer 40 is an example of the "first output device". The host device 10 can access the display device 20, the color measurement device 30, and the first printer 40.

The host device 10 is a computer controlling the display device 20, the color measurement device 30, and the first printer 40, and thus generating a color conversion table 126.

The display device 20 displays various images under the control of the host device 10. Various display panels such as liquid crystal panel or organic EL display panel are suitably used as the display device 20. EL is an abbreviation for electroluminescence.

The first printer 40 is an inkjet printer ejecting ink to form an image on a medium according to an instruction from the host device 10. The medium is a recording sheet such as plain paper, photograph, or postcard. The ink has four colors, that is, cyan, magenta, yellow, and black. However, the ink is not limited to these four colors. For example, the first printer 40 may use ink of light cyan, light magenta, dark yellow, or light black or the like. The first printer 40 in the first embodiment uses the ink of the four colors of cyan, magenta, yellow, and black.

The color measurement device 30 measures the color of an image displayed on the medium by the first printer 40 and outputs a measured color value, which is the value of the measured color. The color measurement device 30 outputs a measured color value in a device-independent color space. The device-independent color space is an example of the "first color space".

Figure 7:
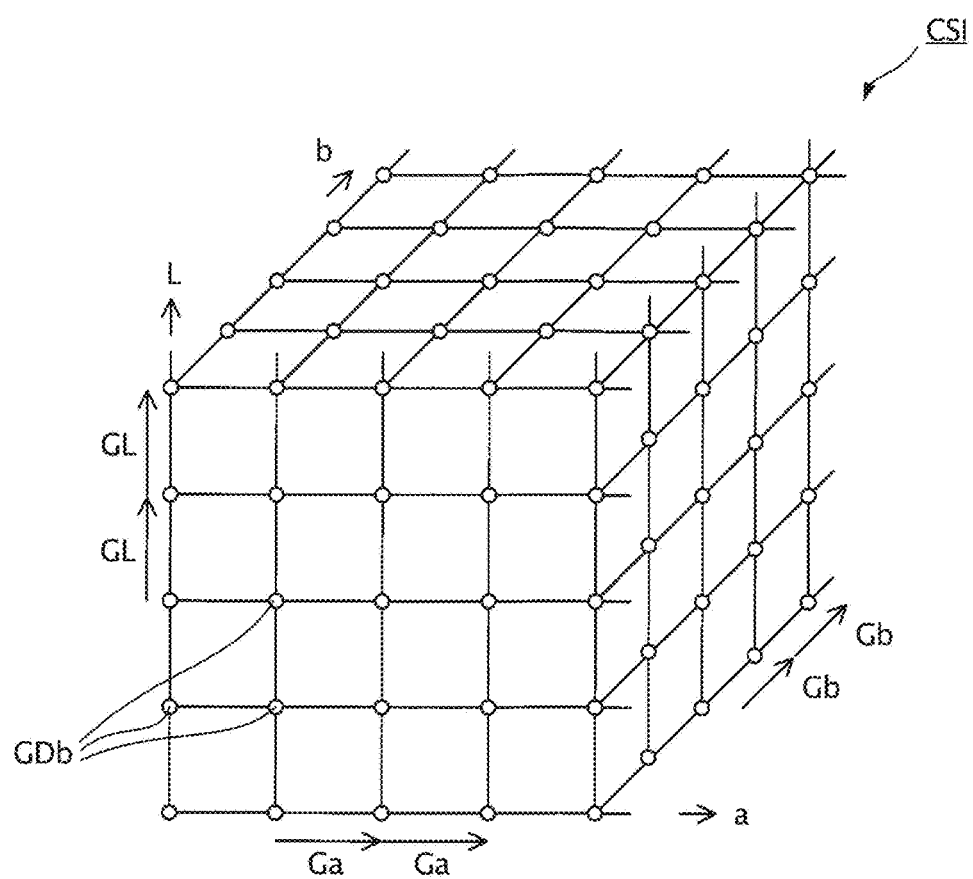
FIG. 7 shows a Lab color space CSI.

The device-independent color space is, for example, a CIE L*a*b* color space or CIE XYZ color space. CIE is an abbreviation for Commission internationale de l'eclairage. In the description below, it is assumed that the device-independent color space is a CIE L*a*b* color space, and the CIE L*a*b* color space is simply referred to as a Lab color space CSI as shown in FIG. 7. Similarly, a coordinate value in the Lab color space CSI is referred to as a "Lab value".

An input device 16 is a device for a user to input information. The input device 16 is configured of, for example, one or more types of devices such as pointing device, keyboard, and touch panel attached to a surface of the display device 20.

A first communication IF 17 is a device communicating with a color measurement device communication IF 32 of the color measurement device 30. A second communication IF 18 is a device communicating with a first printer communication IF 42 of the first printer 40. The first communication IF 17, the second communication IF 18, the color measurement device communication IF 32, and the first printer communication IF 42 are also referred to, for example, as a network device, network controller, network card, or communication module. As the standard for the first communication IF 17, the second communication IF 18, the color measurement device communication IF 32, and the first printer communication IF 42, USB or a short-range wireless communication standard or the like can be used. USB is an abbreviation for Universal Serial Bus. The communication via the first communication IF 17, the second communication IF 18, the color measurement device communication IF 32, and the first printer communication IF 42 may be wired or wireless. This communication may also be network communication via a LAN or the internet or the like. LAN is an abbreviation for local area network.

The host device 10 includes a storage device 12, a control device 13, the input device 16, the first communication IF 17, and the second communication IF 18. IF is an abbreviation for interface. The color measurement device 30 includes the color measurement device communication IF 32. The first printer 40 includes the first printer communication IF 42.

The storage device 12 is a recording medium readable by the control device 13. The storage device 12 stores a plurality of programs, various data used by the control device 13, an input profile 121, an output profile 122, a color library 124, the color conversion table 126, and a LUT without color correction 128. LUT is an abbreviation for lookup table. The storage device 12 is formed of one or more types of storage circuits such as ROM, EPROM, EEPROM, RAM, HDD, and SSD. ROM is an abbreviation for read-only memory. EPROM is an abbreviation for erasable programmable ROM. EEPROM is an abbreviation for electrically erasable programmable ROM. RAM is an abbreviation for random-access memory. HDD is an abbreviation for hard disk drive. SSD is an abbreviation for solid-state drive.

The input profile 121 is a file defining a color space. The output profile 122 is a file representing an output characteristic of the first printer 40. The color space includes the device-independent color space and the device-dependent color space. The device-dependent color space includes a CMYK color space for representing a color of a combination of cyan, magenta, yellow, and black, a CMY color space for representing a color of a combination of cyan, magenta, and yellow, and an RGB color space for a combination of red, greed, and blue, or the like.

In the description below, what is simply referred to as the profile is a general term for the input profile 121 and the output profile 122.

The device-dependent color space includes the CMYK color space, the CMY color space, and the RGB color space or the like, as described above. For example, the input profile 121 may have color conversion tables for the CMYK color space, the CMY color space, and the RGB color space, respectively. The output profile 122 may have color conversion tables for the CMYK color space, the CMY color space, and the RGB color space, respectively. However, in the first embodiment, in order to simplify the description, the input profile 121 and the output profile 122 have only a color conversion table for the CMYK color space of the device-dependent color space.

The input profile 121 has an A2B table 1211 and a B2A table 1212, as color conversion tables. The output profile 122 has an A2B table 1221 and a B2A table 1222, as color conversion tables. The input profile 121 may have other tables used for color conversion instead of the A2B table 1211 and the B2A table 1212. However, in the first embodiment, it is assumed that the input profile 121 has the A2B table 1211 and the B2A table 1212. The A2B table 1211, the B2A table 1212, the A2B table 1221, and the B2A table 1222 will now be described.

FIG. 2 shows the A2B table 1211. In the description below, the color space when image information included in a print command generated in response to an operation by the user represents a color of a combination of cyan, magenta, yellow, and black, is referred to as a "CMYK color space" with capital letters. The A2B table 1211 is used to convert a coordinate value in the CMYK color space into a Lab value in the Lab color space CSI. The coordinate value in the CMYK color space is referred to as a "CMYK value". The A2B table 1211 shows the CMYK value and the Lab value at N1 grid point(s) in the CMYK color space. N1 is an integer equal to or greater than 1.

The CMYK color space has a C-axis, an M-axis, a Y-axis, and a K-axis. The CMYK value is a coordinate value representing a process color. The CMYK value has a C-value, an M-value, a Y-value, and a K-value. The C-value, the M-value, the Y-value, and the K-value are real numbers equal to or greater than 0 and equal to or smaller than 100.

The Lab color space CSI has an L-axis, an a-axis, and a b-axis. The Lab value has an L-value, an a-value, and a b-value.

There are two types of color included in the image information included in the print command, that is, process color and spot color. The process color is a color expressed by a combination of the four colors of ink, that is, cyan, magenta, yellow, and black. The spot color is a color of ink prepared in advance. The spot color is, for example, a color prescribed in the PANTONE color sample book and a color prescribed in the DIC color sample book, or the like. PANTONE and DIC are registered trademarks.

FIG. 3 shows the B2A table 1212. The B2A table 1212 is used to convert a Lab value in the Lab color space CSI into a coordinate value in a cmyk color space CSD shown in FIG. 5. The coordinate value in the cmyk color space CSD is referred to as a "cmyk value". The color space representing a color of a combination of cyan, magenta, yellow, and black inputted to the first printer 40 is referred to as a cmyk color space with small letters in order to be distinguished from the CMYK color space in the image information included in the print command. Also, in order to facilitate understanding, the space for representing a color dependent on the first printer 40 is expressed as the cmyk color space CSD. The cmyk color space CSD is an example of the "second color space".

The cmyk value has a c-value, a y-value, an m-value, and a k-value. The c-value, the y-value, them-value, and the k-value are real numbers equal to or greater than 0 and equal to or smaller than 100. The B2A table 1212 shows a cmyk value at N2 grid point(s) in the Lab color space CSI. N2 is an integer equal to or greater than 1.

FIG. 4 shows the A2B table 1221. The A2B table 1221 is used to convert a cmyk value in the cmyk color space CSD into a Lab value in the Lab color space CSI. The A2B table 1221 is an example of the "second conversion information".

The A2B table 1221 is a table storing a Lab value that can be reproduced over the entire range of the cmyk values in the cmyk color space CSD dependent on the first printer 40.

Figures 5, 6:
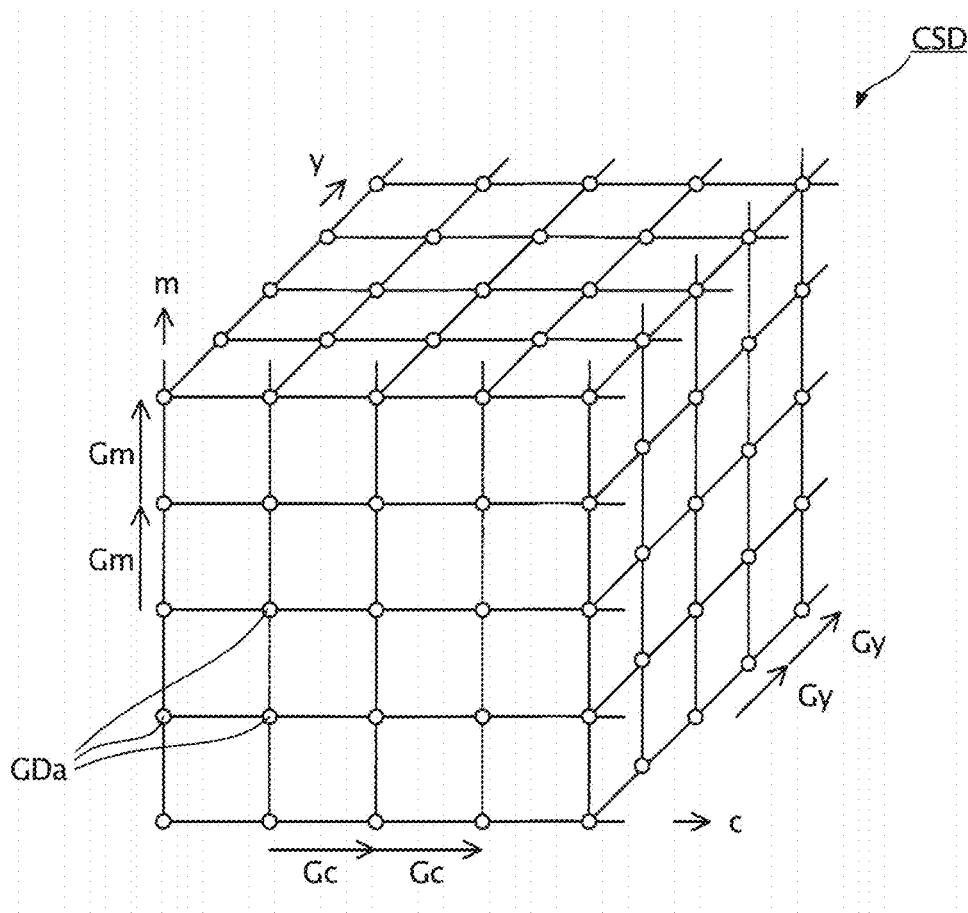
FIG. 5 shows a cmyk color space CSD.
FIG. 6 shows a B2A table 1222.

FIG. 5 shows the cmyk color space CSD. The cmyk color space CSD is a four-dimensional space having a c-axis, an m-axis, a y-axis, and a k-axis. To simplify the illustration, FIG. 5 shows the cmyk color space CSD as a three-dimensional space having a c-axis, an m-axis, and a y-axis. The A2B table 1221 shows a Lab value at N3 grid point(s) GDa in the cmyk color space CSD. N3 is an integer equal to or greater than 1. The blank circles shown in FIG. 5 are grid points GDa. In FIG. 5, only some grid points GDa as representatives of the plurality of grid points GDa are given a reference sign in order to restrain the complexity of the illustration. The grid points GDa are arranged with an equal space along the c-axis, the m-axis, the y-axis, and the k-axis in the cmyk color space CSD. More specifically, the grid points GDa are spaced apart with a space Gc along the c-axis, with a space Gm along the m-axis, with a space Gy along the y-axis, and with a space Gk, not illustrated, along the k-axis.

FIG. 6 shows the B2A table 1222. The B2A table 1222 is used to convert a Lab value in the Lab color space CSI into a cmyk value in the cmyk color space CSD. To store a cmyk value that can be reproduced by the first printer 40 over the entire range of Lab into the B2A table 1222, a cmyk value taking gamut mapping into account is stored with respect to a Lab value that cannot be reproduced by the first printer 40. The gamut is a range of color reproduction that can be expressed by a device. The B2A table 1222 is an example of the "first conversion information".

FIG. 7 shows the Lab color space CSI. Each record in the B2A table 1222 represent cmyk values at N4 grid points GDb in the Lab color space CSI. N4 is an integer equal to or greater than 8. The blank circles shown in FIG. 7 are grid points GDb. In FIG. 7, only some grid points as representatives of the plurality of grid points GDb are given a reference sign in order to restrain the complexity of the illustration. The grid points GDb are arranged with an equal space along the L-axis, the a-axis, and the b-axis in the Lab color space CSI. More specifically, the grid points GDb are spaced apart with a space GL along the L-axis, with a space Ga along the a-axis, and with a space Gb along the b-axis. The L-axis, the a-axis, and the b-axis intersect each other and are preferably orthogonal to each other. Hereinafter, in order to simplify the description, the L-axis, the a-axis, and the b-axis are assumed to be orthogonal to each other.

The N4 grid points GDb are arranged in a grid-like form in the Lab color space CSI. The N4 grid points GDb are equivalent to the "plurality of reference points".

As shown in FIGS. 4 and 6, the output profile 122 has the A2B table 1221 used for color conversion from a cmyk value into a Lab value and the B2A table 1222 used for color conversion from a Lab value into a cmyk value. The B2A table 1222 is a three-dimensional table resulting from gamut mapping. The A2B table 1221 is a four-dimensional table showing a correspondence between a cmyk value expressing a color that can be outputted and a Lab value. Therefore, when a Lab value is converted into a cmyk value via the B2A table 1222 and the resulting cmyk value is converted into a Lab value via the A2B table 1221, the resulting Lab value may not be the same as the original Lab value. In the description below, the processing of converting a Lab value into a cmyk value via the B2A table 1222 and converting the resulting cmyk value into a Lab value via the A2B table 1221 is, in some cases, referred to as "round-trip calculation". Executing round-trip calculation can provide a Lab value simulating printing by the first printer 40.

Back to FIG. 1, the color library 124 is used to convert the name of a spot color into the Lab value of the spot color. Hereinafter, in order to simplify the description, the name of a spot color is referred to as a "spot color name". The spot color name represents the color expressed by the Lab value. The spot color name is, for example, "Pantone P 41-8C" and "Pantone P 97-8C" or the like.

Figure 9:
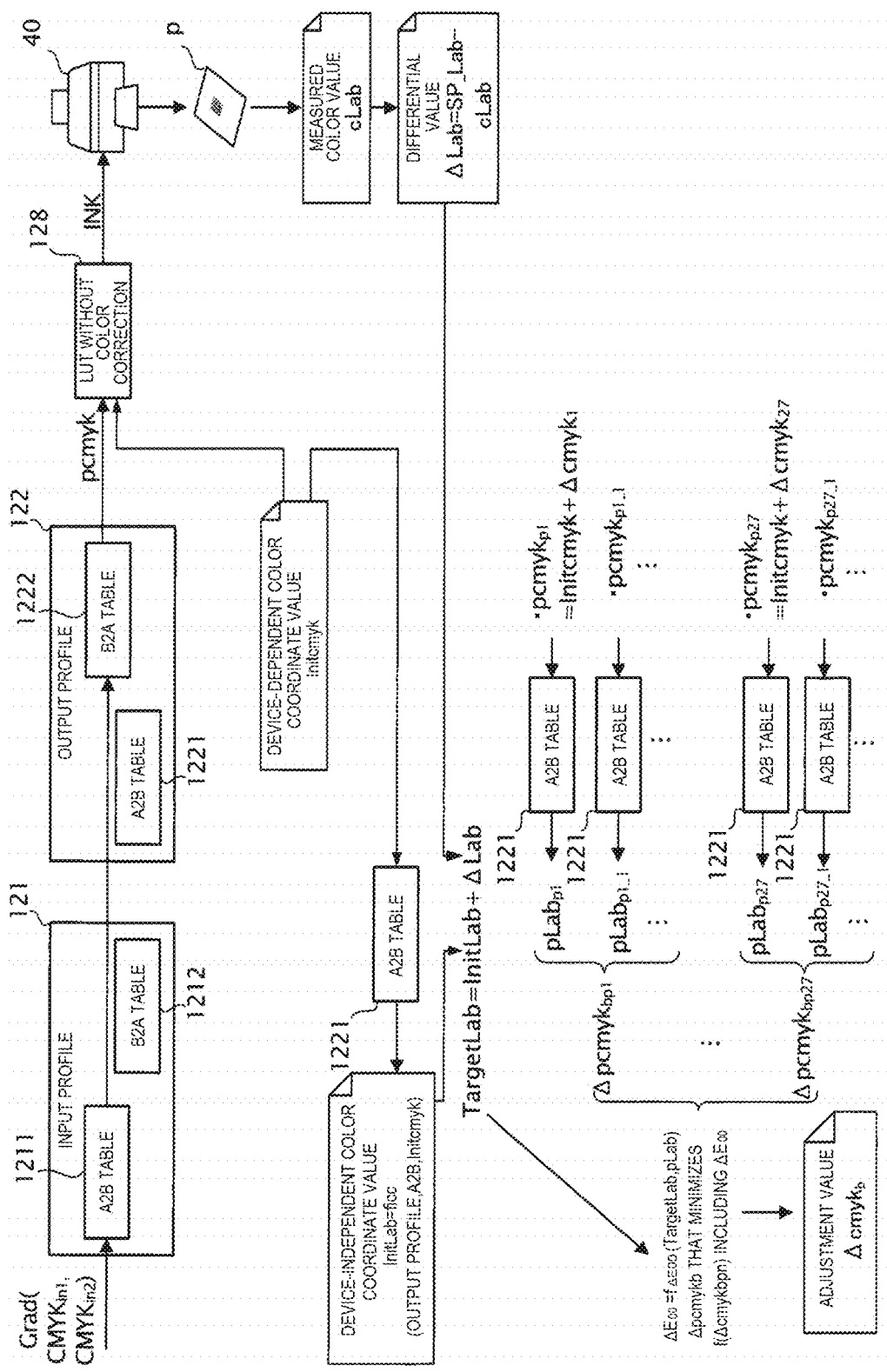
FIG. 9 shows an outline of the setting of an adjustment value $\Delta cmyk_b$ by search.

The LUT without color correction 128 is used to convert a cmyk value into an amount of ink used INK shown in FIG. 9, using halftone. The amount of ink used INK is the amount of ink used by the first printer 40 for optimal printing. In the first embodiment, the amount of ink used INK includes four amounts of ink used, that is, the amount of c ink used, the amount of m ink used, the amount of y ink used, and the amount of k ink used.

The control device 13 is a processor controlling the entirety of the host device 10. The control device 13 reads out a program from the storage device 12 and executes the read-out program, and thus performs various kinds of processing. The control device 13 is formed of one or a plurality of processing devices. A part or all of the functions of the control device 13 may be implemented by hardware such as DSP, ASIC, PLD, or FPGA. DSP is an abbreviation for digital signal processor. ASIC is an abbreviation for application-specific integrated circuit. PLD is an abbreviation for programmable logic device. FPGA is an abbreviation for field-programmable gate array.

A.2. Configuration of First Embodiment

The control device 13 reads and executes a program from the storage device 12 and thus functions as a color conversion table generation unit 130 and a print processing unit 140. The color conversion table generation unit 130 includes an acceptance unit 131, a first generation unit 132, a first conversion unit 133, a setting unit 134, a first specification unit 136, a second generation unit 137, a third generation unit 138, and a fourth generation unit 139. The print processing unit 140 includes a second conversion unit 142 and an output control unit 146. The color conversion table generation unit 130 and the print processing unit 140 will now be described with reference to FIGS. 8 and 9.

Figure 8:
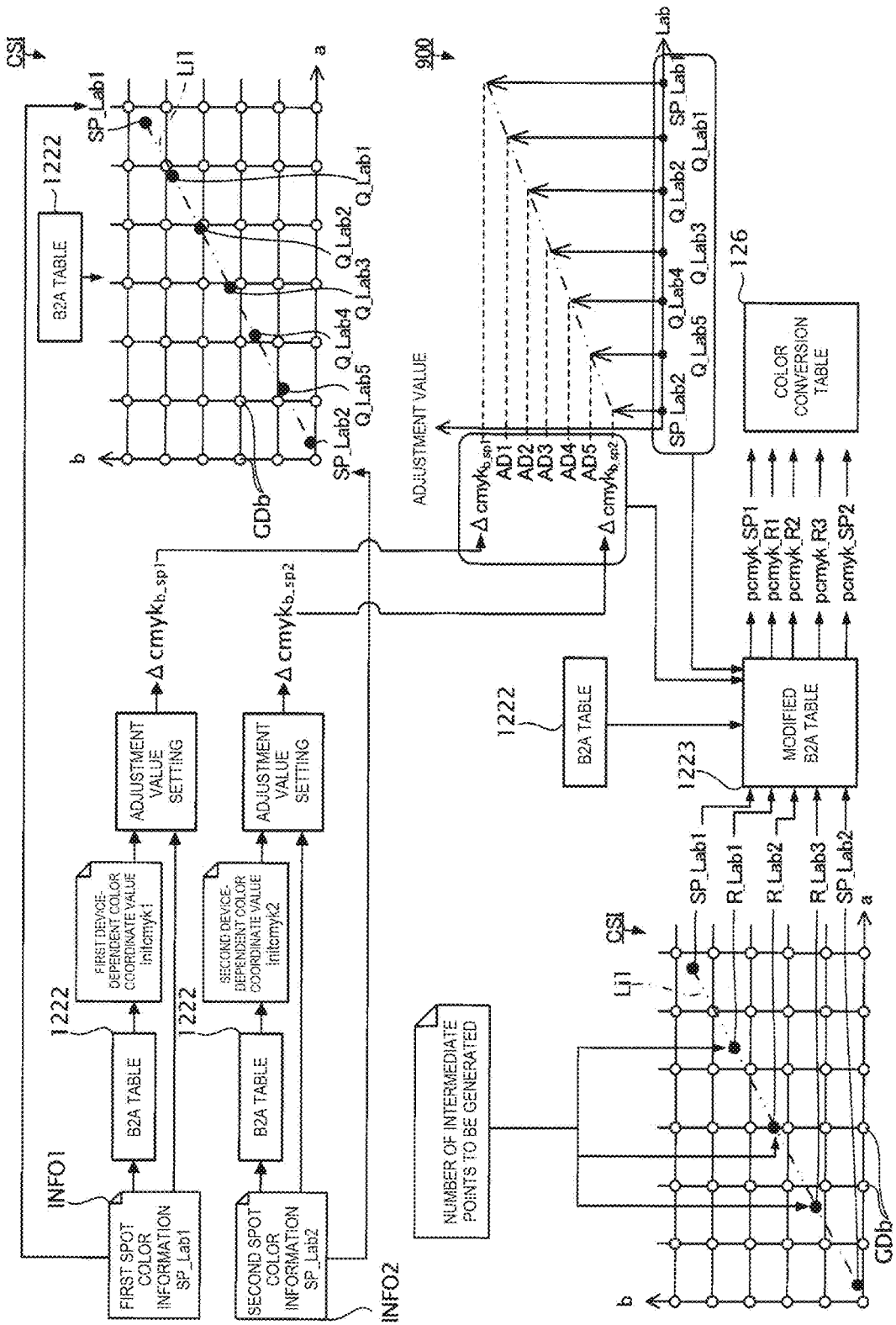
FIG. 8 shows an outline of the generation of a color conversion table 126.

FIG. 8 shows an outline of the generation of the color conversion table 126. The color conversion table generation unit 130 generates the color conversion table 126.

The acceptance unit 131 accepts first spot color information INFO1 prescribing a first spot color in the Lab color space CSI and second spot color information INFO2 prescribing a second spot color in the Lab color space CSI, in response to an operation on the input device 16 by the user.

The first spot color information INFO1 is one or both of a first spot color Lab value SP_Lab1 representing the first spot color, and a spot color name of the first spot color. Hereinafter, the spot color name of the first spot color is simply referred to as a "first spot color name". The second spot color information INFO2 is one or both of a second spot color Lab value SP_Lab2 representing the second spot color, and a spot color name of the second spot color. Hereinafter, the spot color name of the second spot color is simply referred to as a "second spot color name". When the acceptance unit 131 does not accept the first spot color Lab value SP_Lab1 and only accepts the first spot color name, the control device 13 specifies the first spot color Lab value SP_Lab1 corresponding to the accepted first spot color name, using the color library 124. The acceptance unit 131 performs similar processing with respect to the second spot color Lab value SP_Lab2.

In the example in FIG. 8, the acceptance unit 131 accepts the first spot color Lab value SP_Lab1 as the first spot color information INFO1 and accepts the second spot color Lab value SP_Lab2 as the second spot color information INFO2.

The first spot color is an example of the "first color". The first spot color information INFO1 is an example of the "first information". The first spot color Lab value SP_Lab1 is an example of the "first coordinate value". The second spot color is an example of the "second color". The second spot color information INFO2 is an example of the "second information". The second spot color Lab value SP_Lab2 is an example of the "second coordinate value".

The first generation unit 132 generates one or a plurality of intermediate points located on a first line segment connecting the first spot color Lab value SP_Lab1 and the second spot color Lab value SP_Lab2, based on the plurality of grid points GDb. When generating the intermediate point, the first generation unit 132 generates one or a plurality of intermediate points in such a way that the number of intermediate points included in each of a plurality of unit rectangular parallelepipeds corresponding to the N4 grid points GDb is 1 or fewer. The unit rectangular parallelepiped is an example of a "reference space". One unit rectangular parallelepiped is formed having eight grid points GDb as its vertices. Hereinafter, the intermediate point generated by the first generation unit 132 is referred to as a "system intermediate point". The Lab value at the system intermediate point is referred to as a "system intermediate point Lab value Q_Lab". The unit rectangular parallelepiped having the grid points GDb as its vertices is simply referred to as a "unit rectangular parallelepiped". The system intermediate point Lab value Q_Lab is an example of the "third coordinate value".

Specific processing by the first generation unit 132 will now be described. It is assumed that the first spot color Lab value SP_Lab1 is (L1, a1, b1) and that the second spot color Lab value SP_Lab2 is (L2, a2, b2). The first generation unit 132 selects an axis corresponding to the largest value of

|L2−L1| corresponding to the L-axis, |a2−a1| corresponding to the a-axis, and |b2−b1| corresponding to the b-axis. |x| represents the absolute value of x. The first generation unit 132 generates system intermediate points in a number equal to or fewer than the number of spaces between the grid points GDb along the selected axis.

A line segment Li1 in the Lab color space CSI shown at the top right of FIG. 8 is the line segment connecting the first spot color Lab value SP_Lab1 and the second spot color Lab value SP_Lab2. The line segment Li1 is an example of the "first line segment". In the example in FIG. 8, the first generation unit 132 generates a system intermediate point Lab value Q_Lab1, a system intermediate point Lab value Q_Lab2, a system intermediate point Lab value Q_Lab3, a system intermediate point Lab value Q_Lab4, and a system intermediate point Lab value Q_Lab5, as system intermediate points. One of the point represented by the system intermediate point Lab value Q_Lab1, the point represented by the system intermediate point Lab value Q_Lab2, the point represented by the system intermediate point Lab value Q_Lab3, the point represented by the system intermediate point Lab value Q_Lab4, and the point represented by the system intermediate point Lab value Q_Lab5, is included in one unit rectangular parallelepiped.

The first generation unit 132 preferably generates one or more system intermediate points with an equal space. Also, the first generation unit 132 generates system intermediate points in such a way that two or more system intermediate points are not included in one unit rectangular parallelepiped. Meanwhile, as shown in the Lab color space CSI at the top right of FIG. 8, the unit rectangular parallelepipeds passing the line segment Li1 may include a unit rectangular parallelepiped including 0 system intermediate points, that is, a unit rectangular parallelepiped that does not include any system intermediate point.

The first conversion unit 133 converts the first spot color Lab value SP_Lab1 into a first device-dependent color coordinate value Initcmyk1 in the cmyk color space CSD, using the B2A table 1222, and converts the second spot color Lab value SP_Lab2 into a second device-dependent color coordinate value Initcmyk2 in the cmyk color space CSD, using the B2A table 1222.

The first device-dependent color coordinate value Initcmyk1 is an example of the "first converted coordinate value". The second device-dependent color coordinate value Initcmyk2 is an example of the "second converted coordinate value".

In the description below, to distinguish elements of the same type from each other, reference signs as in the first device-dependent color coordinate value Initcmyk1 and the second device-dependent color coordinate value Initcmyk2 are used. When elements of the same type are not distinguished from each other, only a common number or symbol of the reference signs is used, as in the device-dependent color coordinate value Initcmyk.

It is now assumed that conversion according to a profile is expressed by a function ficc (first argument, second argument, third argument). The first argument represents a profile used. The second argument represents a color conversion table used for the profile represented by the first argument. More specifically, when the second argument is A2B, it represents conversion from a device-dependent color into a device-independent color. When the second argument is B2A, it represents conversion from a device-independent color into a device-dependent color. The third argument represents a conversion target coordinate value.

As specific processing contents, when the value designated by the third argument coincides with a value registered in the table designated by the first argument and the second argument, ficc( ) outputs a value corresponding to the registered value. Meanwhile, when the value designated by the third argument does not coincide with a value registered in the table designated by the first argument and the second argument, ficc( ) outputs a value resulting from interpolation based on a value close to the value designated by the third argument.

The processing by the first conversion unit 133 can also be expressed by the following equations (1) and (2).

$$Initcmyk1 = ficc(\text{output profile } 122, B2A, SP\_Lab1) \quad (1)$$

$$Initcmyk2 = ficc(\text{output profile } 122, B2A, SP\_Lab2) \quad (2)$$

The setting unit 134 sets a first adjustment value $\Delta cmyk_{b\_SP1}$ in such a way that the first printer 40 outputs a first spot color according to a cmyk value resulting from adjusting the first device-dependent color coordinate value Initcmyk1 by the first adjustment value $\Delta cmyk_{b\_SP1}$, and sets a second adjustment value $\Delta cmyk_{b\_SP2}$ in such a way that the first printer 40 outputs a second spot color according to a cmyk value resulting from adjusting the second device-dependent color coordinate value Initcmyk2 by the second adjustment value $\Delta cmyk_{b\_SP2}$.

Specifically, for example, there are three configurations to set the adjustment value $\Delta cmyk_b$ by the setting unit 134, as described below. According to a first configuration, the setting unit 134 sets, as the first adjustment value $\Delta cmyk_{b\_SP1}$, a difference between an optimal cmyk value with which the first printer 40 can output the first spot color and which is found by search using the result of color measurement by the color measurement device 30 of an output image outputted by the first printer 40 according to the first device-dependent color coordinate value Initcmyk1, and the first device-dependent color coordinate value Initcmyk1. The setting unit 134 sets the second adjustment value $\Delta cmyk_{b\_SP2}$ by searching for an optimal cmyk value with which the first printer 40 can output the second spot color, as in the case of the first adjustment value $\Delta cmyk_{b\_SP1}$.

According to a second configuration, the setting unit 134 set the first adjustment value $\Delta cmyk_{b\_SP1}$ by finding an optimal cmyk value with which the first printer 40 can output the first spot color, as in the first configuration. The setting unit 134 sets a value inputted by the user, as the second adjustment value $\Delta cmyk_{b\_SP2}$. The user inputs a value to be the second adjustment value $\Delta cmyk_{b\_SP2}$, for example, considering the output characteristic of the first printer 40 and the first adjustment value $\Delta cmyk_{b\_SP1}$.

According to a third configuration, the setting unit 134 sets a value inputted by the user as the first adjustment value $\Delta cmyk_{b\_SP1}$ and sets a value inputted by the user as the second adjustment value $\Delta cmyk_{b\_SP2}$. In the description below, it is assumed that the setting unit 134 sets the adjustment value $\Delta cmyk_{b\_SP1}$ according to the first configuration. The setting of the adjustment value $\Delta cmyk_b$ by search will now be described with reference to FIG. 9.

FIG. 9 shows an outline of the setting of the adjustment value $\Delta cmyk_b$ by search. FIG. 9 explains the setting of the adjustment value $\Delta cmyk_b$, where the setting of the first adjustment value $\Delta cmyk_{b\_SP1}$ and the setting of the second adjustment value $\Delta cmyk_{b\_SP2}$ are described as the same. Therefore, in FIG. 9, in the setting of the first adjustment value $\Delta cmyk_{b\_SP1}$, the "spot color Lab value SP_Lab" can be regarded as the "first spot color Lab value SP_Lab1". The "device-dependent color coordinate value Initcmyk" can be regarded as the "first device-dependent color coordinate value Initcmyk1". The "adjustment value $\Delta$cmyk$_b$" can be regarded as the "first adjustment value $\Delta$cmyk$_{b\_SP1}$". Similarly, in the setting of the second adjustment value $\Delta$cmyk$_{b\_SP2}$, the "spot color Lab value SP_Lab" can be regarded as the "second spot color Lab value SP_Lab2". The "device-dependent color coordinate value Initcmyk" can be regarded as the "second device-dependent color coordinate value Initcmyk2". The "adjustment value $\Delta$cmyk$_b$" can be regarded as the "second adjustment value $\Delta$cmyk$_{b\_SP2}$".

The setting unit 134 acquires a measured color value cLab representing a result of color measurement in the Lab color space CSI, the color measurement being performed by the color measurement device 30 about the output image outputted by the first printer 40 according to the device-dependent color coordinate value Initcmyk. The measured color value cLab is an example of a "measured color coordinate value". More specifically, the control device 13 converts the device-dependent color coordinate value Initcmyk into an amount of ink used INK, using the LUT without color correction 128. The first printer 40 prints an image of the spot color, based on the amount of ink used INK. The color measurement device 30 measures the color of the image of the spot color. The setting unit 134 acquires the measured color value cLab from the color measurement device 30.

The setting unit 134 converts the device-dependent color coordinate value Initcmyk into a device-independent color coordinate value InitLab in the Lab color space CSI. The device-independent color coordinate value InitLab is an example of a "fourth converted coordinate value". The conversion into the device-independent color coordinate value InitLab can also be expressed by the following equation (3).

$$\text{InitLab} = \text{ficc}(\text{output profile } 122, A2B, \text{Initcmyk}) \quad (3)$$

The device-independent color coordinate value InitLab can be regarded as resulting from executing round-trip calculation on the spot color Lab value SP_Lab, based on the equations (1) and (3).

The setting unit 134 decides a target Lab value TargetLab representing a target color in the Lab color space CSI, based on the device-independent color coordinate value InitLab, and a differential value $\Delta$Lab between the spot color Lab value SP_Lab and the measured color value cLab. The target Lab value TargetLab is an example of a "target coordinate value". The differential value $\Delta$Lab may be a value resulting from subtracting each component of the measured color value cLab from each component of the spot color Lab value SP_Lab, or a value resulting from subtracting each component of the spot color Lab value SP_Lab from each component of the measured color value cLab. In the first embodiment, the differential value $\Delta$Lab is assumed to be the value resulting from subtracting each component of the measured color value cLab from each component of the spot color Lab value SP_Lab. For example, the setting unit 134 decides the target Lab value TargetLab according to the following equation (4)

$$\text{TargetLab} = \text{InitLab} + \Delta\text{Lab} \quad (4)$$

When the differential value £Lab is the value resulting from subtracting each component of the spot color Lab value SP_Lab from each component of the measured color value cLab, the setting unit 134 decides a value resulting from subtracting the differential value $\Delta$Lab from the device-independent color coordinate value InitLab, as the target Lab value TargetLab.

The setting unit 134 searches for a provisional cmyk value pcmyk$_p$ satisfying a condition that the color difference between a provisional Lab value pLab$_p$ in the Lab color space CSI resulting from converting a provisional cmyk value pcmyk$_p$ in the cmyk color space CSD using the A2B table 1221 and the target Lab value TargetLab is smaller than the color difference between the device-independent color coordinate value InitLab and the target Lab value TargetLab, as an optimal cmyk value cmyk$_{st}$. The color difference is, for example, the color difference $\Delta E_{00}$ expressed by the CIEDE 2000 color difference formula, the color difference $\Delta E^*_{94}$ expressed by the CIE 1994 color difference formula, the color difference $\Delta E^*_{ab}$ based on the Lab color system proposed in 1976, that is, so-called $\Delta E^*_{76}$, or the color difference $\Delta E^*_{uv}$ based on the CIE L*u*v* color system, or the like. In the first embodiment, $\Delta E_{00}$ is used as the color difference and hereinafter referred to as the color difference $\Delta E_{00}$.

The color difference $\Delta E_{00}$ can be found by a function $f_{\Delta E00}$ (first argument, second argument). To simplify the description, the function $f_{\Delta E00}()$ will not be described in detail. The color difference $\Delta E_{00}$ between the provisional Lab value pLab$_p$ and the target Lab value TargetLab is found by substituting the provisional Lab value pLab$_p$ for the first argument in the function $f_{\Delta E00}()$ and substituting the target Lab value TargetLab for the second argument. Similarly, the color difference $\Delta E_{00}$ between the device-independent color coordinate value InitLab and the target Lab value TargetLab is found by substituting the device-independent color coordinate value InitLab for the first argument in the function $f_{\Delta E00}()$ and substituting the target Lab value TargetLab for the second argument.

The optimal cmyk value cmyk$_{st}$ is an example of a "fifth converted coordinate value". The Lab value resulting from converting the optimal cmyk value cmyk$_{st}$ using the A2B table 1221 is an example of a "sixth converted coordinate value".

For example, there are two configurations to search for the optimal cmyk value cmyk$_{st}$, as described below. According to a first configuration, the setting unit 134 calculates the color difference $\Delta E_{00}$ between the provisional Lab value pLab$_p$ and the target Lab value TargetLab. The provisional cmyk value pcmyk$_p$, from which the provisional Lab value pLab$_p$ results by conversion, is an arbitrary cmyk value. However, preferably, the provisional cmyk value pcmyk$_p$ is close to the device-dependent color coordinate value Initcmyk, and most preferably, the same as the device-dependent color coordinate value Initcmyk. When the color difference $\Delta E_{00}$ between the provisional Lab value pLab$_p$ and the target Lab value TargetLab satisfies the condition of being smaller than the color difference $\Delta E_{00}$ between the device-independent color coordinate value InitLab and the target Lab value TargetLab, the setting unit 134 outputs this provisional cmyk value pcmyk$_p$ as the optimal cmyk value cmyk$_{st}$. Meanwhile, when the color difference $\Delta E_{00}$ between the provisional Lab value pLab$_p$ and the target Lab value TargetLab does not satisfy the foregoing condition, the setting unit 134 changes the provisional cmyk value pcmyk$_p$ and repeats the processing until the optimal cmyk value cmyk$_{st}$ is found. The amount of change in the provisional cmyk value pcmyk$_p$ is, for example, a fixed value.

According to a second configuration, the setting unit 134 executes first search processing to change a first search adjustment value $\Delta$cmyk1 in such a way that an output value of a cost function decreases, the cost function including the color difference $\Delta E_{00}$ between a first provisional Lab value $pLab_{p1}$ resulting from converting, via the A2B table 1221, a first provisional cmyk value $pcmyk_{p1}$, which is the provisional cmyk value $pcmyk_p$ plus the first search adjustment value $\Delta cmyk1$, and the target Lab value TargetLab. The setting unit 134 also executes second search processing to change a second search adjustment value $\Delta cmyk2$ in such a way that an output value of a second cost function decreases, the second cost function including the color difference $\Delta E_{00}$ between a second provisional Lab value $pLab_{p2}$ resulting from converting, via the A2B table 1221, a second provisional cmyk value $pcmyk_{p2}$, which is the provisional cmyk value $pcmyk_p$ plus the second search adjustment value $\Delta cmyk2$, and the target Lab value TargetLab. When the output value of the cost function at the end of the first search processing is smaller than the output value of the cost function at the end of the second search processing, the setting unit 134 specifies the first provisional cmyk value $pcmyk_{p1}$ at the end of the first search processing as the optimal cmyk value $cmyk_{st}$. Meanwhile, when it is smaller than the output value of the second cost function at the end of the second search processing, the setting unit 134 specifies the second provisional cmyk value $pcmyk_{p2}$ at the end of the second search processing as the optimal cmyk value $cmyk_{st}$.

The first search adjustment value $\Delta cmyk1$ and the second search adjustment value $\Delta cmyk2$ are four-dimensional vectors having $\Delta c$, $\Delta m$, $\Delta y$, and $\Delta k$, as their components.

The setting unit 134 may also execute the search processing to change the search adjustment value $\Delta cmyk$, by using a plurality of provisional cmyk values $pcmyk_p$ including the first provisional cmyk value $pcmyk_{p1}$ and the second provisional cmyk value $pcmyk_{p2}$, and solving an optimization problem that minimizes the output value of a cost function including the color difference $\Delta E_{00}$ between each of the provisional cmyk values $pcmyk_p$ and the target Lab value TargetLab. In the first embodiment, the setting unit 134 executes the search processing on each provisional cmyk value $pcmyk_p$, of the first to $27^{th}$ provisional cmyk values $pcmyk_{p1}$ to $pcmyk_{p27}$. The setting unit 134 specifies, as the optimal cmyk value $cmyk_{st}$, the provisional cmyk value $pcmyk_p$ at the end of the search processing where the output value of the cost function is the smallest, of the search processing on each provisional cmyk value $pcmyk_p$.

The cost function is expressed, for example, by the following equation (5).

$$f(\Delta cmyk) = \Delta E_{00}^2 + w \times V^2 + Co \qquad (5)$$

$w \times V^2 +$ is a term provided to restrain any prominent increase in the absolute value of one of the components of the search adjustment value $\Delta cmyk$. The coefficient w is a positive number. The coefficient w is preferably greater than 1 and equal to or smaller than 10. The magnitude V is the magnitude of the search adjustment value $\Delta cmyk$. The cost Co is a constant to make an adjustment in such a way that the provisional cmyk value $pcmyk_p$ satisfies the condition of being equal to or greater than 0 and equal to or smaller than 100, which is a range available to each component of the cmyk value.

For the solution to the optimization problem, for example, Newton's method, a quasi-Newton's method, or the conjugate gradient method or the like can be used. As the quasi-Newton's method, for example, the BFGS method or the DFP method can be used. BFGS is an abbreviation for the Broyden-Fletcher-Goldfarb-Shanno method. DFP is an abbreviation for Davidon-Fletcher-Powell. In the first embodiment, the BFGS method, which is a quasi-Newton's method, is used for the solution to the optimization problem.

As a method for specifying the provisional cmyk value $pcmyk_p$ satisfying the foregoing condition by solving the foregoing optimization problem on each of the 27 initial values, for example, the setting unit 134 specifies, as the optimal cmyk value $cmyk_{st}$, a cmyk value represented by a candidate solution having a smaller value of the cost function $f(\Delta cmyk)$, of candidate solutions resulting from solving the optimization problem on each of the 27 initial values. The setting unit 134 sets the difference between the optimal cmyk value $cmyk_{st}$ and the device-dependent color coordinate value Initcmyk, as the adjustment value $\Delta cmyk_b$.

FIG. 9 shows that the setting unit 134 solves the optimization problem, using each of the first to 27th provisional cmyk values $pcmyk_{p1}$ to $pcmyk_{p27}$ as the initial value. The first provisional cmyk value $pcmyk_{p1}$ can be realized as a value resulting from adding an initial value $\Delta cmyk_1$ to the device-dependent color coordinate value Initcmyk. A provisional cmyk value $pcmyk_{p1\_1}$ shown in FIG. 9 is a value infinitesimally changed from the first provisional cmyk value $pcmyk_{p1}$. The $27^{th}$ provisional cmyk value $pcmyk_{p27}$ can be realized as a value resulting from adding an initial value $\Delta cmyk_{27}$ to the device-dependent color coordinate value Initcmyk. A provisional cmyk value $pcmyk_{p27\_1}$ shown in FIG. 9 is a value infinitesimally changed from the $27^{th}$ provisional cmyk value $pcmyk_{p27}$. A first provisional Lab value $pLab_{p1}$, a provisional Lab value $pLab_{p1\_1}$, a $27^{th}$ provisional Lab value $pLab_{p27}$, and a provisional Lab value $pLab_{p27\_1}$ shown in FIG. 9 are values resulting from converting the first provisional cmyk value $pcmyk_{p1}$, the provisional cmyk value $pcmyk_{p1\_1}$, the $27^{th}$ provisional cmyk value $pcmyk_{p27}$, and the provisional cmyk value $pcmyk_{p27\_1}$, respectively, using the A2B table 1221.

As shown in FIG. 9, the setting unit 134 solves the optimization problem, using each of the first to $27^{th}$ provisional cmyk values $pcmyk_{p1}$ to $pcmyk_{p27}$ as the initial value and thus acquires optimal candidate solutions $\Delta cmyk_{pb1}$ to $\Delta cmyk_{pb27}$. Next, the setting unit 134 specifies an optimal solution $\Delta pcmyk_b$ that minimizes the cost function $f(\Delta cmyk_{pbn})$, from among the optimal candidate solutions $\Delta cmyk_{pb1}$ to $\Delta cmyk_{pb27}$, and sets the specified optimal solution $\Delta pcmyk_b$ as the adjustment value $\Delta cmyk_b$.

Back to FIG. 8, the first specification unit 136 specifies an adjustment value AD used when the first printer 40 performs an output corresponding to a cmyk value resulting from adjusting the cmyk value converted from the system intermediate point Lab value Q_Lab via the B2A table 1222, based on the first adjustment value $\Delta cmyk_{b\_SP1}$ and the second adjustment value $\Delta cmyk_{b\_SP2}$.

The cmyk value converted from the system intermediate point Lab value Q_Lab via the B2A table 1222 is an example of the "third converted coordinate value". The adjustment value AD is an example of the "third adjustment value". The first specification unit 136 specifies the adjustment value AD for every system intermediate point Lab value Q_Lab.

As an example of the specification of the adjustment value AD, the first specification unit 136 specifies the adjustment value AD by interpolating the adjustment value AD corresponding to the system intermediate point Lab value Q_Lab, based on the first adjustment value $\Delta cmyk_{b\_SP1}$ corresponding to the first spot color Lab value SP_Lab1 and the second adjustment value $\Delta cmyk_{b\_SP2}$ corresponding to the second spot color Lab value SP_Lab2.

For example, there are two configurations for the first specification unit 136 to perform the processing, as described below. According to a first configuration, the first specification unit 136 performs linear interpolation and thus specifies the adjustment value AD. According to a second configuration, the first specification unit 136 performs linear interpolation based on a three-dimensional cubic spline function and thus specifies the adjustment value AD.

A graph 900 in FIG. 8 shows the adjustment value AD when the first specification unit 136 employs the first configuration. The horizontal axis of the graph 900 represents the Lab value. The vertical axis of the graph 900 represents the adjustment value AD. The first specification unit 136 specifies an adjustment value AD1 corresponding to the system intermediate point Lab value Q_Lab1, an adjustment value AD2 corresponding to the system intermediate point Lab value Q_Lab2, an adjustment value AD3 corresponding to the system intermediate point Lab value Q_Lab3, an adjustment value AD4 corresponding to the system intermediate point Lab value Q_Lab4, and an adjustment value AD5 corresponding to the system intermediate point Lab value Q_Lab5, by linear interpolation.

The second generation unit 137 generates a modified B2A table 1223, based on the B2A table 1222. The modified B2A table 1223 is used to convert a Lab value in the Lab color space CSI into a cmyk value in the cmyk color space CSD, similarly to the B2A table 1222. The second generation unit 137 generates the modified B2A table 1223 in such a way that, when a Lab value on the first line segment is converted into a cmyk value in the cmyk color space CSD via the modified B2A table 1223, one of the first adjustment value $\Delta cmyk_{b\_SP1}$, the second adjustment value $\Delta cmyk_{b\_SP2}$, and the adjustment value AD is reflected on the cmyk value after the conversion. The modified B2A table 1223 is an example of the "modified conversion information".

For example, there are two configurations for the second generation unit 137 to reflect one of the first adjustment value $\Delta cmyk_{b\_SP1}$, the second adjustment value $\Delta cmyk_{b\_SP2}$, and the adjustment value AD onto the cmyk value after the conversion, as described below.

According to a first configuration, the second generation unit 137 first replicates the B2A table 1222 and generates a replica B2A table to be the modified B2A table 1223. The second generation unit 137 then decides an adjustment value for eight neighboring grid points which are vertices of a unit rectangular parallelepiped including the first spot color Lab value SP_Lab1 in the replica B2A table, based on the first adjustment value $\Delta cmyk_{b\_SP1}$. Similarly, the second generation unit 137 decides an adjustment value for eight neighboring grid points which are vertices of a unit rectangular parallelepiped including the second spot color Lab value SP_Lab2 in the replica B2A table, based on the second adjustment value $\Delta cmyk_{b\_SP2}$, and decides an adjustment value for eight neighboring grid points which are vertices of a unit rectangular parallelepiped including the system intermediate point Lab value Q_Lab in the replica B2A table, based on the adjustment value AD. The second generation unit 137 then reflects the decided adjustment values onto the replica B2A table and thus generates the replica B2A table after the reflection, as the modified B2A table 1223.

Here, the eight neighboring grid points corresponding to the first spot color Lab value SP_Lab1, the eight neighboring grid points corresponding to the second spot color Lab value SP_Lab2, and the eight neighboring grid points corresponding to the system intermediate point Lab value Q_Lab can be partly the same. The adjustment value when the eight neighboring grid points for one and the eight neighboring grid points for another are partly the same will now be described, employing the case where the eight neighboring grid points corresponding to the first spot color Lab value SP_Lab1 and the eight neighboring grid points corresponding to the second spot color Lab value SP_Lab2 are partly the same.

In the replica B2A table, the second generation unit 137 decides an adjustment value Xn based on the first adjustment value $\Delta cmyk_{b\_SP1}$, as the adjustment value for eight neighboring grid points GPSP_Lab1 corresponding to the first spot color Lab value SP_Lab1. Similarly, the second generation unit 137 decides an adjustment value Ym based on the second adjustment value $\Delta cmyk_{b\_SP2}$, as the adjustment value for eight neighboring grid points GPSP_Lab2 corresponding to the second spot color Lab value SP_Lab2. When there is a neighboring grid point included in both the eight neighboring grid points GPSP_Lab1 and the eight neighboring grid points GPSP_Lab2, the control device 13 updates the adjustment value for this neighboring grid point included in both, with the average value of the adjustment value Xn and the adjustment value Ym.

According to a second configuration, the second generation unit 137 first replicates the B2A table 1222 and generates a replica B2A table to be the modified B2A table 1223. The second generation unit 137 then decides an adjustment value for the grid points GDb included in an adjustment range AR_SP1 of the first spot color Lab value SP_Lab1 in the replica B2A table, based on the first adjustment value $\Delta cmyk_{b\_SP1}$. Similarly, the second generation unit 137 decides an adjustment value for the grid points GDb included in an adjustment range AR_SP2 of the second spot color Lab value SP_Lab2 in the replica B2A table, based on the second adjustment value $\Delta cmyk_{b\_SP2}$, and decides an adjustment value for the grid points GDb included in an adjustment range AR_Q of the system intermediate point Lab value Q_Lab in the replica B2A table, based on the adjustment value AD. The second generation unit 137 then reflects the decided adjustment values onto the replica B2A table and thus generates the replica B2A table after the reflection, as the modified B2A table 1223.

Figure 10:
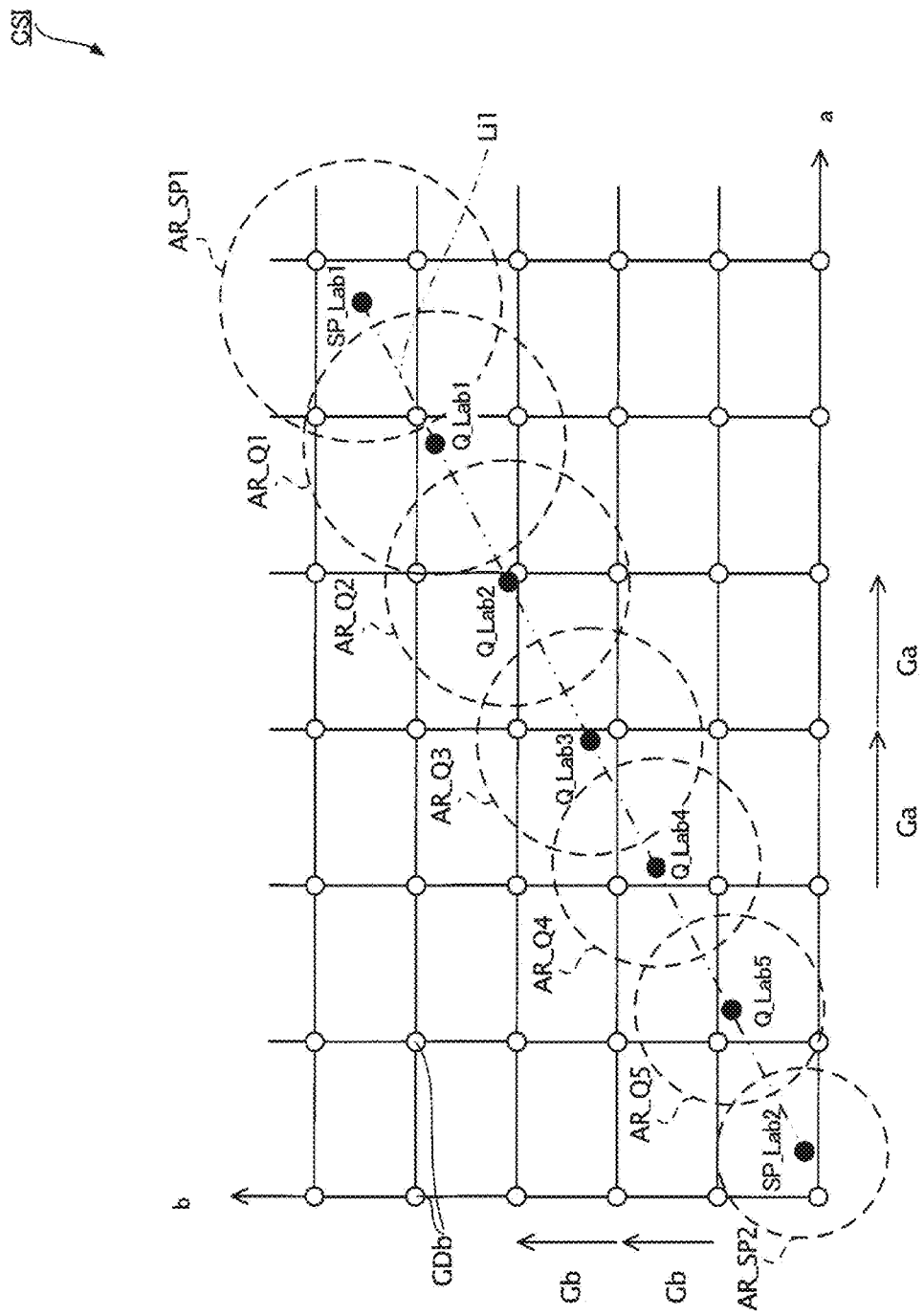
FIG. 10 shows an adjustment range AR.

FIG. 10 shows the adjustment range AR. As shown in FIG. 10, the second generation unit 137 decides an adjustment value for the grid points GDb included in one of the adjustment range AR_SP1, the adjustment range AR_SP2, and the adjustment range AR_Q. The shape of the adjustment range AR_SP1, the adjustment range AR_SP2, and the adjustment range AR_Q is, for example, spherical. The radius of the adjustment range AR_SP1 and the radius of the adjustment range AR_SP2 are values set by the designer of the color conversion table generation system 1 or by the user. The radius of an adjustment range AR_Qi is found, for example, by the following equation (6), where i is an integer from 1 to the number of system intermediate points.

Radius of adjustment range AR_Qi=radius of adjustment range AR_SP1+i×(radius of adjustment range AR_SP2-radius of adjustment range AR_SP1)/(number of system intermediate points+1)     (6)

When there is a grid point GDb included in at least two of the adjustment range AR_SP1, the adjustment range AR_SP2, and the adjustment range AR_Q, the second generation unit 137 may perform processing similar to the first configuration.

Back to FIG. 8, the third generation unit 138 generates a Lab value representing an intermediate point located on the first line segment, based on an operation by the user. Hereinafter, the intermediate point generated by the third generation unit 138 is referred to as a "user intermediate point". The Lab value of the user intermediate point is referred to as a "user intermediate point Lab value R_Lab".

The user intermediate point Lab value R_Lab is an example of the "fourth coordinate value".

More specifically, the third generation unit 138 accepts the number of user intermediate point Lab values R_Lab to be generated, in response to an operation by the user. The third generation unit 138 then generates Lab values of a number representing user intermediate points that equally divide the first line segment by a number greater than the accepted number by 1, as user intermediate point Lab values R_Lab in the accepted number. For example, the third generation unit 138 calculates a user intermediate point Lab value R_Labj by the following equation, where j is an integer from 1 to the number of user intermediate points.

$$R\_Labj = ((\text{number of user intermediate points} + 1 - j) \times SP\_Lab1 + j \times SP\_Lab2) / (\text{number of user intermediate points} + 1)$$

In the example in FIG. 8, the third generation unit 138 accepts 3 as the number of user intermediate point Lab values R_Lab to be generated, in response to an operation by the user. The third generation unit 138 then generates a user intermediate point Lab value R_Lab1, a user intermediate point Lab value R_Lab2, and a user intermediate point Lab value R_Lab3, representing user intermediate points that divide the line segment Li1 into four, as shown in the Lab color space CSI at the bottom left of FIG. 8.

The fourth generation unit 139 generates the color conversion table 126 for converting the first spot color information INFO1 into a registered cmyk value pcmyk_SP1 in the cmyk color space CSD, converting the second spot color information INFO2 into a registered cmyk value pcmyk_SP2 in the cmyk color space CSD, and converting the user intermediate point Lab value R_Lab into a registered cmyk value pcmyk_R in the cmyk color space CSD, based on the modified B2A table 1223.

The registered cmyk value pcmyk_SP1 is an example of the "fifth coordinate value". The registered cmyk value pcmyk_SP2 is an example of the "sixth coordinate value". The registered cmyk value pcmyk_R is an example of the "seventh coordinate value". The user intermediate point Lab value R_Lab is an example of "information about the user intermediate point Lab value R_Lab", that is, the "information about the fourth coordinate value".

FIG. 11 shows the color conversion table 126. As a specific example of the generation of the color conversion table 126, the fourth generation unit 139 converts the first spot color Lab value SP_Lab1 into the registered cmyk value pcmyk_SP1, converts the second spot color Lab value SP_Lab2 into the registered cmyk value pcmyk_SP2, and converts the user intermediate point Lab value R_Lab into the registered cmyk value pcmyk_R, using the modified B2A table 1223. For example, there are two configurations to convert the user intermediate point Lab value R_Lab into the registered cmyk value pcmyk_R. According to a first configuration, the fourth generation unit 139 calculates the registered cmyk value pcmyk_R by interpolation based on the cmyk value of a grid point close to the user intermediate point Lab value R_Lab, of the grid points in the modified B2A table 1223. According to a second configuration, the fourth generation unit 139 calculates the registered cmyk value pcmyk_R corresponding to the user intermediate point Lab value R_Lab by interpolation, based on the registered cmyk value pcmyk_SP1 corresponding to the first spot color Lab value SP_Lab1 and the registered cmyk value pcmyk_SP2 corresponding to the second spot color Lab value SP_Lab2. The fourth generation unit 139 then stores the first spot color information INFO1 as corresponding to the registered cmyk value pcmyk_SP1 into the color conversion table 126. Similarly, the fourth generation unit 139 stores the second spot color information INFO2 as corresponding to the registered cmyk value pcmyk_SP2 into the color conversion table 126 and stores the information about the user intermediate point Lab value R_Lab as corresponding to the registered cmyk value pcmyk_R into the color conversion table 126. Hereinafter, to simplify the description, it is assumed that the first spot color information INFO1 corresponding to the registered cmyk value pcmyk_SP1 is the first spot color Lab value SP_Lab1, that the second spot color information INFO2 corresponding to the registered cmyk value pcmyk_SP2 is the second spot color Lab value SP_Lab2, and that the information about the user intermediate point Lab value R_Lab corresponding to the registered cmyk value pcmyk_R is the user intermediate point Lab value R_Lab.

In the color conversion table 126 shown in FIG. 11, the first spot color Lab value SP_Lab1 and the second spot color Lab value SP_Lab2 are registered as two spot color Lab values. The registered cmyk value pcmyk_SP1 corresponds to the first spot color Lab value SP_Lab1. The registered cmyk value pcmyk_SP2 corresponds to the second spot color Lab value SP_Lab2. Also, in the color conversion table 126, the user intermediate point Lab value R_Lab1, the user intermediate point Lab value R_Lab2, and the user intermediate point Lab value R_Lab3 are registered. A registered cmyk value pcmyk_R1 corresponds to the user intermediate point Lab value R_Lab1. A registered cmyk value pcmyk_R2 corresponds to the user intermediate point Lab value R_Lab2. A registered cmyk value pcmyk_R3 corresponds to the user intermediate point Lab value R_Lab3.

The execution of print processing will now be described with reference to FIG. 9. In the print processing in the first embodiment, image information included in a print command supplied to the first printer 40 represents a color-gradient image successively changing in color according to the position from one end of the image to the other end. The degree of change in color may be the same regardless of the position or may vary depending on the position. Hereinafter, to simplify the description, the degree of change in color is assumed to be the same regardless of the position. When the degree of change in color is constant regardless of the position, the color displayed at a center position in the color-gradient image is a mixture of the color displayed at the one end and the color displayed at the other end, mixed at a ratio of 1 to 1, that is, 50% to 50%. The image information includes information representing the color displayed at the one end of the image and information representing the color displayed at the other end. These pieces of information are a CMYK value, a coordinate value in the RGB color space, a Lab value representing a spot color, or a spot color name. The coordinate value in the RGB color space is hereinafter referred to as an "RGB value". The print command is an example of an "output command". To simplify the description, it is assumed that the information representing the color displayed at the one end and the information representing the color displayed at the other end are a CMYK value, a Lab value representing a spot color, or a spot color name. The case where the information representing the color displayed at the one end and the information representing the color displayed at the other end are a CMYK value, that is, where the image information includes a CMYK value, will be described with reference to FIG. 9. The case where the information representing the color displayed at the one end and the information representing the color displayed at the other end are a Lab value or a spot color name, that is, where the image information includes a Lab value or a spot color name, will be described with reference to FIG. 1.

Also, the color-gradient image represented by the image information including a CMYK value may be referred to as a "color-gradient image where a CMYK value is designated". Similarly, the color-gradient image represented by the image information including a Lab value or a spot color name may be referred to as a "color-gradient image where a spot color is designated".

When the image information includes a CMYK value, the control device 13 calculates a cmyk value representing the color at a certain position in the color-gradient image.

Specifically, the control device 13 calculates a CMYK value $CMYK_{in}$ representing the color at a position in the color-gradient image, based on image information Grad ($CMYK_{in1}$, $CMYK_{in2}$) included in the print command and position information representing the position. Grad (first argument, second argument) represents a color-gradient image where one end of the image is displayed in the color represented by the first argument and where the other end is displayed in the color represented by the second argument. $CMYK_{in1}$ is a CMYK value representing the color displayed at the one end of the image. $CMYK_{in2}$ is a CMYK value representing the color displayed at the other end of the image. The position information is, for example, the proportion of the length from the one end to the position to the length from the one end to the other end. More specifically, the position information is information representing a position away from the one end by a % of the length from the one end to the other end. a is a real number equal to or greater than 0 and equal to or smaller than 100. For example, the control device 13 calculates the CMYK value $CMYK_{in}$ by the following equation.

$$CMYK_{in}=((100-a)\times CMYK_{in1}+a\times CMYK_{in2})/100$$

The control device 13 converts the calculated CMYK value $CMYK_{in}$ into a Lab value, using the A2B table 1211, and further converts the resulting Lab value into a cmyk value pcmyk, using the B2A table 1222. The control device 13 converts the cmyk value pcmyk into an amount of ink used INK, using the LUT without color correction 128, and causes the first printer 40 to print the color at the position, according to the amount of ink used INK.

Back to FIG. 1, when the image information includes a Lab value, the second conversion unit 142 calculates a Lab value $Lab_{in}$ corresponding to a position in the color-gradient image, based on image information Grad($Lab_{in1}$, $Lab_{in2}$) included in the print command and position information representing the position. The "Lab value corresponding to a position in the color-gradient image" is an example of "information about a coordinate value in the first color space corresponding to a position in the color-gradient image". $Lab_{in1}$ is a Lab value representing the color displayed at the one end of the image. $Lab_{in2}$ is a Lab value representing the color displayed at the other end. For example, when the image information includes a Lab value, the second conversion unit 142 calculates the Lab value $Lab_{in}$ corresponding to the position, based on the Lab value $Lab_{in1}$, the Lab value $Lab_{in1}$, and the position information. For example, the control device 13 calculates the Lab value $Lab_{in}$ by the following equation.

$$Lab_{in}=((100-a)\times Lab_{in1}+a\times Lab_{in2})/100$$

Here, a is a value included in the position information.

The second conversion unit 142 then determines whether both of the two Lab values included in the image information are registered in the color conversion table 126 or not. When the result of the determination is positive, the second conversion unit 142 converts the Lab value $Lab_{in}$ corresponding to the position into the cmyk value pcmyk, using the color conversion table 126. More specifically, the second conversion unit 142 outputs a cmyk value resulting from interpolation based on a value close to the Lab value corresponding to the position, as the cmyk value pcmyk.

When one of the two Lab values included in the image information is not registered or neither of them is registered in the color conversion table 126, the second conversion unit 142 converts the Lab value $Lab_{in1}$ into the cmyk value pcmyk, using the B2A table 1222.

When the image information includes a spot color name, the second conversion unit 142 converts the spot color name representing the color displayed at the one end of the image into a Lab value and converts the spot color name representing the color displayed at the other end into a Lab value, using the color library 124. The second conversion unit 142 calculates the Lab value $Lab_{in}$ corresponding to the position, based on the resulting two Lab values and the position information. The second conversion unit 142 subsequently determines whether both of the two Lab values resulting from converting the spot color names are registered in the color conversion table 126 or not. When the result of the determination is positive, the second conversion unit 142 converts the Lab value Labia corresponding to the position into a cmyk value pcmyk, using the color conversion table 126. More specifically, the second conversion unit 142 outputs a cmyk value pcmyk resulting from interpolation based on a value close to the Lab value corresponding to the position, as the cmyk value pcmyk.

When one of the two Lab values resulting from converting the spot color names is not registered or neither of them is registered in the color conversion table 126, the second conversion unit 142 converts the Lab value $Lab_{in1}$ into the cmyk value pcmyk, using the B2A table 1222.

The output control unit 146 causes the first printer 40 to output the color at the position, according to the cmyk value converted by the second conversion unit 142. More specifically, the control device 13 converts the cmyk value into an amount of ink used INK, using the LUT without color correction 128, and causes the first printer 40 to print the color at the position, according to the amount of ink used INK.

Figure 12:
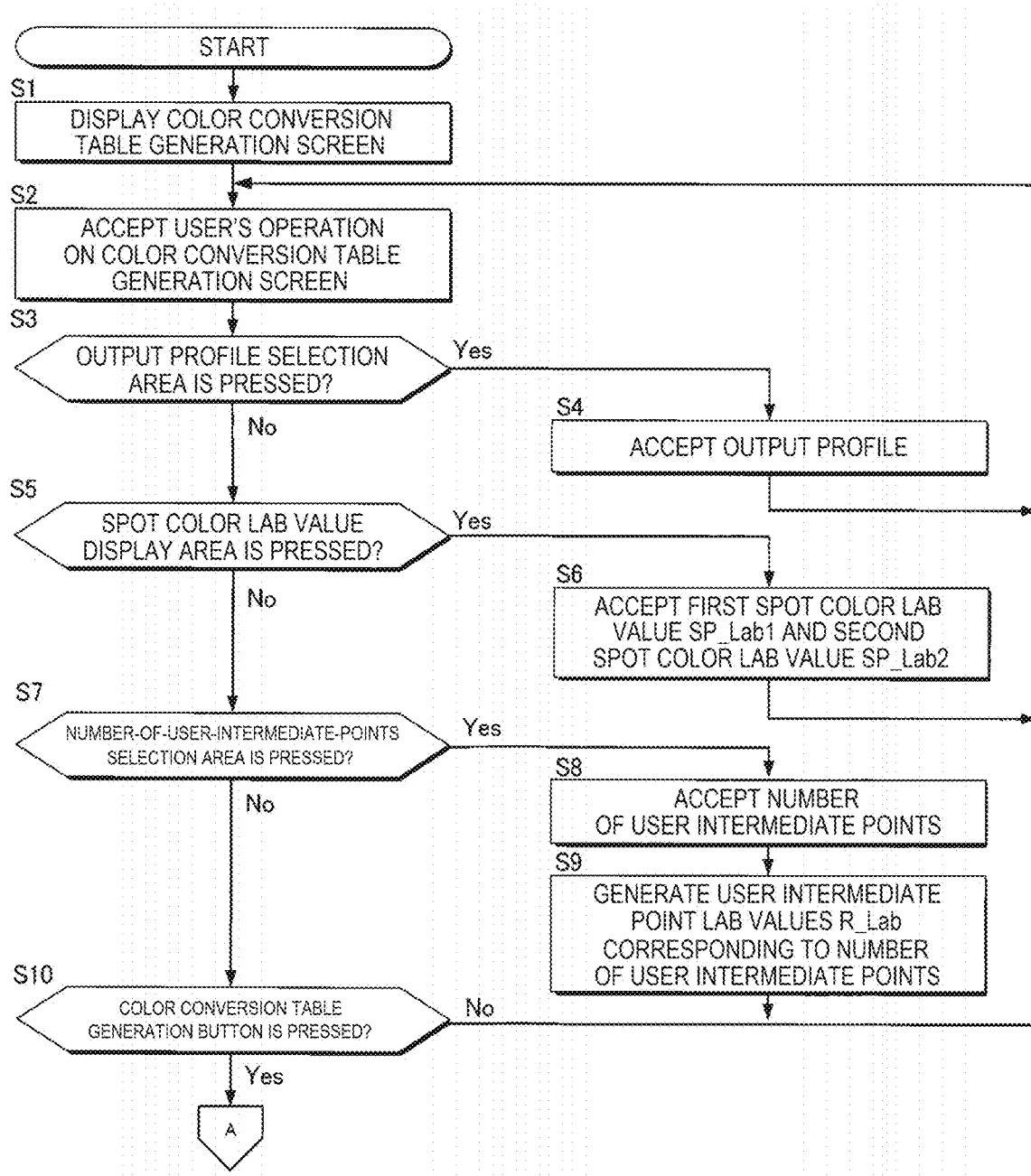
FIG. 12 is a flowchart showing color conversion table generation processing.
Figure 13:
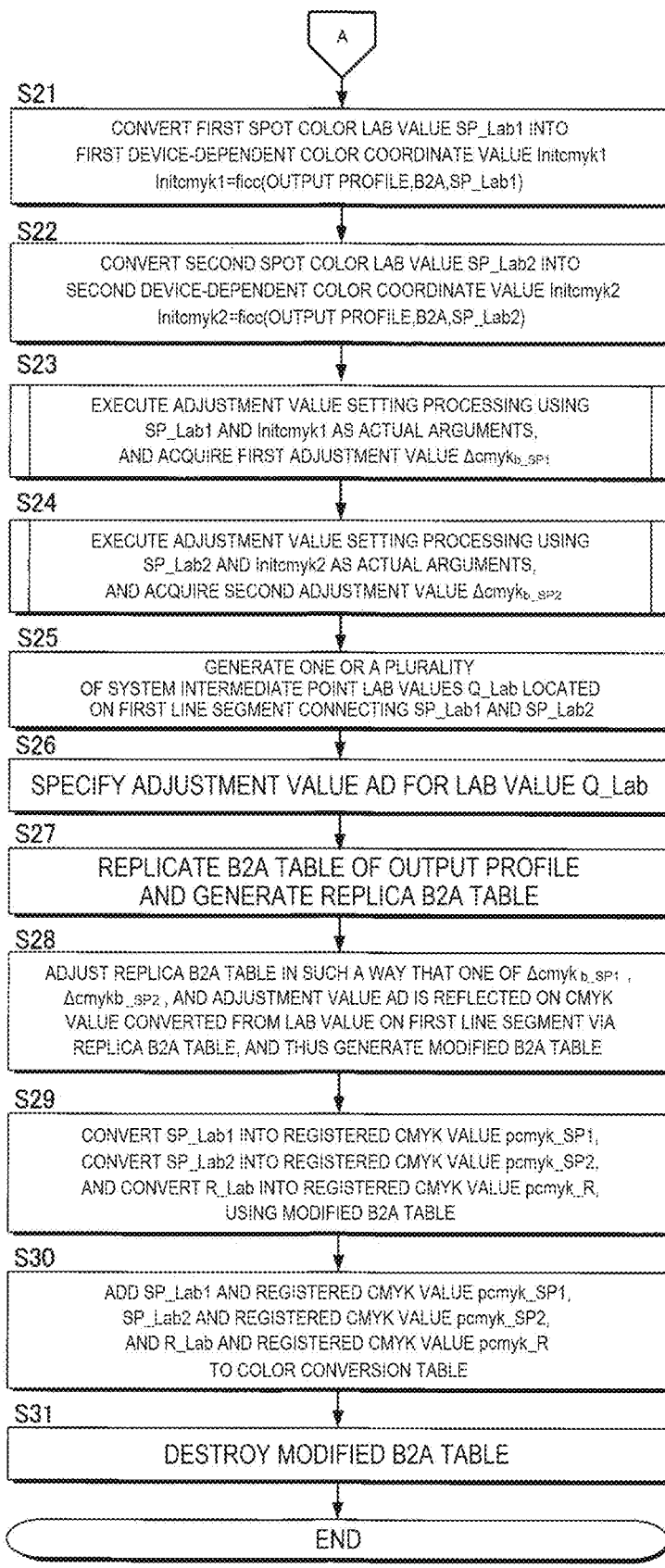
FIG. 13 is a flowchart showing the color conversion table generation processing.

A.3. Operation of Color Conversion Table Generation System 1 when Executing Color Conversion Table Generation Processing FIGS. 12 and 13 are flowcharts showing color conversion table generation processing. In step S1, the display device 20 displays a color conversion table generation screen 220 shown in FIG. 14, under the control of the control device 13.

Figure 14:
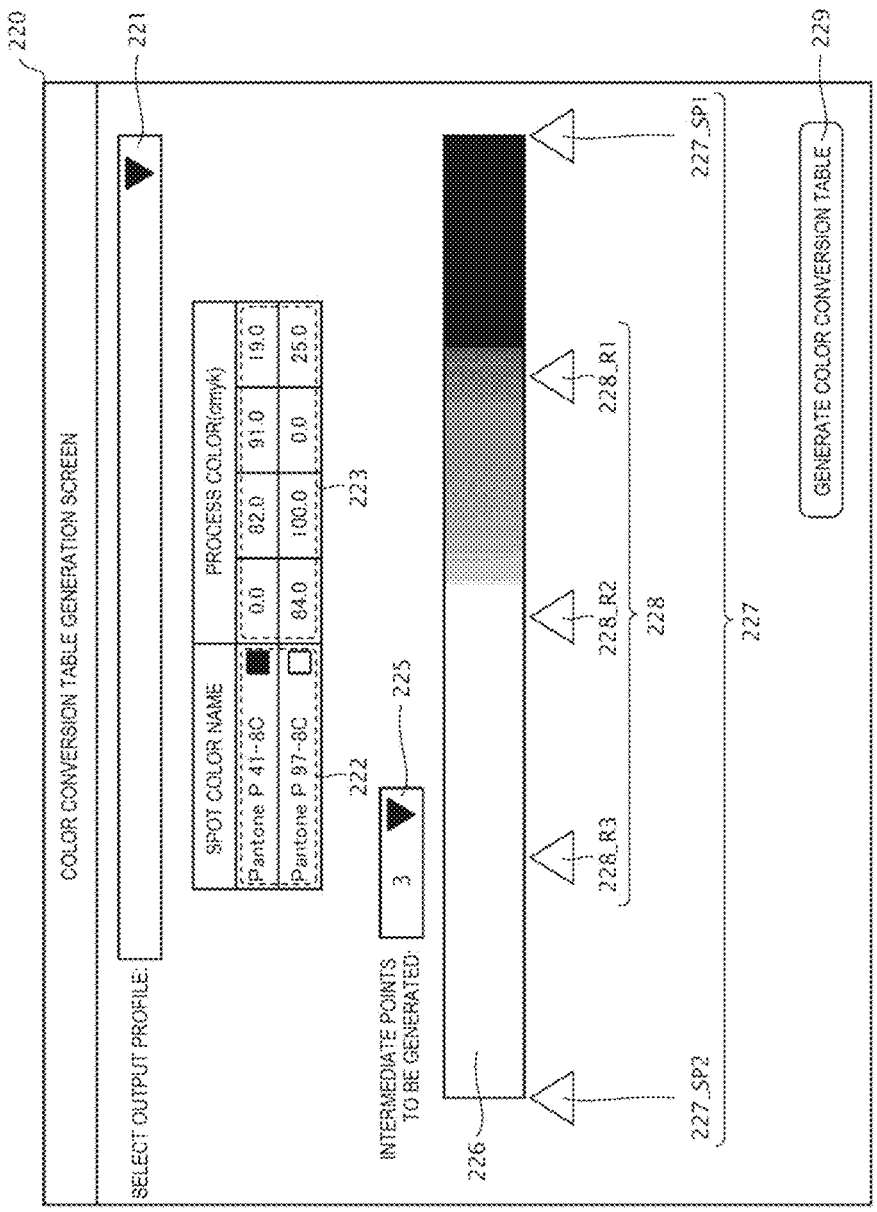
FIG. 14 shows an example of a color conversion table generation screen 220.

FIG. 14 shows an example of the color conversion table generation screen 220. The color conversion table generation screen 220 is a screen used to generate the color conversion table 126. The color conversion table generation screen 220 has an output profile selection area 221, a spot color Lab value display area 222, a cmyk value display area 223, a number-of-user-intermediate-points selection area 225, a color-gradient image preview area 226, a spot color position display icon 227, a user intermediate point position display icon 228, and a color conversion table generation button 229. The spot color Lab value display area 222 and the cmyk value display area 223 have, for every spot color, a record showing information about the spot color.

Back to FIG. 12, in step S2, the control device 13 accepts an operation on the color conversion table generation screen 220. In step S3, the control device 13 determines whether a press operation on the output profile selection area 221 is accepted or not. When the result of the determination in step S3 is positive, the control device 13 in step S4 accepts the output profile 122. The control device 13 updates the color conversion table generation screen 220 in such a way as to display the file name of the accepted output profile 122 in the output profile selection area 221. The display device 20 displays the updated color conversion table generation screen 220. After the updated color conversion table generation screen 220 is displayed, the control device 13 returns to the processing in step S2.

Meanwhile, when the result of the determination in step S3 is negative, the control device 13 in step S5 determines whether a press operation on the spot color Lab value display area 222 is accepted or not. When the result of the determination in step S5 is positive, the control device 13 in step S6 accepts the first spot color Lab value SP_Lab1 and the second spot color Lab value SP_Lab2.

There are two configurations for the user to make an input, as described below. According to a first configuration, the user inputs the Lab value of a spot color and the control device 13 causes the inputted Lab value to be displayed in the spot color Lab value display area 222. According to a second configuration, the user inputs a spot color name and the control device 13 acquires the Lab value corresponding to the inputted spot color name, using the color library 124.

When two spot color Lab values SP_Lab are accepted, the control device 13 causes the spot color position display icon 227 at both ends of the color-gradient image preview area 226. The control device 13 also causes a color-gradient image successively changing in color from the spot color represented by the first spot color Lab value SP_Lab1 to the spot color represented by the second spot color Lab value SP_Lab2, to be displayed in the color-gradient image preview area 226.

In the example in FIG. 14, the user inputs "Pantone P 41-8C" as the first spot color name and "Pantone P 97-8C" as the second spot color name. The control device 13 acquires the first spot color Lab value SP_Lab1 corresponding to "Pantone P41-8C", using the color library 124. Similarly, the control device 13 acquires the second spot color Lab value SP_Lab2 corresponding to "Pantone P97-8C", using the color library 124.

The control device 13 also causes a spot color position display icon 227_SP1 corresponding to the first spot color Lab value SP_Lab1 to be displayed at the left end of the color-gradient image preview area 226 and causes a spot color position display icon 227_SP2 corresponding to the second spot color Lab value SP_Lab2 to be displayed at the right end of the color-gradient image preview area 226. The control device 13 also causes a color-gradient image successively changing in color from the first spot color Lab value SP_Lab1 to the second spot color Lab value SP_Lab2, to be displayed in the color-gradient image preview area 226.

The control device 13 updates the color conversion table generation screen 220 in such a way as to display the spot color Lab value SP_Lab, the spot color position display icon 227, and the color-gradient image preview area 226. The display device 20 displays the updated color conversion table generation screen 220. After the updated color conversion table generation screen 220 is displayed, the control device 13 returns to the processing in step S2.

Meanwhile, when the result of the determination in step S5 is negative, the control device 13 in step S7 determines whether a press operation on the number-of-user-intermediate-points selection area 225 is accepted or not. When the result of the determination in step S7 is positive, the control device 13 in step S8 accepts the number of user intermediate points. Then, the control device 13 in step S9 generates the user intermediate point Lab values R_Lab corresponding to the number of user intermediate points, based on the spot color Lab value SP_Lab and the accepted number of user intermediate points.

FIG. 14 shows an example in which the control device 13 accepts "3" as the number of user intermediate points. The control device 13 generates the user intermediate point Lab value R_Lab1, the user intermediate point Lab value R_Lab2, and the user intermediate point Lab value R_Lab3. The control device 13 then updates the color conversion table generation screen 220 in such a way as to display a user intermediate point position display icon 228_R1 representing the user intermediate point Lab value R_Lab1, a user intermediate point position display icon 228_R2 representing the user intermediate point Lab value R_Lab2, and a user intermediate point position display icon 228_R3 representing the user intermediate point Lab value R_Lab3. The display device 20 displays the updated color conversion table generation screen 220. After the updated color conversion table generation screen 220 is displayed, the control device 13 returns to the processing in step S2.

Meanwhile, when the result of the determination in step S7 is negative, the control device 13 in step S10 determines whether a press operation on the color conversion table generation button 229 is accepted or not. When the result of the determination in step S10 is negative, that is, when a press operation on the color conversion table generation button 229 is not accepted, the control device 13 returns to the processing in step S2.

Meanwhile, when the result of the determination in step S10 is positive, the control device 13 in step S21 shown in FIG. 13 converts the first spot color Lab value SP_Lab1 into the first device-dependent color coordinate value Initcmyk1, using the B2A table 1222. The processing in step S21 can also be expressed by the foregoing equation (1). Similar to the processing in step S21, the control device 13 in step S22 converts the second spot color Lab value SP_Lab2 into the second device-dependent color coordinate value Initcmyk2, using the B2A table 1222. The processing in step S22 can also be expressed by the foregoing equation (2).

After finishing the processing in step S22, the control device 13 in step S23 executes adjustment value setting processing using the first spot color Lab value SP_Lab1 and the first device-dependent color coordinate value Initcmyk1 as actual arguments and acquires the first adjustment value $\Delta\text{cmyk}_{b\_SP1}$. Also, the control device 13 in step S24 executes adjustment value setting processing using the second spot color Lab value SP_Lab2 and the second device-dependent color coordinate value Initcmyk2 as actual arguments and acquires the second adjustment value $\Delta\text{cmyk}_{b\_SP2}$. The adjustment value setting processing will now be described with reference to FIG. 15.

Figure 15:
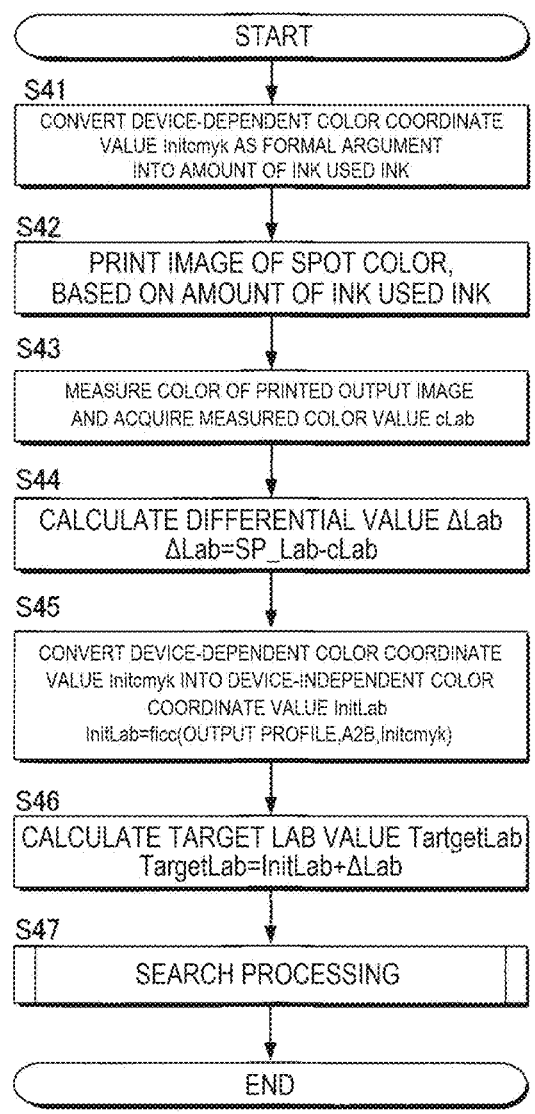
FIG. 15 is a flowchart showing adjustment value setting processing.

FIG. 15 is a flowchart showing the adjustment value setting processing. In step S41, the control device 13 converts the device-dependent color coordinate value Initcmyk, which is a formal argument, into the amount of ink used INK, using the LUT without color correction 128. Then, the control device 13 in step S42 causes the first printer 40 to print an image of the spot color, based on the amount of ink used INK. In step S43, the color measurement device 30 measures the color of the output image printed by the first printer 40 and the control device 13 acquires the measured color value cLab.

After finishing the processing in step S43, the control device 13 in step S44 subtracts the measured color value cLab from the spot color Lab value SP_Lab, which is a formal argument, and thus calculates the differential value ΔLab. The processing in step S44 can also be expressed by the following equation.

$$\Delta Lab = SP\_Lab - cLab$$

The control device 13 in step S45 converts the device-dependent color coordinate value Initcmyk into the device-independent color coordinate value InitLab, using the A2B table 1221. The processing in step S45 can also be expressed by the foregoing equation (3).

After finishing the processing in step S45, the control device 13 in step S46 adds the differential value nab to the device-dependent color coordinate value Initcmyk and thus calculates the target Lab value TargetLab. The processing in step S46 can also be expressed by the foregoing equation (4).

The control device 13 in step S47 executes search processing. The search processing will now be described with reference to FIG. 16.

Figure 16:
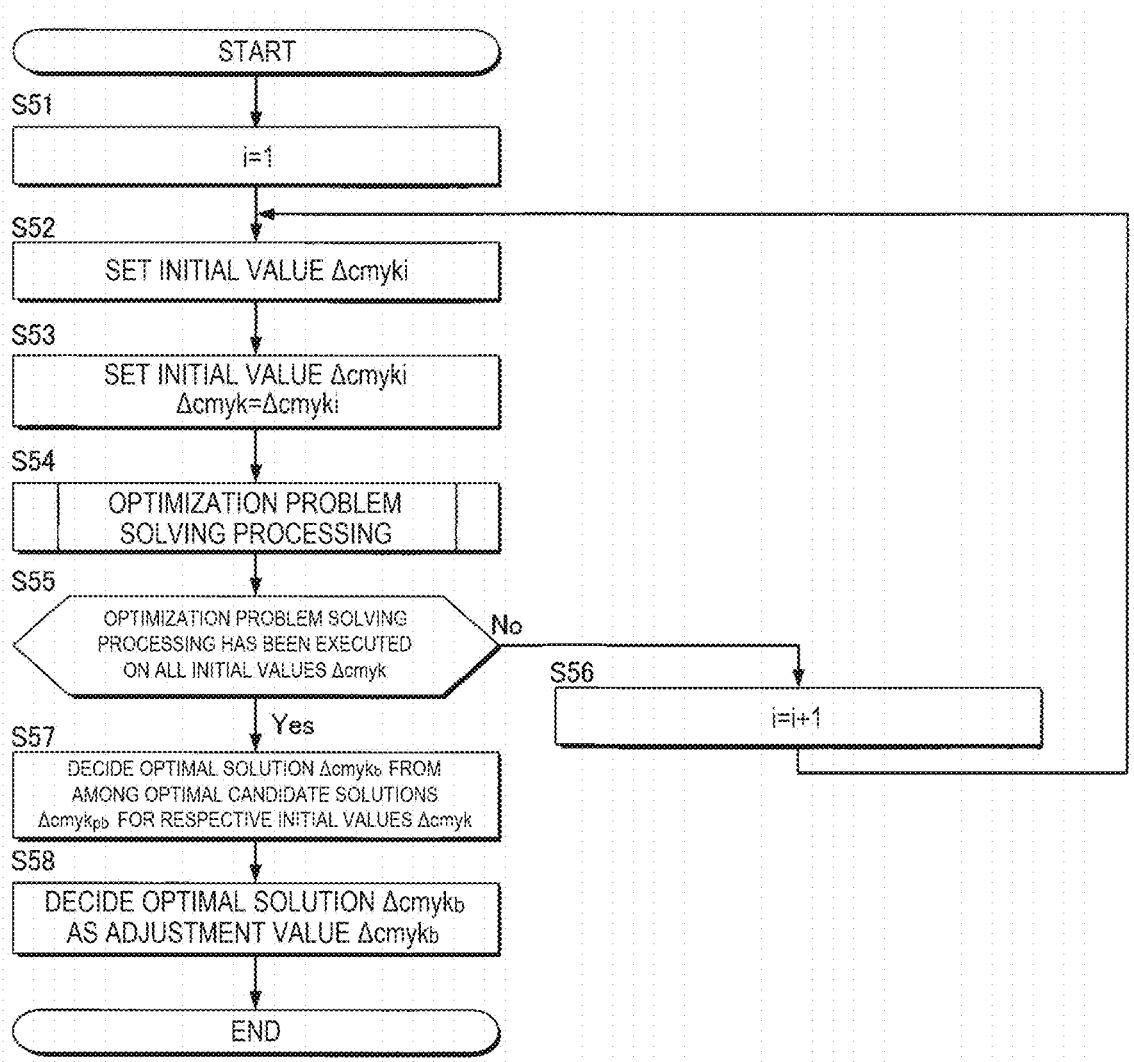
FIG. 16 is a flowchart showing search processing.

FIG. 16 is a flowchart showing the search processing. In the search processing, the optimal solution $\Delta cmyk_b$ by which the provisional Lab value $pLab_p$ resulting from converting, via the A2B table 1221, the provisional cmyk value $pcmyk_p$ resulting from adding the search adjustment value Δcmyk to the device-dependent color coordinate value Initcmyk, becomes as close as possible to the target Lab value TargetLab. More specifically, in the search processing, the cost function f(Δcmyk) using the search adjustment value Δcmyk as an argument is set and the optimization problem that minimizes the cost function f(Δcmyk) is solved, thus searching for the optimal solution $\Delta cmyk_b$.

A quasi-Newton's method performs search using a differentiable function and therefore converges to a local solution. Therefore, this method may not be able to find a correct optimal solution. In the search processing, in order to restrain the convergence to a local solution, a plurality of initial values Δcmyk are provided and a quasi-Newton's method is applied to each initial value Δcmyk, thus finding an optimal candidate solution $\Delta cmyk_{pb}$. Then, in the search processing, the optimal solution $\Delta cmyk_b$ is decided from among the optimal candidate solutions $\Delta cmyk_{pb}$ corresponding to the respective initial values.

In the search processing, the control device 13 in step S51 substitutes 1 for a variable i. The variable i is a variable to identify each of the plurality of search initial values Δcmyk. In the description below, the term "initial value Δcmyk" is a general term for all the initial values $\Delta cmyk_1$. Next, the control device 13 in step S52 sets the initial value $\Delta cmyk_i$ of the search adjustment value Δcmyk.

Figure 17:
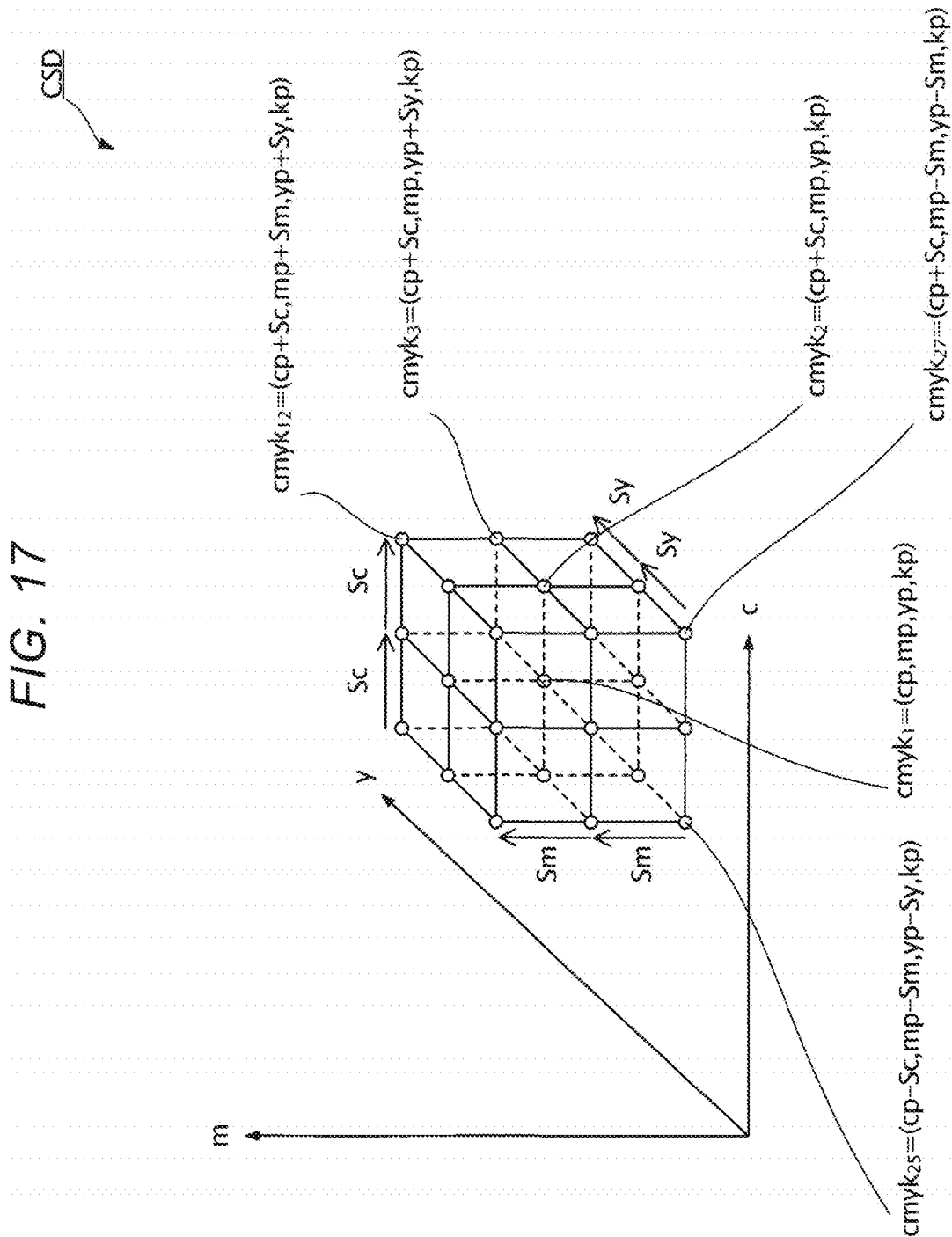
FIG. 17 shows an initial value $\Delta cmyk$.

FIG. 17 shows the initial value Δcmyk. Each grid point in the cmyk color space CSD shown in FIG. 17 represents the position of the initial value Δcmyk. FIG. 17 shows the relationship between the initial values Δcmyk of only some of the grid points, in order to restrain complexity of the illustration. In the description below, the respective components of the initial value Δcmyk are expressed as (Δci, Δmi, Δyi, Δki). In the search processing, the initial value $\Delta cmyk_1$ is (0, 0, 0, 0). In the first embodiment, the initial values Δcmyk of 27 points based on three points shifted in c-value from the initial value $\Delta cmyk_1$ by a predetermined space Sc each, three points shifted in m-value from the initial value $\Delta cmyk_1$ by a predetermined space Sm each, and three points shifted in y-value from the initial value $\Delta cmyk_1$ by a predetermined space Sy each, are prepared. The predetermined space Sc, the predetermined space Sm, and the predetermined space Sy are real numbers greater than 0. The variable i is an integer equal to or greater than 1 and equal to or smaller than 27. To perform the search processing at a high speed, Δki is set to 0. Therefore, the respective components (Δci, Δmi, Δyi, Δki) of the initial value $\Delta cmyk_1$ are as follows.

$$(\Delta c1, \Delta m1, \Delta y1, \Delta k1) = (0,0,0,0)$$

$$(\Delta c2, \Delta m2, \Delta y2, \Delta k2) = (+Sc, 0, 0, 0)$$

$$(\Delta c3, \Delta m3, \Delta y3, \Delta k3) = (+Sc, 0, +Sy, 0)$$

. . .

$$(\Delta c12, \Delta m12, \Delta y12, \Delta k12) = (+Sc, +Sm, +Sy, 0)$$

. . .

$$(\Delta c25, \Delta m25, \Delta y25, \Delta k25) = (-Sc, -Sm, -Sy, 0)$$

. . .

$$(\Delta c27, \Delta m27, \Delta y27, \Delta k27) = (+Sc, -Sm, -Sy, 0)$$

Although Δki is 0 in the first embodiment as described above, points shifted from $\Delta cmyk_1$ by a predetermined space Sk each may be employed. The predetermined space Sk is a real number greater than 0. The number of initial values Δcmyk is 27 in the first embodiment but may be other numbers than 27, such as 8 or 81.

The predetermined space Sc, the predetermined space Sm, and the predetermined space Sy may be, for example, equal to or greater than 0.5 times and equal to or smaller than twice the space Gc, the space Gm, and the space Gy between the grid points GDa represented by the A2B table 1221 in the cmyk color space CSD. The predetermined space Sc, the predetermined space Sm, and the predetermined space Sy are expressed by the following formulae.

$$0.5 \times Gc \leq Sc \leq 2 \times Gc$$

$$0.5 \times Gm \leq Sm \leq 2 \times Gm$$

$$0.5 \times Gy \leq Sy \leq 2 \times Gy$$

When the predetermined space Sc, the predetermined space Sm, and the predetermined space Sy are equal to or greater than 0.5 times and equal to or smaller than twice the space Gc, the space Gm, and the space Gy, the optimal solution $\Delta cmyk_b$ can be efficiently searched for.

When points shifted from $\Delta cmyk_1$ by the predetermined space Sk each are employed, for example, the predetermined space Sk can be equal to or greater than 0.5 times and equal to or smaller than twice the space between the grid points GDa along the k-axis.

Back to FIG. 16, the control device 13 in step S53 substitutes the initial value $\Delta cmyk_i$ for the search adjustment value Δcmyk. The processing in step S53 can also be expressed by the following equation.

$$\Delta cmyk = \Delta cmyk_i$$

Next, the control device 13 in step S54 executes optimization problem solving processing. The optimization problem solving processing will now be described with reference to FIG. 18.

Figure 18:
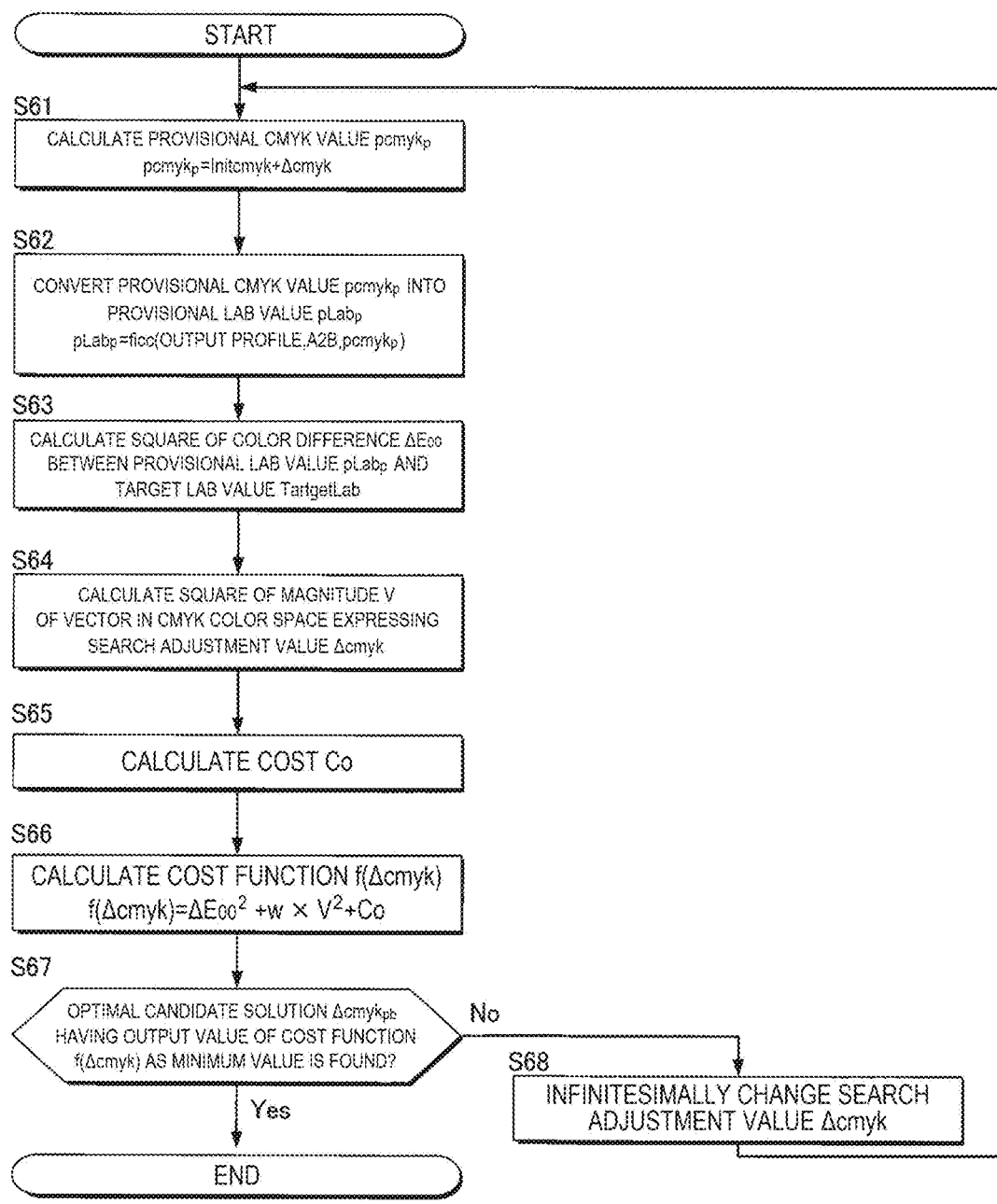
FIG. 18 is a flowchart showing optimization problem solving processing.

FIG. 18 is a flowchart showing the optimization problem solving processing. In the optimization problem solving processing, the optimal candidate solution $\Delta cmyk_{pb}$ corresponding to one initial value $\Delta cmyk_i$ of the plurality of initial values $\Delta cmyk_i$, using the BFGS method, which is a quasi-Newton's method.

In step S61, the control device 13 adds the search adjustment value $\Delta cmyk$ to the device-dependent color coordinate value Initcmyk and thus calculates the provisional cmyk value $pcmyk_p$. The processing in step S61 can also be expressed by the following equation.

$pcmyk_p = Initcmyk + \Delta cmyk$

In step S62, the control device 13 converts the provisional cmyk value $pcmyk_p$ into the provisional Lab value $pLab_p$, using the A2B table 1221. The processing in step S62 can also be expressed by the following equation.

$pLab_p = ficc(\text{output profile } 122, A2B, pcmyk_p)$

The processing in steps S63 to S65 is the processing to find each term in the cost function $f(\Delta cmyk)$. The cost function $f(\Delta cmyk)$ is expressed by the foregoing equation (5).

In step S63, the control device 13 calculates the square of the color difference $\Delta E_{00}$ between the provisional Lab value $pLab_p$ and the target Lab value TargetLab.

In step S64, the control device 13 calculates the square of the magnitude V of a vector in the cmyk color space CSD expressing the search adjustment value $\Delta cmyk$.

In step S65, the control device 13 calculates the cost Co. Since the provisional cmyk value $pcmyk_p$ satisfies the condition that the range of values available to each component of the cmyk value is 0 or greater and 100 or smaller, the control device 13 calculates the cost Co according to the following formulae, where the respective components of the provisional cmyk value $pcmyk_p$ are $(c_{pp}, m_{pp}, y_{pp}, k_{pp})$.

when $c_{pp} < 0$, $Co = -c_{pp} \times C_{co}$ when $c_{pp} > 100$, $Co = (c_{pp} - 100) \times C_{co}$ when $m_{pp} < 0$, $Co = -m_{pp} \times C_{co}$ when $m_{pp} > 100$, $Co = (m_{pp} - 100) \times C_{co}$ when $y_{pp} < 0$, $Co = -y_{pp} \times C_{co}$ when $y_{pp} > 100$, $Co = (y_{pp} - 100) \times C_{co}$ when $k_{pp} < 0$, $Co = -k_{pp} \times C_{co}$ when $k_{pp} > 100$, $Co = (k_{pp} - 100) \times C_{co}$ otherwise, $Co = 0$ The coefficient $C_{co}$ is a positive number and is preferably approximately $10^3$ or greater and $10^9$ or smaller, which is sufficiently greater than the range of 0 or greater and 100 or smaller available to each component of the cmyk value.

The control device 13 may also calculate the cost Co, based on a factor other than the condition that the range of values available to each component of the cmyk value is 0 or greater and 100 or smaller. For example, when an error occurs in the execution of the processing of steps S61 to S65, the control device 13 may add a value equal to $10^3$ or greater and $10^9$ or smaller to the cost Co.

As each term in the cost function $f(\Delta cmyk)$ is found by the processing in steps S63 to S65, the control device 13 in step S66 calculates the cost function $f(\Delta cmyk)$ and acquires an output value.

In step S67, the control device 13 repeats the processing in steps S61 to S66 until the optimal candidate solution $\Delta cmyk_{pb}$ having the output value of the cost function $f(\Delta cmyk)$ as the minimum value is found. When the processing in step S67 is performed for the first time, whether the output value of the cost function $f(\Delta cmyk)$ is the minimum value or not cannot be determined. Therefore, the control device 13 in step S68 infinitesimally changes the search adjustment value $\Delta cmyk$ and then returns to the processing in step S61. The amount of infinitesimal change is defined, based on the BFGS method. When the processing in step S67 is performed the second time onward, the control device 13 executes the processing in step S68 when the optimal candidate solution $\Delta cmyk_{pb}$ is not found. When the optimal candidate solution $\Delta cmyk_{pb}$ is found, the control device 13 ends the series of processing steps shown in FIG. 18 and executes the processing in step S55 shown in FIG. 16.

Back to FIG. 16, the control device 13 in step S55 determines whether the optimization problem solving processing has been executed on all the initial values $\Delta cmyk$ or not. When the result of the determination in step S55 is negative, that is, when there is an initial value $\Delta cmyk$ on which the optimal problem solving processing has not been executed yet, the control device 13 in step S56 increases the variable i by 1 and returns to the processing in step S52. Meanwhile, when the result of the determination in step S55 is positive, the control device 13 in step S57 decided the optimal solution $\Delta cmyk_b$ from among the optimal candidate solutions $\Delta cmyk_{pb}$ for the respective initial values $\Delta cmyk$.

In step S58, the control device 13 decides the optimal solution $\Delta cmyk_b$ as the adjustment value $\Delta cmyk_b$. When the adjustment value setting processing is accessed in step S23, the control device 13 decides the optimal solution $\Delta cmyk_b$ as the first adjustment value $\Delta cmyk_{b\_SP1}$. Similarly, when the adjustment value setting processing is accessed in step S24, the control device 13 decides the optimal solution $\Delta cmyk_b$ as the second adjustment value $\Delta cmyk_{b\_SP2}$. After finishing the processing in step S58, the control device 13 ends the series of processing steps shown in FIG. 16 and the series of processing steps shown in FIG. 15, accesses the adjustment value setting processing, and returns to the appropriate processing.

Back to FIG. 13, the control device 13 in step S25 generates one or a plurality of system intermediate point Lab values Q_Lab located on the first line segment connecting the first spot color Lab value SP_Lab1 and the second spot color Lab value SP_Lab2. However, in step S25, the control device 13 generates the system intermediate point Lab value(s) Q_Lab in such a way that the number of system intermediate points included in a unit rectangular parallelepiped is 1 or fewer.

Next, the control device 13 in step S26 specifies. the adjustment value AD for the system intermediate point Lab value Q_Lab, based on the first adjustment value $\Delta cmyk_{b\_SP1}$ and the second adjustment value $\Delta cmyk_{b\_SP2}$. In step S27, the control device 13 replicates the B2A table 1222 of the output profile 122 and acquires a replica B2A table. For example, it is now assumed that the storage device 12 is an HDD and RAM and that the B2A table 1222 is stored in the HDD. The control device 13 replicates the B2A table 1222 stored in the HDD into the RAM as a replica B2A table.

After finishing the processing in step S27, the control device 13 in step S28 adjusts the replica B2A table in such a way that one of the first adjustment value $\Delta cmyk_{b\_SP1}$, the second adjustment value $\Delta cmyk_{b\_SP2}$, and the adjustment value AD is reflected on the cmyk value converted from the Lab value on the first line segment via the replica B2A table. The control device 13 thus generates the modified B2A table 1223.

Next, in step S29, the control device 13 converts the first spot color Lab value SP_Lab1 into the registered cmyk value pcmyk_SP1, converts the second spot color Lab value SP_Lab2 into the registered cmyk value pcmyk_SP2, and converts the user intermediate point Lab value R_Lab into the registered cmyk value pcmyk_R, using the modified B2A table 1223.

In step S30, the control device 13 adds the first spot color Lab value SP_Lab1 and the registered cmyk value pcmyk_SP1, the second spot color Lab value SP_Lab2 and the registered cmyk value pcmyk_SP2, and the user intermediate point Lab value R_Lab and the registered cmyk value pcmyk_R, to the color conversion table 126.

Next, in step S31, the control device 13 destroys the modified B2A table 1223. After finishing the processing in step S31, the control device 13 ends the series of processing steps shown in FIGS. 12 and 13.

Figure 19:
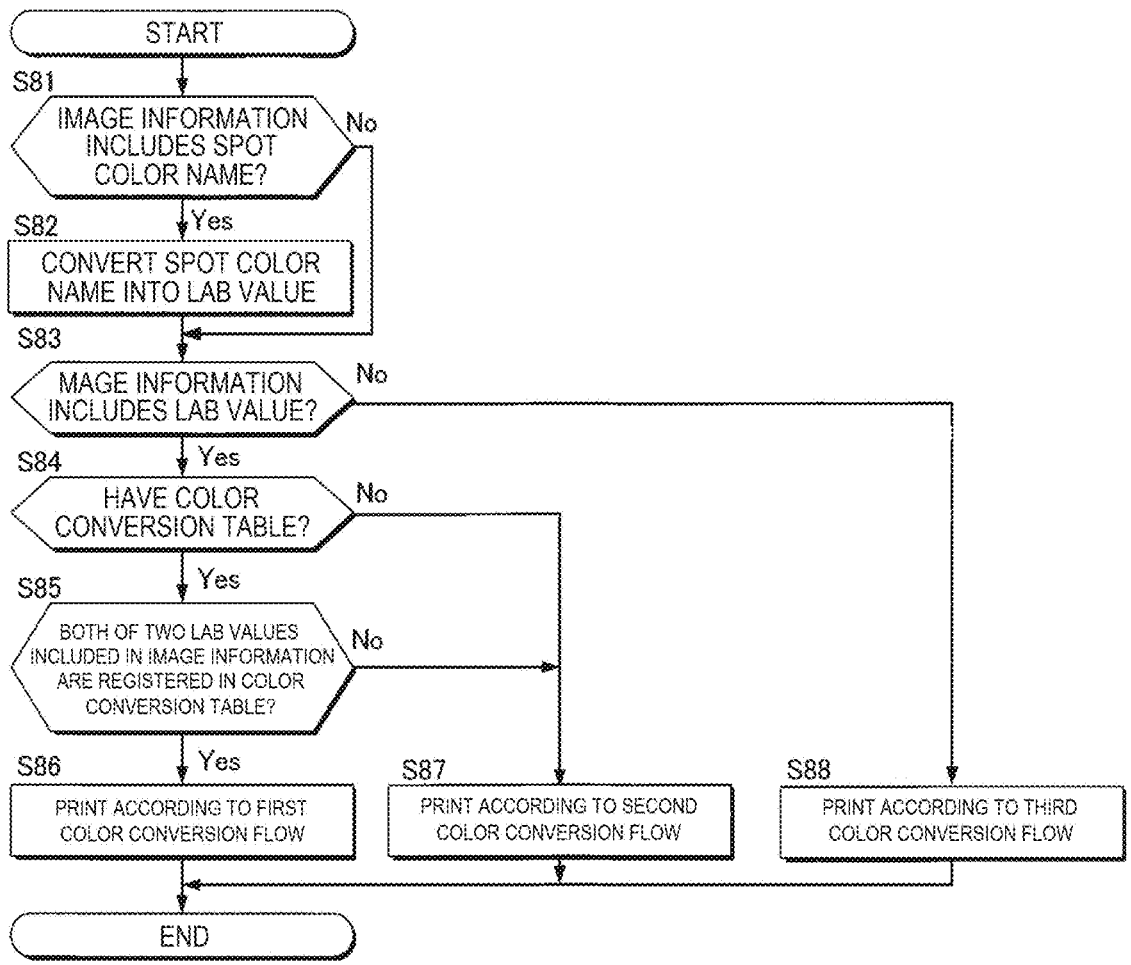
FIG. 19 is a flowchart showing an operation at the time of executing print processing.

A.4. Operation of Color Conversion Table Generation System 1 when Executing Print Processing FIG. 19 is a flowchart showing the operation at the time of executing the print processing. On accepting a print command supplied to the first printer 40 in response to an operation by the user or the like, the control device 13 in step S81 determines whether image information included in the print command includes a spot color name or not. When the image information includes a spot color name, it means that a spot color is designated. When the result of the determination in step S81 is positive, the control device 13 in step S82 converts the spot color name included in the image information into a Lab value, using the color library 124. In step S83, the control device 13 determines whether the image information includes a Lab value or not. When the result of the determination in step S81 is negative, that is, when the image information included in the print command includes a Lab value or a CMYK value, the control device 13 similarly determines whether the image information includes a Lab value or not, in step S83.

When the result of the determination in step S83 is positive, the control device 13 in step S84 determines whether the storage device 12 has the color conversion table 126 or not. When the result of the determination in step S84 is positive, the control device 13 in step S85 determines whether both of the two Lab values included in the image information are registered in the color conversion table 126 or not. When the result of the determination in step S85 is positive, the control device 13 in step S86 prints the color-gradient image represented by the image information according to a first color conversion flow.

Figure 20:
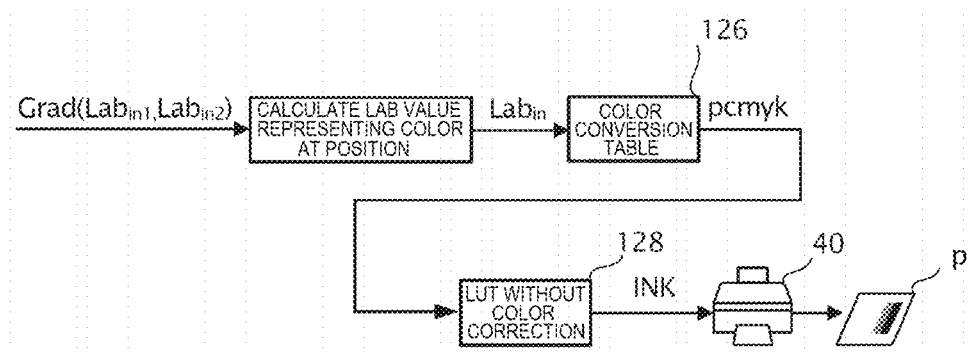
FIG. 20 shows a first color conversion flow.

FIG. 20 shows the first color conversion flow. In the first color conversion flow, the control device 13 calculates the Lab value $Lab_{in}$ representing the color at a position in the color-gradient image where the spot color is designated, based on the image information Grad($Lab_{in1}$, $Lab_{in2}$) and position information representing the position. The control device 13 then converts the Lab value $Lab_{in}$ into the registered cmyk value pcmyk, using the color conversion table 126. The control device 13 then converts the resulting registered cmyk value pcmyk into the amount of ink used INK, using the LUT without color correction 128. The control device 13 then causes the first printer 40 to print the color represented by the Lab value $Lab_{in}$ onto a medium p, based on the resulting amount of ink used INK. The control device 13 performs the foregoing processing on all the positions in the color-gradient image and thus causes the color-gradient image to be displayed on the medium p.

Back to FIG. 19, when the result of the determination in step S84 is negative, the control device 13 in step S87 prints the color-gradient image represented by the image information according to a second conversion flow. Similarly, when the result of the determination in step S85 is negative, that is, when one of the two Lab values included in the image information is not registered or neither of the two Lab values is registered in the color conversion table 126, the control device 13 executes the processing in step S87.

Figure 21:
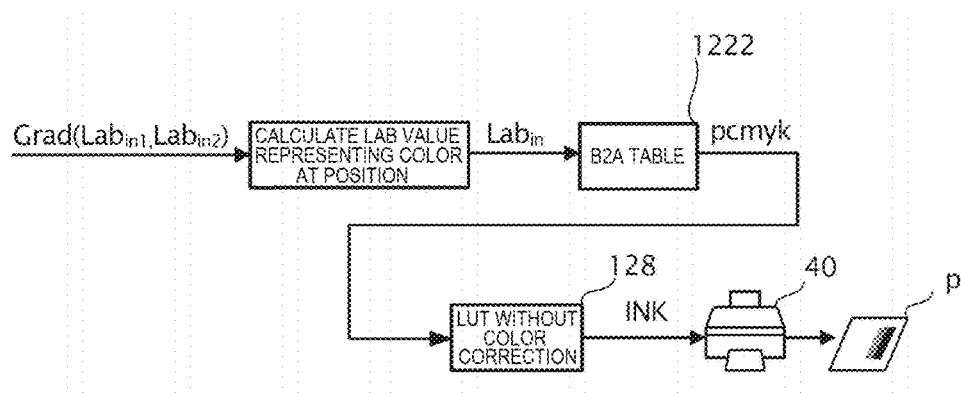
FIG. 21 shows a second color conversion flow.

FIG. 21 shows the second color conversion flow. In the second color conversion flow, the control device 13 calculates the Lab value Labia representing the color at a position in the color-gradient image where the spot color is designated, based on the image information Grad($Lab_{in1}$, $Lab_{in2}$) and position information representing the position. The control device 13 then converts the Lab value Labia into the cmyk value pcmyk, using the B2A table 1222. The control device 13 then converts the resulting cmyk value pcmyk into the amount of ink used INK, using the LUT without color correction 128. The subsequent processing is the same as in the first color conversion flow and therefore will not be described further.

Back to FIG. 19, when the result of the determination in step S83 is negative, that is, when the image information includes a CMYK value, the control device 13 in step S88 prints the color-gradient image represented by the image information according to a third color conversion flow.

Figure 22:
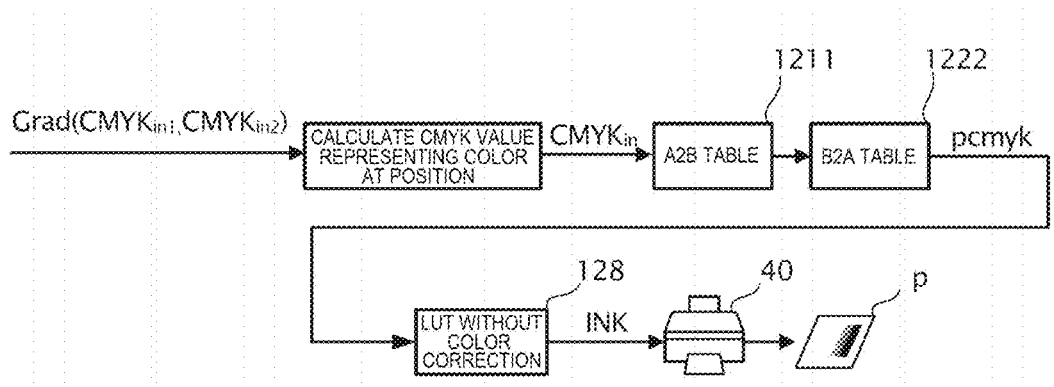
FIG. 22 shows a third color conversion flow.

FIG. 22 shows the third color conversion flow. In the third color conversion flow, the control device 13 calculates the CMYK value $CMYK_{in}$ representing the color at a position in the color-gradient image where the CMYK value is designated, based on the image information Grad($CMYK_{in1}$, $CMYK_{in2}$) and position information representing the position. The control device 13 then converts the CMYK value $CMYK_{in}$ into the Lab value, using the A2B table 1211. The control device 13 then converts the resulting Lab value into the cmyk value pcmyk, using the B2A table 1222. The control device 13 then converts the resulting cmyk value pcmyk into the amount of ink used INK, using the LUT without color correction 128. The subsequent processing is the same as in the first color conversion flow and therefore will not be described further.

After finishing the processing in step S86, step S87, or step S88, the control device 13 ends the series of processing steps shown in FIG. 19.

A.5. Effects of First Embodiment

As described above, in the color conversion table generation system 1, the control device 13 included in the host device 10 includes the acceptance unit 131, the first generation unit 132, the first conversion unit 133, the setting unit 134, the first specification unit 136, the second generation unit 137, the third generation unit 138, and the fourth generation unit 139. The acceptance unit 131 functions as an acceptance step. The first generation unit 132 functions as a first generation step. The first conversion unit 133 functions as a first conversion step. The setting unit 134 functions as a setting step. The first specification unit 136 functions as a specification step. The second generation unit 137 functions as a second generation step. The third generation unit 138 functions as a third generation step. The fourth generation unit 139 functions as a fourth generation step.

To increase the color reproduction accuracy in a color-gradient image where a spot color is designated, the second generation unit 137 adjusts the modified B2A table 1223 but does not adjust the B2A table 1222. Therefore, the control device 13 can increase the color reproduction accuracy by using the color conversion table 126 for a color-gradient image where a spot color is designated, and can maintain the color reproduction accuracy of the entirety of the color space of the profile by not adjusting the B2A table 1222. Thus, even when image information included in a print command includes a CMYK value, the control device 13 can maintain the color reproduction accuracy, based on the B2A table 1222. As the color reproduction accuracy is maintained based on the B2A table 1222, the color reproduction accuracy can also be maintained, for example, for an image designated by a CMYK value. The image designated by a CMYK value is, for example, an image of a natural object such as an animal or plant.

The first generation unit 132 generates one or a plurality of system intermediate points in such a way that a unit rectangular parallelepiped includes one or fewer system intermediate point. Since the number of system intermediate points included in a unit rectangular parallelepiped is 1 or fewer, the control device 13 can accurately adjust the modified B2A table 1223. If a unit rectangular parallelepiped includes a plurality of system intermediate points, the second generation unit 137 needs to adjust the cmyk value of each of the eight grid points GDb so that the adjustment value of each of the plurality of system intermediate points is appropriate. However, there are cases where, due to an increase in the influence of one of the plurality of system intermediate points, the cmyk value of each of the eight grid points GDb cannot be correctly adjusted.

The third generation unit 138 generates a user intermediate point in response to an operation by the user. The system intermediate point generated by the first generation unit 132 may be unnecessary for the user. By registering the user intermediate point Lab value R_Lab into the color conversion table 126, the control device 13 can generate the color conversion table 126 reflecting the user's preference.

According to the first configuration of the second generation unit 137, the adjustment value of the grid point GDb to be a vertex of a unit rectangular parallelepiped including one of the first spot color Lab value SP_Lab1, the second spot color Lab value SP_Lab2, and the system intermediate point Lab value Q_Lab can be adjusted. Therefore, when a user intermediate point is generated in a unit rectangular parallelepiped including one of the first spot color Lab value SP_Lab1, the second spot color Lab value SP_Lab2, and the system intermediate point Lab value Q_Lab on the first line segment, the registered cmyk value pcmyk_R corresponding to this user intermediate point can reflect the adjustment value. There is also a case where a user intermediate point is generated in a unit rectangular parallelepiped next to the unit rectangular parallelepiped having the grid point GDb reflecting the adjustment value, on the first line segment. In this case, when calculating the registered cmyk value pcmyk_R corresponding to this user intermediate point, the control device 13 calculates the registered cmyk value pcmyk by interpolation using the cmyk value of the grid point GDb reflecting the adjustment value. Therefore, even when a user intermediate point is generated in a unit rectangular parallelepiped next to the unit rectangular parallelepiped having the grid point GDb reflecting the adjustment value, the registered cmyk value pcmyk_R corresponding to this user intermediate point can reflect the adjustment value.

According to the second configuration of the second generation unit 137, the adjustment value varies within the adjustment range AR about the first spot color Lab value SP_Lab1, the second spot color Lab value SP_Lab2, and the system intermediate point Lab value Q_Lab. Therefore, even when a user intermediate point is generated at any Lab value on the first line segment, setting an appropriate adjustment range AR enables the adjustment value to be reflected on the registered cmyk value pcmyk_R corresponding to this user intermediate point.

The setting unit 134 sets, as the first adjustment value $\Delta cmyk_{b\_SP1}$, the difference between the optimal cmyk value with which the first printer 40 can output the first spot color, found by search using the result of color measurement by the color measurement device 30 of an output image outputted by the first printer 40 according to the first device-dependent color coordinate value Initcmyk1, and the first device-dependent color coordinate value Initcmyk1.

Thus, the optimal first adjustment value $\Delta cmyk_{b\_SP1}$ taking characteristics of the first printer 40 into account can increase the color reproduction accuracy of a color-gradient image where a spot color is designated.

The third generation unit 138 accepts the number of user intermediate point Lab values R_Lab to be generated, in response to an operation by the user, and generates Lab values in the number representing the user intermediate points equally dividing the first line segment by a number greater than the accepted number by 1, as the user intermediate point Lab values R_Lab.

The number of system intermediate points generated becomes greater as the first spot color Lab value SP_Lab1 and the second spot color Lab value SP_Lab2 become farther apart from each other. In the case of registering the system intermediate point Lab value Q_Lab into the color conversion table 126, the amount of data in the color conversion table 126 becomes larger and the color reproduction accuracy becomes higher as the first spot color Lab value SP_Lab1 and the second spot color Lab value SP_Lab2 becomes farther apart from each other. However, when the user is all right with a certain degree of color reproduction accuracy of the color-gradient image and rather wants to restrain the amount of data in the color conversion table 126, the color conversion table 126 that is different from the user's intention is generated. In the case of registering the system intermediate point Lab value Q_Lab into the color conversion table 126, the amount of data in the color conversion table 126 can be more restrained when the first spot color Lab value SP_Lab1 and the second spot color Lab value SP_Lab2 are closer to each other. However, when the user wants to increase the color reproduction accuracy of the color-gradient image, the color conversion table 126 that is different from the user's intention is generated.

In the first embodiment, the third generation unit 138 generates Lab values in the number representing the user intermediate points, as the user intermediate point Lab values R_Lab. Therefore, the color conversion table 126 meeting the user's intention can be generated.

The first specification unit 136 specifies the adjustment value AD by interpolating the adjustment value AD corresponding to the system intermediate point Lab value Q_Lab, based on the first adjustment value $\Delta cmyk_{b\_SP1}$ corresponding to the first spot color Lab value SP_Lab1 and the second adjustment value $\Delta cmyk_{b\_SP2}$ corresponding to the second spot color Lab value SP_Lab2.

Thus, the first specification unit 136 can specify an appropriate adjustment value AD.

In the first embodiment, at the time of executing the print processing, when image information included in an output command supplied to the first printer 40 represents a color-gradient image where a spot color is designated, the second conversion unit 142 converts the Lab value corresponding to a position in the color-gradient image into the cmyk value pcmyk, using the color conversion table 126. The output control unit 146 causes the first printer 40 to output the color corresponding to the position, according to the cmyk value pcmyk converted by the second conversion unit 142. The second conversion unit 142 functions as a second conversion step. The output control unit 146 functions as an output control step. Thus, in the first embodiment, when printing a color-gradient image where a spot color is designated, the color reproduction accuracy can be increased by using the color conversion table 126.

B. Second Embodiment

The color conversion table generation system 1 in the first embodiment includes the first printer 40. Meanwhile, a color conversion table generation system 1a in a second embodiment has a first printer 40 and a second printer 50 as two printers. In the second embodiment, a method in which a color conversion table 126 generated by the first printer 40 is also used when the second printer 50 prints, will be described.

Hereinafter, the color conversion table generation system 1a according to the second embodiment will be described. In the second embodiment described below, components having effects and functions equivalent to those in the first embodiment are denoted by the foregoing reference signs and detailed description of each of these components is omitted where appropriate.

B.1. Outline of Color Conversion Table Generation System 1a

Figure 23:
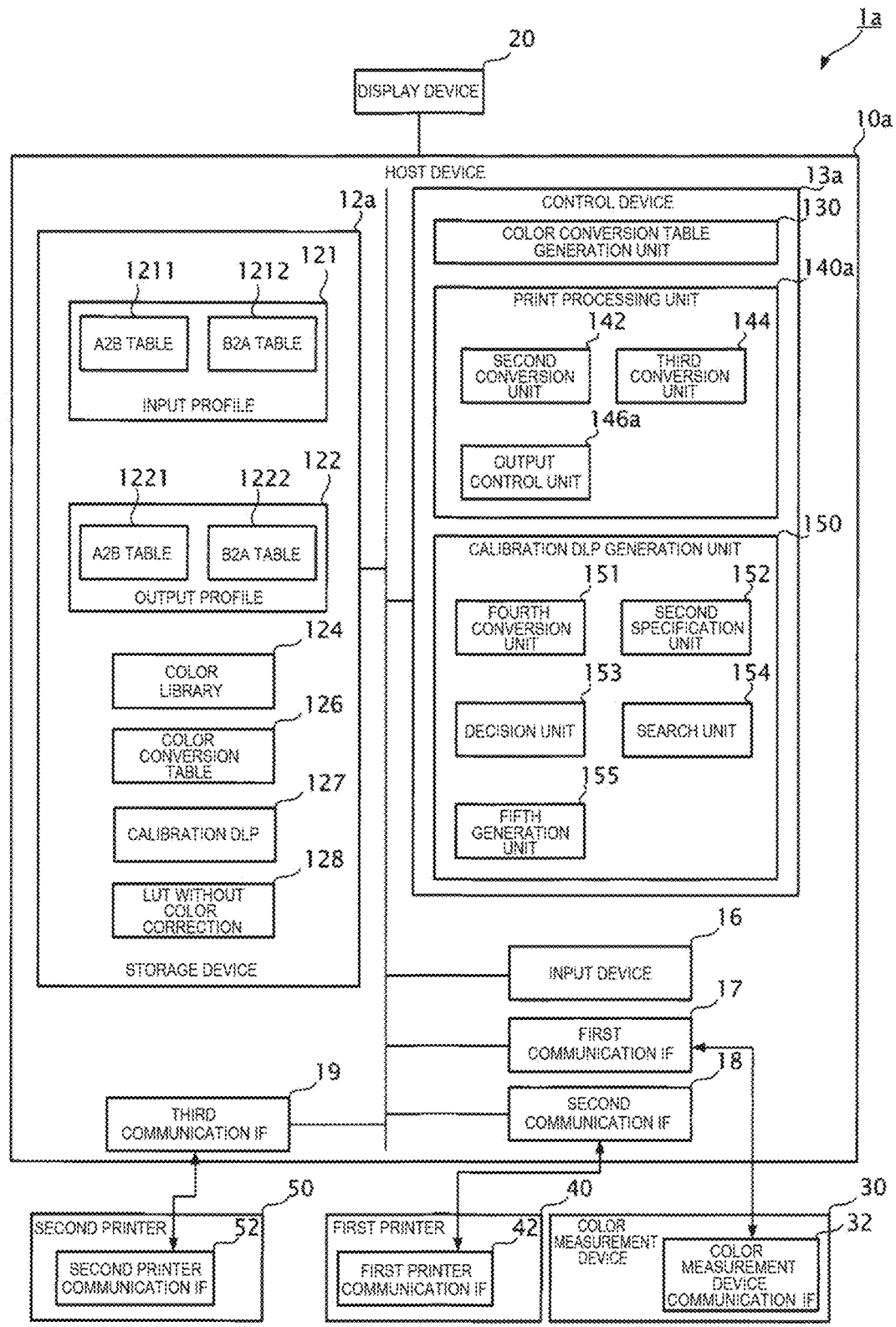

FIG. 23 shows the configuration of the color conversion table generation system 1a. The color conversion table generation system 1a includes a host device 10a, a display device 20, a color measurement device 30, the first printer 40, and the second printer 50. The second printer 50 is an example of a "second output device". The host device 10a can access the display device 20, the color measurement device 30, the first printer 40, and the second printer 50.

The second printer 50 is an inkjet printer having the same functions as the first printer 40. However, each printer has its output characteristics and output characteristic vary from one printer to another. Due to this variation, when the first printer 40 and the second printer 50 print an image expressed by the same cmyk value, the colors of the printed images may be different from each other.

The host device 10a includes a storage device 12a, a control device 13a, an input device 16, a first communication IF 17, a second communication IF 18, and a third communication IF 19. The third communication IF 19 is a device communicating with a second printer communication IF 52 of the second printer 50. The USB or short-range wireless communication standard or the like can be used as the standard of the third communication IF 19 and the second printer communication IF 52. The communication between the third communication IF 19 and the second printer communication IF 52 may be wired or wireless and may be a network communication via a LAN or the internet or the like.

The storage device 12a stores a plurality of programs, various data used by the control device 13a, an input profile 121, an output profile 122, a color library 124, the color conversion table 126, a calibration DLP 127, and a LUT without color correction 128. DLP is an abbreviation for device link profile. The calibration DLP 127 is an example of "calibration color conversion information".

FIG. 24 shows the calibration DLP 127. The calibration DLP 127 shows the correspondence between a cmyk value cmyk0 and a correction value that causes the color of an image printed by the second printer 50 according to this cmyk value cmyk0 to be closer to the color of an image printed by the first printer 40. For example, there are two configurations for the correction value.

According to a first configuration, the correction value is a cmyk value cmyk1 that enables the second printer 50 to print the image in the color closer to the color of the image printed by the first printer 40. According to a second configuration, the correction value is the difference between the cmyk value cmyk1 and the cmyk value cmyk0. In the description below, the correction value is of the first configuration. The cmyk value cmyk0 is referred to as an "input cmyk value cmyk0". The cmyk value cmyk1 is referred to as a "correction cmyk value cmyk1".

The calibration DLP 127 shown in FIG. 24 shows the correction cmyk value cmyk1 at N5 grid points in the cmyk color space CSD. N5 is an integer equal to or greater than 1.

B.2. Configuration of Second Embodiment

Back to FIG. 23, the control device 13a reads and executes a program from the storage device 12a and thus functions as a color conversion table generation unit 130, a print processing unit 140a, and a calibration DLP generation unit 150. The print processing unit 140a includes a second conversion unit 142, a third conversion unit 144, and an output control unit 146a. The calibration DLP generation unit 150 includes a fourth conversion unit 151, a second specification unit 152, a decision unit 153, a search unit 154, and a fifth generation unit 155. The calibration DLP generation unit 150 and the print processing unit 140a will now be described with reference to FIG. 25.

Figure 25:
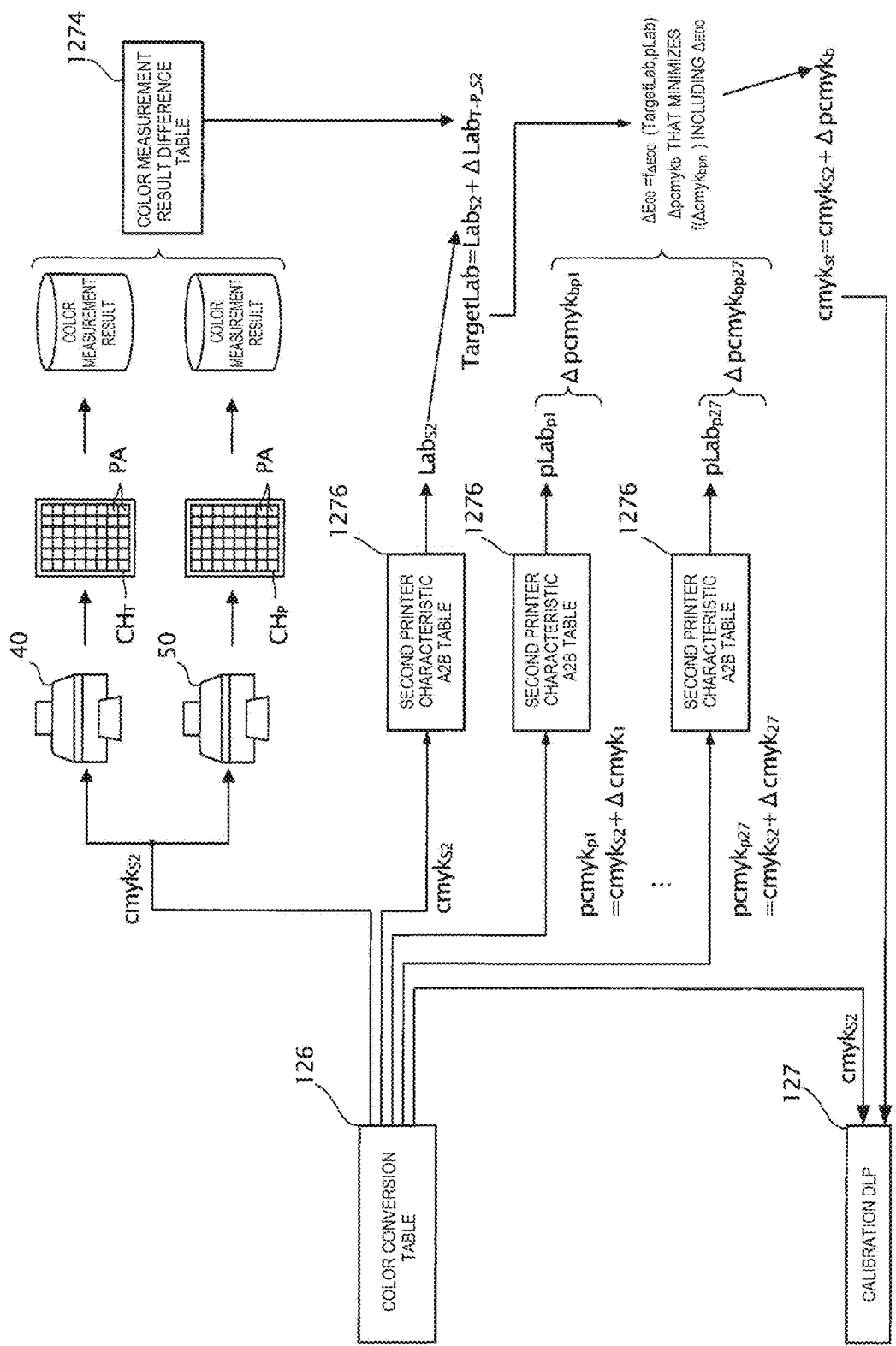
FIG. 25 shows an outline of the generation of the calibration DLP 127.

FIG. 25 shows an outline of the generation of the calibration DLP 127. The control device 13a causes the first printer 40 to print a color chart $CH_T$, which is an image where color patches PA are arranged, according to an adjustment target cmyk value $cmyk_{S2}$ registered in the color conversion table 126. The number of color patches PA coincides with the number of adjustment target cmyk values $cmyk_{S2}$. Similarly, the control device 13a causes the second printer 50 to print a color chart $CH_P$, which is an image where color patches PA are arranged, according to the adjustment target cmyk value $cmyk_{S2}$. In this way, the control device 13a causes the first printer 40 and the second printer 50 to print the same adjustment target cmyk value $cmyk_{S2}$. However, since the first printer 40 and the second printer 50 are different from each other in output characteristics as described above, the color chart $CH_T$ and the color chart $CH_P$ are different images from each other.

The fourth conversion unit 151 converts the adjustment target cmyk value $cmyk_{S2}$ into an adjustment target Lab value $Lab_{S2}$ in the Lab color space CSI, using a second printer characteristic A2B table 1276.

FIG. 26 shows an example of the second printer characteristic A2B table 1276. The second printer characteristic A2B table 1276 shows the correspondence between a cmyk value ccmyk corresponding to a color patch in an ECI chart in the cmyk color space CSD and a measured color value $cLab_{ECI\_P}$ representing the result of color measurement in the Lab color space CSI resulting from measuring the color of the ECI chart outputted from the second printer 50. ECI is an abbreviation for European Color Initiative. The second printer characteristic A2B table 1276 shows the Lab values at N6 grid points in the cmyk color space CSD. N6 is an integer equal to or greater than 1. N6 is the number of color patches in the ECI chart. Normally, the grid points in the second printer characteristic A2B table 1276 are arranged with a substantially equal space along the c-axis, the m-axis, the y-axis, and the k-axis in the cmyk color space CSD.

Back to FIG. 25, the second specification unit 152 specifies a measured color value difference $\Delta Lab_{T\text{-}P\_S2}$ corresponding to the adjustment target Lab value $Lab_{S2}$, using a color measurement result difference table 1274.

FIG. 27 shows an example of the color measurement result difference table 1274. The color measurement result difference table 1274 shows the correspondence between a measured color value $cLab_P$ and a measured color value difference $\Delta cLab_{T\text{-}P}$. The measured color value $cLab_P$ represents the result of color measurement of the color chart $CH_P$ printed by the second printer 50. The measured color value difference $\Delta cLab_{T\text{-}P}$ is a value resulting from subtracting the measured color value $cLab_P$ from a measured color value $cLab_T$. The measured color value $cLab_T$ represents the result of color measurement of the color chart $CH_T$ printed by the first printer 40. The measured color value difference $\Delta cLab_{T\text{-}P}$ has $\Delta L$, $\Delta a$, and $\Delta b$. In the color measurement result difference table 1274, N7 records are registered, corresponding to the number of color patches PA. For example, in a j-th record, $L_j$, $a_j$, and $b_j$ are registered as the measured color value $cLab_P$ corresponding to a j-th color patch PA, and $(\Delta L_{T\text{-}P})_j$, $(\Delta a_{T\text{-}P})_j$, and $(\Delta b_{T\text{-}P})_j$ are registered as the measured color value difference $\Delta cLab_{T\text{-}P}$ corresponding to the j-th color patch PA. j is an integer equal to or greater than 1 and equal to or smaller than N7.

Since the same Lab value as the adjustment target Lab value $Lab_{S2}$ is registered in the color measurement result difference table 1274, the second specification unit 152 specifies the measured color value difference $\Delta cLab_{T\text{-}P}$ corresponding to the registered Lab value, as a measured color value difference $\Delta cLab_{T\text{-}PS2}$.

Back to FIG. 25, the decision unit 153 decides the target Lab value TargetLab in the Lab color space CSI, based on the adjustment target Lab value $Lab_{S2}$ and the measured color value difference $\Delta Lab_{T\text{-}P\_S2}$. For example, the decision unit 153 decides a value resulting from adding the measured color value difference $\Delta Lab_{T\text{-}P\_S2}$ to the adjustment target Lab value $Lab_{S2}$, as the target Lab value TargetLab in the Lab color space CSI.

The measured color value difference may be a value resulting from subtracting the measured color value $cLab_T$ from the measured color value $cLab_P$. In this case, the decision unit 153 decides a value resulting from subtracting the measured color value difference corresponding to the adjustment target Lab value $Lab_{S2}$ from the adjustment target Lab value $Lab_{S2}$, as the target Lab value TargetLab.

The search unit 154 searches for, as an optimal cmyk value $cmyk_{st}$, a provisional cmyk value $pcmyk_p$ satisfying the condition that the color difference $\Delta E_{00}$ between a provisional Lab value $pLab_p$ in the Lab color space CSI converted from a provisional cmyk value $pcmyk_p$ in the cmyk color space CSD, using the second printer characteristic A2B table 1276, and the target Lab value TargetLab, is smaller than the color difference $\Delta E00$ between the adjustment target Lab value $Lab_{S2}$ and the target Lab value TargetLab.

As a specific method for searching for the optimal cmyk value $cmyk_{st}$, the same method as the method for searching the optimal cmyk value $cmyk_{st}$ in the first embodiment can be employed.

FIG. 25 shows that the search unit 154 solves the optimization problem, using each of the first to $27^{th}$ provisional cmyk values $pcmyk_{p1}$ to $pcmyk_{p27}$ as the initial value. The first provisional cmyk value $pcmyk_{p1}$ can be expressed as a value resulting from adding an initial value $\Delta cmyk_1$ to the adjustment target cmyk value $cmyk_{S2}$. Similarly, the $27^{th}$ provisional cmyk value $pcmyk_{p27}$ can be expressed as a value resulting from adding an initial value $\Delta cmyk_{27}$ to the adjustment target cmyk value $cmyk_{S2}$.

A first provisional Lab value $pLab_{p1}$ and a $27^{th}$ provisional Lab value $pLab_{p27}$ shown in FIG. 25 are values resulting from converting the first provisional cmyk value $pcmyk_{p1}$ and the $27^{th}$ provisional cmyk value $pcmyk_{p27}$, respectively, using the second printer characteristic A2B table 1276.

As shown in FIG. 25, the search unit 154 solves the optimization problem, using the first to $27^{th}$ provisional cmyk values $pcmyk_{p1}$ to $pcmyk_{p27}$ as the initial value and thus acquires optimal candidate solutions $\Delta cmyk_{pb1}$ to $\Delta cmyk_p b27$. Next, the search unit 154 specifies an optimal solution $\Delta pcmyk_b$ that minimizes the cost function $f(\Delta cmyk_{pbn})$, from among the optimal candidate solutions $\Delta cmyk_{pb1}$ to $\Delta cmyk_{pb27}$, and specifies a value resulting from adding the optimal solution $\Delta pcmyk_b$ to the adjustment target Lab value $Lab_{S2}$, as the optimal cmyk value $cmyk_{st}$. n is a value from 1 to 27.

The fifth generation unit 155 generates the calibration DLP 127, based on the adjustment target cmyk value $cmyk_{S2}$ and the optimal cmyk value $cmyk_{st}$. For example, the fifth generation unit 155 stores the adjustment target cmyk value $cmyk_{S2}$ as corresponding to the optimal cmyk value $cmyk_{st}$ into the calibration DLP 127. When an adjustment is made only with the adjustment target cmyk value $cmyk_{S2}$, color banding occurs in the peripheries of the adjustment target cmyk value $cmyk_{S2}$. Therefore, the fifth generation unit 155 adjusts the correction cmyk value $cmyk_1$ for the input cmyk value cmyk0 in the peripheries of the adjustment target cmyk value $cmyk_{S2}$.

Back to FIG. 23, when image information representing a print target image outputted from the second printer 50 includes a Lab value or a spot color name, the third conversion unit 144 converts the cmyk value converted from the Lab value corresponding to a position in a color-gradient image, converted by the second conversion unit 142, into the correction cmyk value $cmyk_1$, using the calibration DLP 127. The output control unit 146a causes the second printer 50 to print the color at the position, according to the correction cmyk value $cmyk_1$ converted by the third conversion unit 144.

In the second embodiment, when causing the first printer 40 to output an image, the control device 13a cause the first printer 40 to print the color at the position, according to the cmyk value converted by the second conversion unit 142 without using the calibration DLP 127, as described in the first embodiment.

Figure 28:
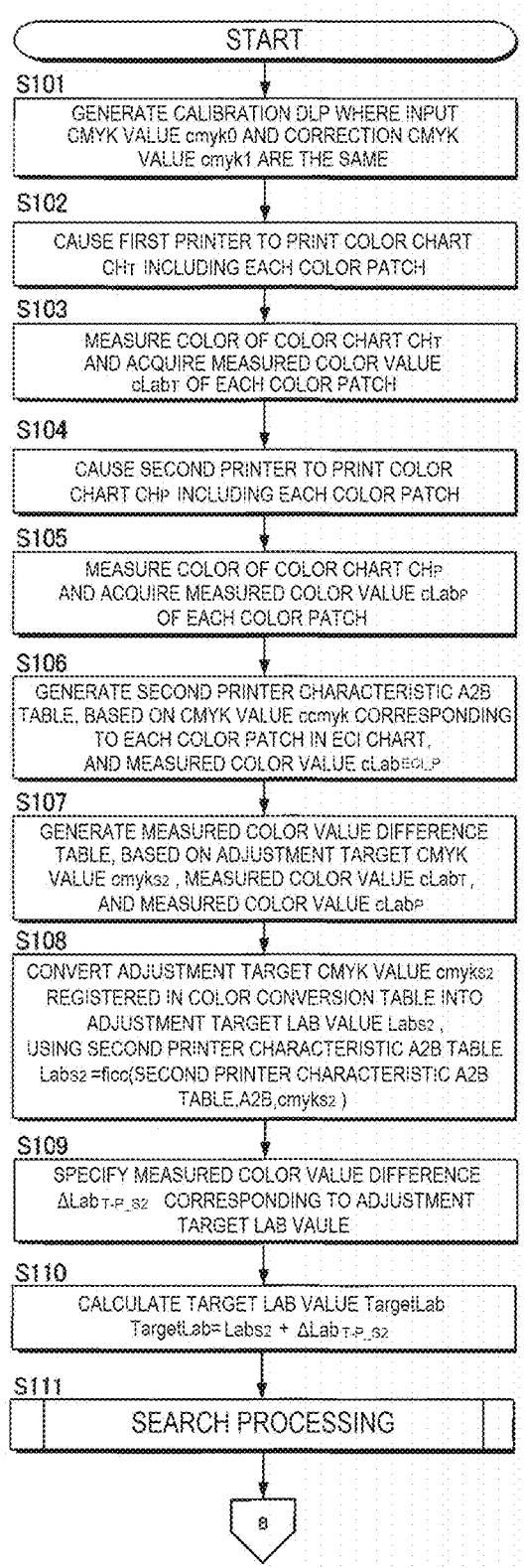
FIG. 28 is a flowchart showing calibration DLP generation processing.
Figure 29:
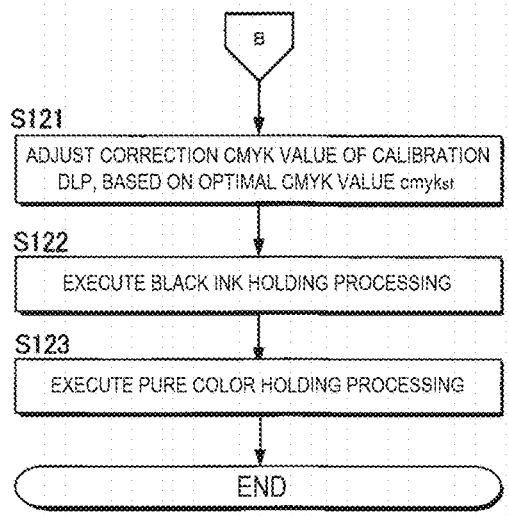
FIG. 29 is a flowchart showing the calibration DLP generation processing.

B.3. Operation of Color Conversion Table Generation System 1a when Executing Calibration DLP Generation Processing FIGS. 28 and 29 are flowcharts showing the calibration DLP generation processing. In step S101, the control device 13a generates the calibration DLP 127 where the input cmyk value cmyk0 and the correction cmyk value $cmyk_1$ are the same. Next, in step S102, the control device 13a causes the first printer 40 to print the color chart $CH_T$ including each color patch PA according to the adjustment target cmyk value $cmyk_{S2}$ registered in the color conversion table 126. In step S103, the color measurement device 30 measures the color of the color chart $CH_T$ printed by the first printer 40, and the control device 13a acquires the measured color value $cLab_T$ of each color patch PA from the color measurement device 30.

In step S104, the control device 13a causes the second printer 50 to print the color chart $CH_P$ including each color patch PA according to the adjustment target cmyk value $cmyk_{S2}$ registered in the color conversion table 126. In step S105, the color measurement device 30 measures the color of the color chart $CH_P$, and the control device 13a acquires the measured color value $cLab_P$ of each color patch PA.

Next, in step S106, the control device 13a generates the second printer characteristic A2B table 1276, based on the cmyk value ccmyk corresponding to the color patch in the ECI chart, and the measured color value $cLab_{ECI\_P}$ of each color patch printed by the second printer 50 according to the cmyk value ccmyk. As a specific generation method, the control device 13a substitutes the cmyk value ccmyk for the cmyk value in the second printer characteristic A2B table 1276. The control device 13a also establishes a correspondence between the measured color value $cLab_{ECI\_P}$ representing the result of color measurement of the ECI chart printed by the second printer 50 according to the cmyk value ccmyk, and the substituted cmyk value ccmyk. Specifically, the control device 13a substitutes the measured color value $cLab_{ECI\_P}$ for the Lab value in the same record as the substituted cmyk value ccmyk, in the second printer characteristic A2B table 1276.

In step S107, the control device 13a generates the color measurement result difference table 1274, based on the adjustment target cmyk value $cmyk_{S2}$, the measured color value $cLab_T$, and the measured color value $cLab_P$. As a specific generation method, the control device 13a substitutes the measured color value $cLab_P$ representing the result of color measurement of the color chart $CH_P$ printed by the first printer 40 according to a certain adjustment target cmyk value, for the Lab value in the color measurement result difference table 1274. The control device 13a also subtracts the substituted measured color value $cLab_P$ from the measured color value $cLab_T$ representing the result of color measurement of the color chart $CH_T$ printed by the first printer 40 according to a certain cmyk value, and thus calculates the measured color value difference $\Delta cLab_{T\_P}$. The control device 13a then establishes a correspondence between the measured color value difference $\Delta cLab_{T\_P}$ and the substituted Lab value. Specifically, the control device 13a substitutes the measured color value difference $\Delta cLab_{T\_P}$ for the $\Delta cLab$ value in the same record as the substituted Lab value, in the color measurement result difference table 1274.

Next, in step S108, the control device 13a converts the adjustment target cmyk value $cmyk_{S2}$ registered in the color conversion table 126 into the adjustment target Lab value $Lab_{S2}$, using the second printer characteristic A2B table 1276. The processing in step S108 can also be expressed by the following equation.

$Lab_{S2}=ficc(\text{second printer characteristic } A2B \text{ table } 1276, A2B, cmyk_{S2})$ In step S109, the control device 13a specifies the measured color value difference $\Delta cLab_{T\_P\_S2}$ corresponding to the adjustment target Lab value $Lab_{S2}$, referring to the color measurement result difference table 1274.

Next, in step S110, the control device 13a adds the measured color value difference $\Delta cLab_{T\_PS2}$ to the adjustment target Lab value $Lab_{S2}$ and thus calculates the target Lab value TargetLab. The processing in step S110 can also be expressed by the following equation.

$TargetLab=Lab_{S2}+\Delta cLab_{T\_P\_S2}$

In step S111, the control device 13a executes search processing in the second embodiment. The search processing in the second embodiment will now be described with reference to FIG. 30.

Figure 30:
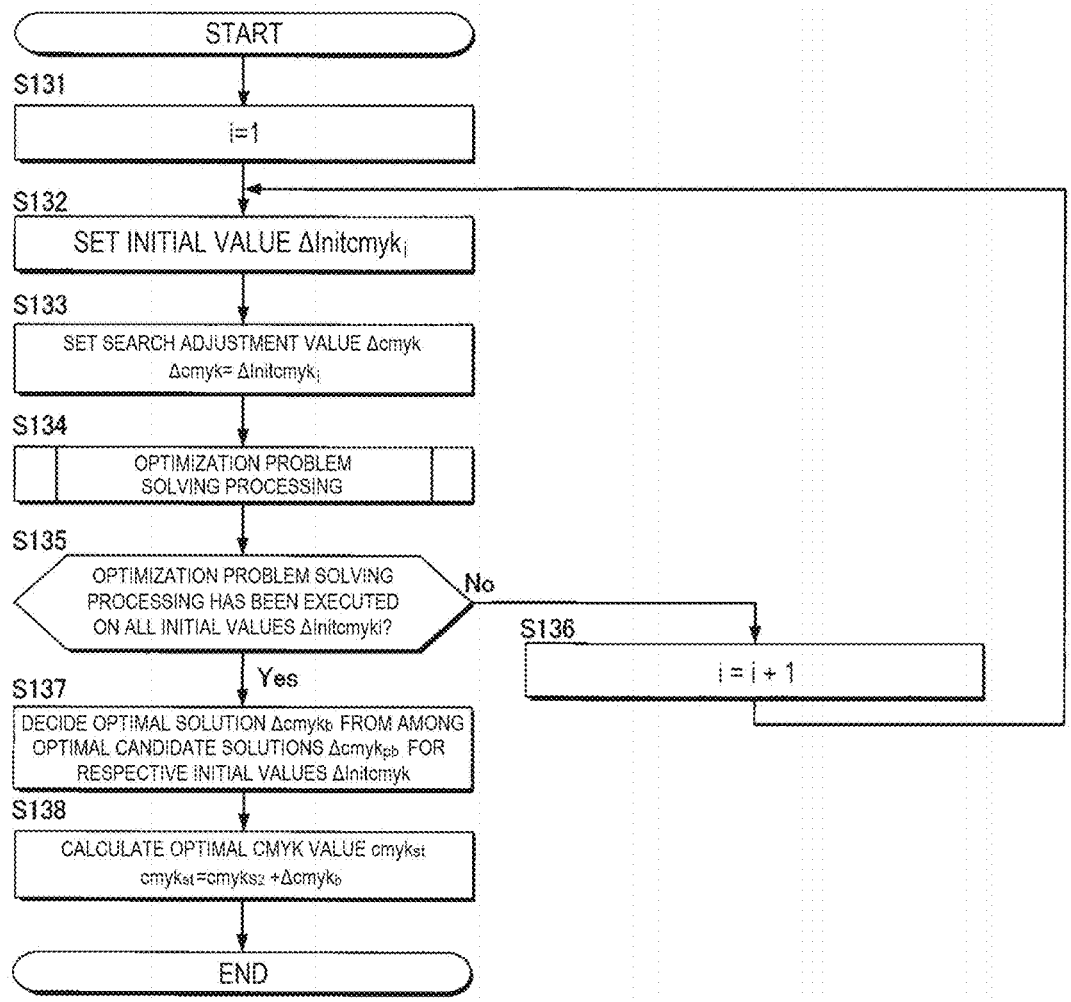
FIG. 30 is a flowchart showing search processing in a second embodiment.

FIG. 30 is a flowchart showing the search processing in the second embodiment. The search processing in the second embodiment is substantially the same as the search processing in the first embodiment. Hereinafter, only the difference from the search processing in the first embodiment will be described.

In step S134, the control device 13a executes optimization problem solving processing. The optimization problem solving processing will now be described with reference to FIG. 31.

Figure 31:
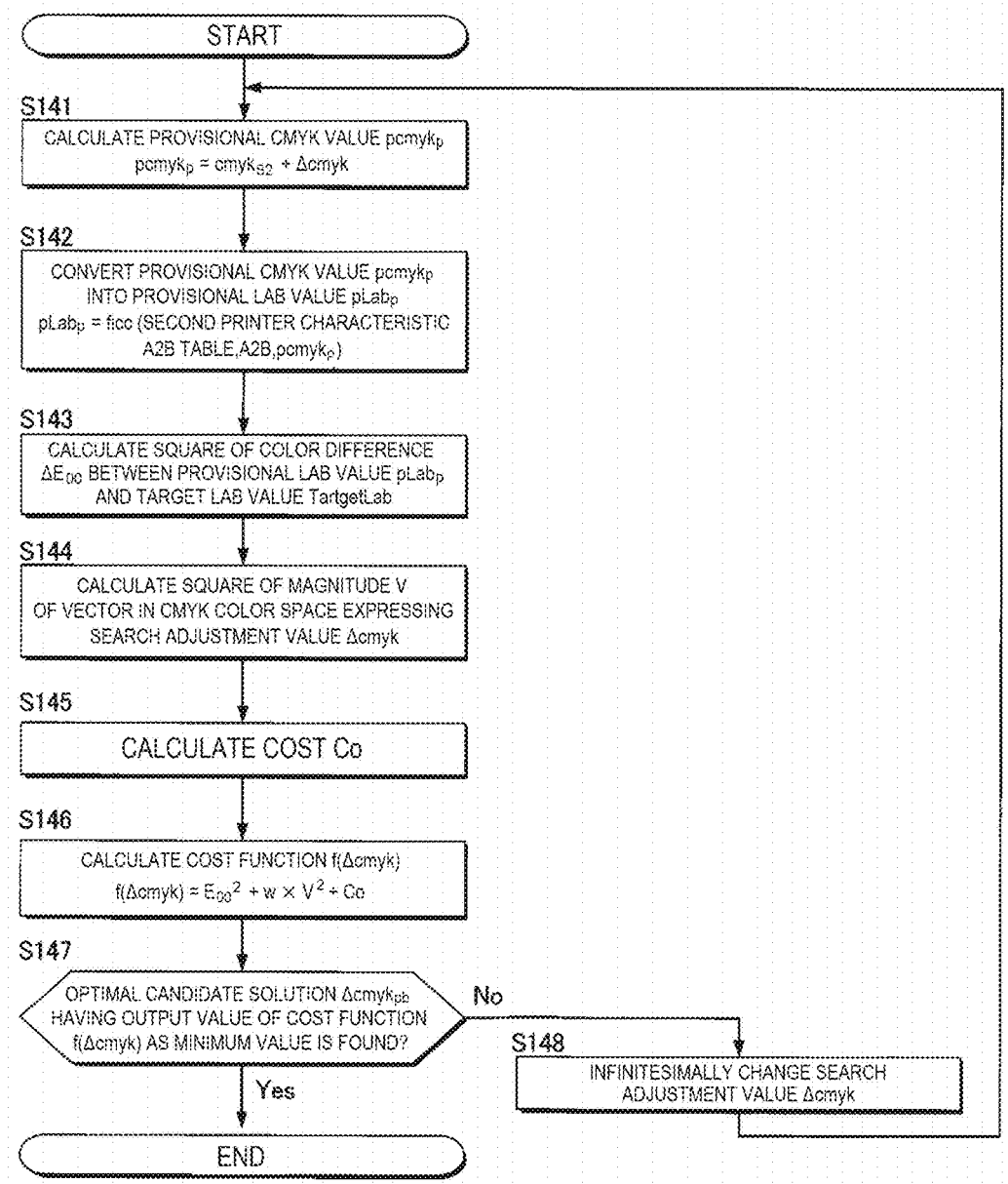
FIG. 31 is a flowchart showing optimization problem solving processing in the second embodiment.

FIG. 31 is a flowchart showing the optimization problem solving processing in the second embodiment. The optimization problem solving processing in the second embodiment is substantially the same as the optimization problem solving processing in the first embodiment. Hereinafter, only the difference from the optimization problem solving processing in the first embodiment will be described.

In step S141, the control device 13a adds the search adjustment value $\Delta cmyk$ to the adjustment target cmyk value $cmyk_{S2}$ and thus calculates the provisional cmyk value $pcmyk_p$. The processing in step S141 can also be expressed by the following equation.

$pcmyk_p=cmyk_{S2}+\Delta cmyk$

In step S142, the control device 13a converts the provisional cmyk value $pcmyk_p$ into the provisional Lab value $pLab_p$, using the second printer characteristic A2B table 1276. The processing in step S142 can also be expressed by the following equation.

$pLab_p=ficc(\text{second printer characteristic } A2B \text{ table } 1276, A2B, pcmyk_p)$ When the result of the determination in step S147 is positive, the control device 13a ends the series of processing steps shown in FIG. 31 and executes the processing in step S135.

Back to FIG. 30, in step S138, the control device 13a adds the optimal solution $\Delta cmyk_b$ to the adjustment target cmyk value $cmyk_{S2}$ and thus calculates the optimal cmyk value $cmyk_{st}$. The processing in step S138 can also be expressed by the following equation.

$cmyk_{st}=cmyk_{S2}+\Delta cmyk_b$

After finishing the processing in step S138, the control device 13a ends the series of processing steps shown in FIG. 30 and executes the processing in step S121 shown in FIG. 29.

Back to FIG. 29, in step S121, the control device 13a adjusts the correction cmyk value cmyk1 of the calibration DLP 127, based on the optimal cmyk value $cmyk_{st}$. There are two configurations as specific adjustment methods.

According to a first configuration, the control device 13a employs, as adjustment targets, correction cmyk values cmyk1 corresponding to input cmyk values cmyk0 that are 16 neighboring grid points as the respective vertices of a multidimensional hypercube including the optimal cmyk value $cmyk_{st}$, of the input cmyk values cmyk0 of the calibration DLP 127. For example, the control device 13a expresses the respective components of an i-th correction cmyk value cmyk1 of the 16 correction cmyk values cmyk1 as adjustment targets, as $c1_i$, $m1_i$, $y1_i$, and $k1_i$, and expresses the respective components of the optimal cmyk value $cmyk_{st}$ as cTarget, mTarget, yTarget, and kTarget. i is an integer from 1 to 16. The control device 13a adjusts the correction cmyk value cmyk1 of the calibration DLP 127 in the following manner.

$c1_i = c\text{Target}$ $m1_i = m\text{Target}$ $y1_i = y\text{Target}$ $k1_i = k\text{Target}$ According to a second configuration, the control device 13a, after making the adjustment according to the first configuration, performs smoothing processing to smooth the respective correction cmyk values cmyk1 of the calibration DLP 127 with respect to each other, and adjusts again the correction cmyk value cmyk1 of the calibration DLP 127, based on the optimal solution smoothed by the smoothing processing. The smoothing processing is, for example, interpolation processing with a four-dimensional cubic spline function.

In step S122, the control device 13a executes black ink holding processing. The black ink holding processing is processing to hold the amount of black ink used, in order to restrain the lumpiness of ink dots or the like. Specifically, in the black ink holding processing, when k0 of the input cmyk value cmyk0 of the calibration DLP 127 is greater than 0, k1 of the correction cmyk value cmyk1 is adjusted to be greater than 0, and when k0 of the input cmyk value cmyk0 is 0, k1 of the correction cmyk value cmyk1 is adjusted to be 0.

Next, in step S123, the control device 13a executes pure color holding processing. The pure color holding processing is processing to cause the correction cmyk value $cmyk_1$ to be the same pure color as the input cmyk value cmyk0 when the input cmyk value cmyk0 of the calibration DLP 127 represents cyan, magenta, or yellow. The pure color means a color with no ink mixture. As a specific example, when the input cmyk value $cmyk0_i$ represents cyan, $c0_i$ of the input cmyk value $cmyk0_i$ is greater than 0, and $m0_i$, $y0_i$, and $k0_i$ are 0. In the pure color holding processing, $c1_i$ of the correction cmyk value $cmyk1_i$ is adjusted to be greater than 0, and $m1_i$, $y1_i$, and $k1_i$ are adjusted to be 0.

After finishing the processing in step S123, the control device 13a ends the series of processing steps shown in FIGS. 28 and 29.

B.4. Operation of Color Conversion Table Generation System 1a when Executing Print Processing The operation at the time of executing print processing in the second embodiment is different from the operation at the time of executing print processing in the first embodiment, only in that the calibration DLP 127 is used when the second printer 50 prints in the first color conversion flow, the second color conversion flow, and the third color conversion flow. Therefore, the description and illustration of a flowchart showing the operation at the time of executing print processing in the second embodiment are omitted, and the first color conversion flow, the second color conversion flow, and the third color conversion flow in the second embodiment will be described below.

Figure 32:
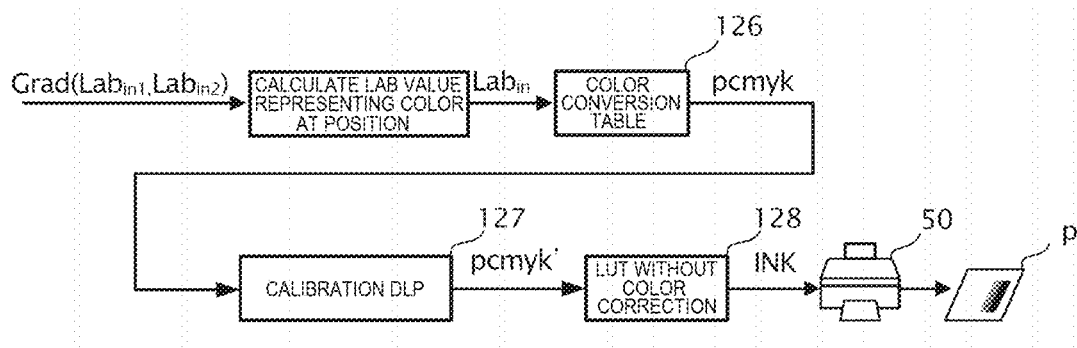
FIG. 32 shows a first color conversion flow in the second embodiment.

FIG. 32 shows the first color conversion flow in the second embodiment. In the first color conversion flow, the control device 13a calculates the Lab value $Lab_{in}$ representing the color at a position in the color-gradient image, based on the image information $Grad(Lab_{in1}, Lab_{in2})$ and position information representing the position. The control device 13a then converts the Lab value $Lab_{in}$ into the registered cmyk value pcmyk, using the color conversion table 126. The control device 13a then converts the resulting registered cmyk value pcmyk into the correction cmyk value pcmyk' corresponding to the output characteristics of the second printer 50, using the calibration DLP 127. The control device 13a then converts the correction cmyk value pcmyk' into the amount of ink used INK, using the LUT without color correction 128. The subsequent processing is the same as in the first color conversion flow in the first embodiment and therefore will not be described further.

Figure 33:
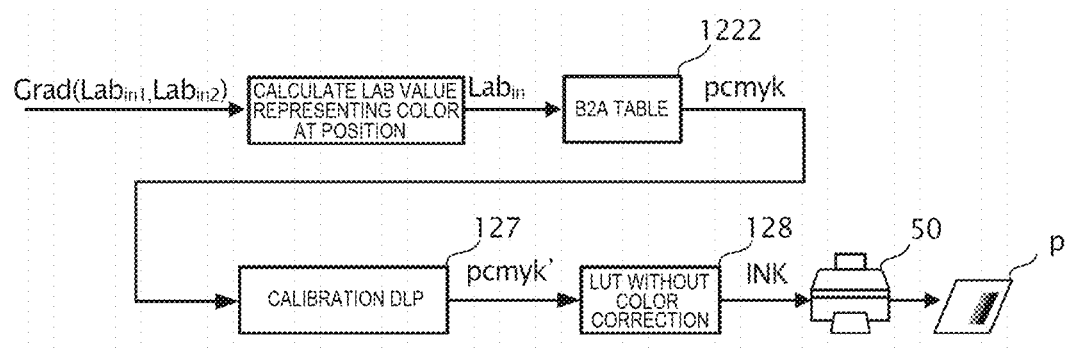
FIG. 33 shows a second color conversion flow in the second embodiment.

FIG. 33 shows the second color conversion flow in the second embodiment. In the second color conversion flow, the control device 13a calculates the Lab value $Lab_{in}$ representing the color at a position in the color-gradient image, based on the image information $Grad(Lab_{in1}, Lab_{in2})$ and position information representing the position. The control device 13a then converts the Lab value Labia into the cmyk value pcmyk, using the B2A table 1222. The control device 13a then converts the resulting cmyk value pcmyk into the correction cmyk value pcmyk' corresponding to the output characteristics of the second printer 50, using the calibration DLP 127. The control device 13a then converts the correction cmyk value pcmyk' into the amount of ink used INK, using the LUT without color correction 128. The subsequent processing is the same as in the second color conversion flow in the first embodiment and therefore will not be described further.

Figure 34:
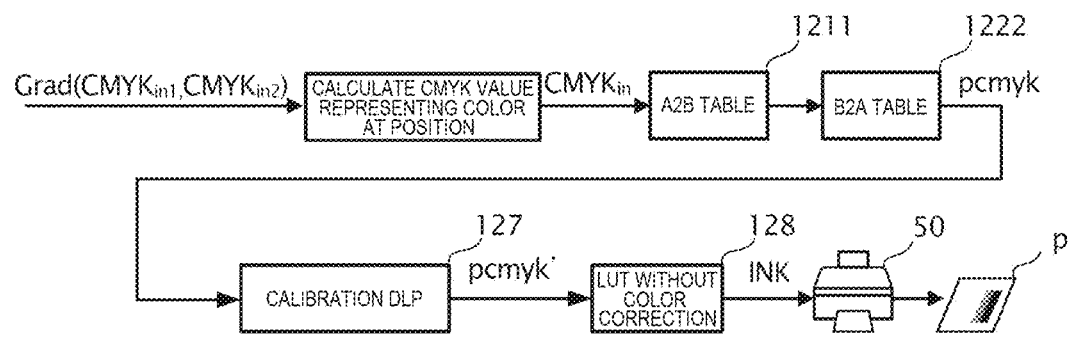
FIG. 34 shows a third color conversion flow in the second embodiment.

FIG. 34 shows the third color conversion flow in the second embodiment. In the third color conversion flow, the control device 13a calculates the CMYK value $CMYK_{in}$ representing the color at a position in the color-gradient image, based on the image information $Grad(CMYK_{in1}, CMYK_{in2})$ and position information representing the position. The control device 13a then converts the resulting CMYK value $CMYK_{in}$ into the Lab value, using the A2B table 1211. The control device 13a then converts the resulting Lab value into the cmyk value pcmyk, using the B2A table 1222. The control device 13a then converts the resulting cmyk value pcmyk into the correction cmyk value pcmyk' corresponding to the output characteristics of the second printer 50, using the calibration DLP 127. The control device 13a then converts the correction cmyk value pcmyk' into the amount of ink used INK, using the LUT without color correction 128. The subsequent processing is the same as in the third color conversion flow in the first embodiment and therefore will not be described further.

B.5. Effects of Second Embodiment

As described above, when an output command including image information representing a color-gradient image where a spot color is designated is supplied to the second printer 50, the cmyk value converted from the Lab value corresponding to the position in the color-gradient image by the second conversion unit 142 is converted into the correction cmyk value cmyk1. The output control unit 146a causes the second printer 50 to print the color corresponding to the position, according to the correction cmyk value cmyk1 converted by the third conversion unit 144. The third conversion unit 144 functions as a third conversion step. It can also be said that the color conversion table 126 is shared by the first printer 40 and the second printer 50. In this way, even in a color conversion information generation system having a plurality of printers, the color conversion table 126 need not be generated for every printer. Also, since the calibration DLP 127 is used when causing the second printer 50 to print a color-gradient image, a color-gradient image corresponding to the output characteristics of the second printer 50 is printed. Therefore, when the second printer 50 prints a color-gradient image where a spot color is designated, the color reproduction accuracy of the color-gradient image can be increased without having the color conversion table 126 for the second printer 50.

The calibration DLP 127 is a multidimensional LUT as shown in FIG. 24. Therefore, when the cmyk value converted by the second conversion unit 142 represents a mixture color of all of c, m, y, and k, the color reproduction accuracy can be made higher than in the case where a one-dimensional LUT is used.

The control device 13a functions as the fourth conversion unit 151, the second specification unit 152, the decision unit 153, the search unit 154, and the fifth generation unit 155. The fifth generation unit 155 generates the calibration DLP 127 showing the correspondence between the input cmyk value cmyk0 and the correction cmyk value cmyk1 that causes the color of the image printed by the second printer 50 according to the input cmyk value cmyk0 to be closer to the color of the image printed by the first printer 40. Using the generated calibration DLP 127 when executing the print processing can increase the color reproduction accuracy of a color-gradient image where a spot color is designated, when the second printer 50 prints the color-gradient image.

C. Modification Examples

The embodiments can be modified in various ways. Specific modification examples will be described below. Two or more modifications arbitrarily selected from among the modification examples below can be suitably combined together, provided that these modifications do not contradict each other. Components in the modification examples below having effects and functions equivalent to those in the embodiments are denoted by the foregoing reference signs and detailed description of the respective components is omitted.

C.1. First Modification Example

In the first and second embodiments, in order to simplify the description, it is assumed that the input profile 121 and the output profile 122 have only a color conversion table for the CMYK color space as a device-dependent color space. However, this is not limiting. For example, the input profile 121 may have an A2B table used to convert an RGB value into a Lab value, instead of or in addition to the A2B table 1211. Similarly, the output profile 122 may have a B2A table used to convert a Lab value into an RGB value, instead of the B2A table 1222. The output profile 122 may also have an A2B table used to convert an RGB value into a Lab value, instead of or in addition to the A2B table 1221. The RGB value can have a value equal to 0 or greater and 255 or smaller.

On the assumption that the input profile 121 has the A2B table 1211 and the A2B table used to convert an RGB value into a Lab value, when the result of the determination in step S83 is negative, the control device 13 determines whether the image information includes a CMYK value or an RGB value. When the image information includes a CMYK value, the control device 13 calculates a CMYK value $CMYK_{in}$ representing the color at a position in the color-gradient image where the CMYK value is designated, based on the image information $Grad(CMYK_{in1}, CMYK_{in2})$ and position information representing the position, as shown in FIG. 22.

Meanwhile, when the image information includes an RGB value, the control device 13 calculates an RGB value $RGB_{in}$ representing the color at a position in the color-gradient image where the RGB value is designated, based on the image information $Grad(RGB_{in1}, RGB_{in2})$ and position information representing the position. The control device 13 then converts the RGB value $RGB_{in}$ into the Lab value, using the A2B table used to convert the RGB value into the Lab value.

When the output profile 122 has the A2B table and the B2A table for the RGB value, the cost Co in steps S65 and S145 is a constant that makes an adjustment in such a way that a provisional RGB value satisfies the condition that the range of values available to each component of the RGB value is 0 or greater and 255 or smaller. The control device 13 calculates the cost Co according to the following formulae, where the respective components of the provisional RGB value are ($R_{pp}$, $G_{pp}$, $B_{pp}$).

when $R_{pp}<0$, $Co=-R_{pp}\times C_{co}$ when $R_{pp}>255$, $Co=(R_{pp}-255)\times C_{co}$ when $G_{pp}<0$, $Co=-G_{pp}\times C_{co}$ when $G_{pp}>255$, $Co=(G_{pp}-255)\times C_{co}$ when $B_{pp}<0$, $Co=-B_{pp}\times C_{co}$ when $B_{pp}>255$, $Co=(B_{pp}-255)\times C_{co}$ otherwise, $Co=0$ The coefficient $C_{co}$ is a positive number and is preferably approximately $10^3$ or greater and $10^9$ or smaller, which is sufficiently greater than the range of 0 or greater and 255 or smaller available to each component of the RGB value. When the output profile 122 has the A2B table and the B2A table for the RGB value instead of the A2B table 1221 and the B2A table 1222, the RGB color space is an example of the "second color space".

C.2. Second Modification Example

In the second embodiment, when the image information included in the print command supplied to the second printer 50 includes the Lab value corresponding to the spot color, the second conversion unit 142 may convert the Lab value corresponding to the position in the color-gradient image into the cmyk value, using the color conversion table 126, and the second printer 50 may be made to output the color at the position according to the cmyk value converted by the second conversion unit 142. In other words, the control device 13a may cause the second printer 50 to output the color at the position, without using the calibration DLP 127. For example, when the output characteristics of the first printer 40 and the second printer 50 are not largely different from each other, the second modification example may be employed. Thus, when the output characteristics of the first printer 40 and the second printer 50 are not largely different from each other, the color reproduction accuracy can be increased when the second printer 50 prints a color-gradient image where a spot color is designated.

C.3. Third Modification Example

In the color conversion table 126 in the first embodiment, the first spot color Lab value SP_Lab1, the second spot color Lab value SP_Lab2, and the user intermediate point Lab value R_Lab are registered. However, in the color conversion table 126, the first spot color name may be registered instead of the first spot color Lab value SP_Lab1, the second spot color name may be registered instead of the second spot color Lab value SP_Lab2, and a character string representing the spot color name of the color represented by the user intermediate point Lab value R_Lab may be registered instead of the user intermediate point Lab value R_Lab. The character string representing the spot color name of the color represented by the user intermediate point Lab value R_Lab is an example of the "information about the user intermediate point Lab value R_Lab". The information about the user intermediate point Lab value R_Lab may be one or both of the user intermediate point Lab value R_Lab and the character string representing the spot color name of the color represented by the user intermediate point Lab value R_Lab. In the description below, it is assumed that the third modification example is a modification example based on the first embodiment.

For example, it is assumed that, in step S6, the first spot color name and the second spot color name are accepted instead of the first spot color Lab value SP_Lab1 and the second spot color Lab value SP_Lab2. On this assumption, the control device 13 in step S30 registers the character string representing the spot color name of the color represented by the user intermediate point Lab value R_Lab, instead of the user intermediate point Lab value R_Lab, into the color conversion table 126. The character string representing the spot color name of the color represented by a user intermediate point Lab value R_Labj is, for example, the following character string, where j is an integer from 1 to the number of user intermediate points.

"first spot color name:"&string((number of user
  intermediate points+1−j)×100/(number of user
  intermediate points+1))&"%,second spot color
  name:"&string(j×100/(number of user intermediate
  diate points+1))&"%"

Here, & is a character string concatenation operator. string( ) is a function to convert the numeric value of an argument into a character string. For example, it is now assumed that the first spot color name is "Pantone P 41-8C" and that the second spot color name is "Pantone P 97-8C". The control device 13 generates the character strings given below, as a character string representing the color represented by the user intermediate point Lab value R_Lab1, a character string representing the color represented by the user intermediate point Lab value R_Lab2, and a character string representing the color represented by the user intermediate point Lab value R_Lab3 shown in FIG. 8, and adds these character strings to the color conversion table 126 as corresponding to the registered cmyk value pcmyk_R.
Pantone P 41-8C:75%, Pantone P 97-8C:25% Pantone P 41-8C:50%,
Pantone P 97-8C:50% Pantone P 41-8C:25%, Pantone P 97-8C:75%

The degree of change in color may vary from position to position. When the degree of change in color varies from position to position, the color displayed at the center position in the color-gradient image is a color resulting from mixing the color displayed at one end and the color displayed at the other end, at a ratio of x % to (100−x) %. x is an integer greater than 0 and smaller than 100. For example, x can be 25%, 30%, 70% or the like.

Figure 35:
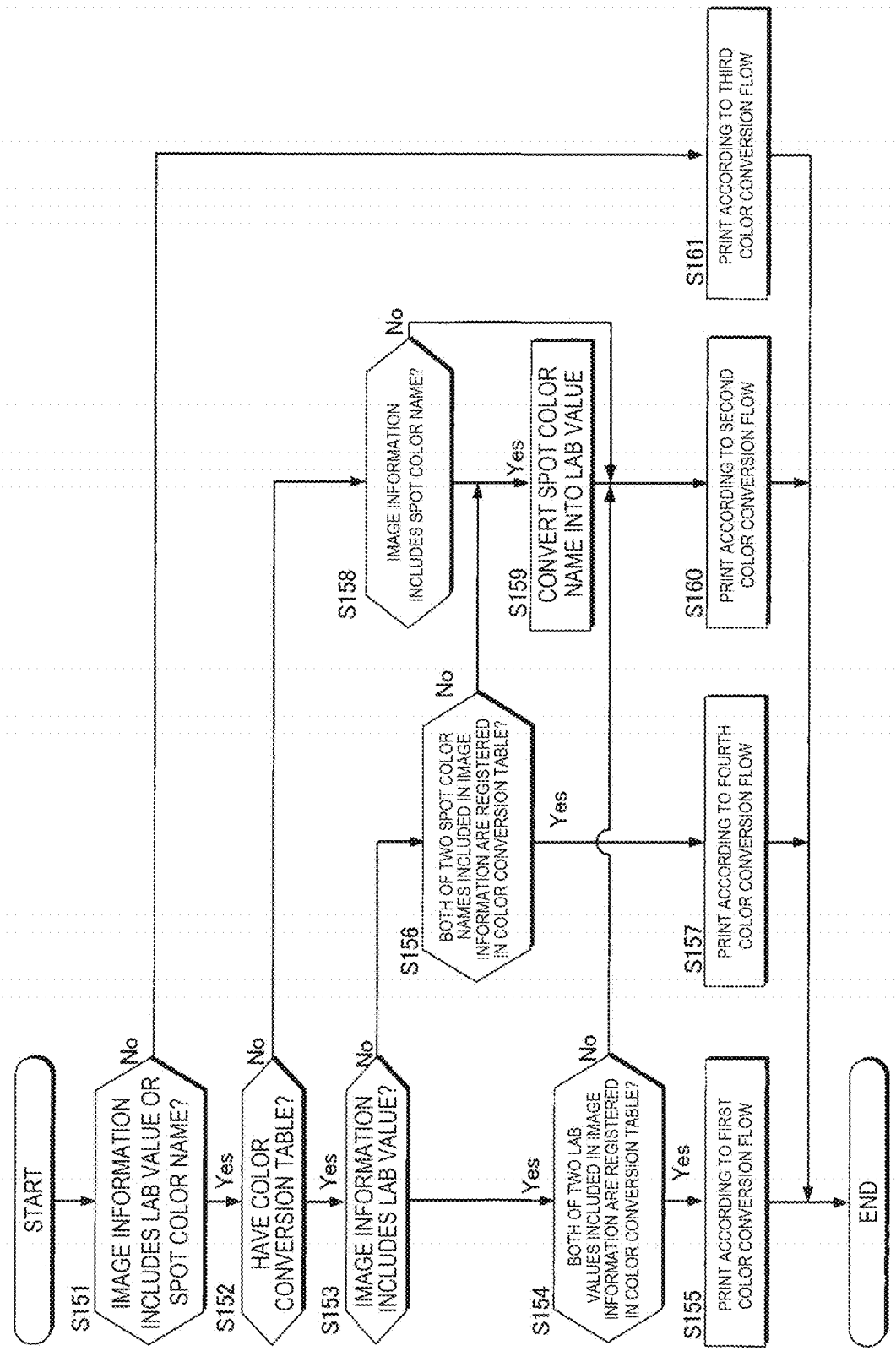
FIG. 35 is a flowchart showing an operation at the time of executing print processing in a third modification example.

FIG. 35 is a flowchart showing the operation at the time of executing print processing in the third modification example. On accepting a print command supplied to the first printer 40 in response to an operation by the user or the like, the control device 13 in step S151 determines whether image information included in the print command includes a Lab value or a spot color name, or not. When the result of the determination in step S151 is positive, the control device 13 in step S152 determines whether the storage device 12 has the color conversion table 126 or not. When the result of the determination in step S152 is positive, the control device 13 in step S153 determines whether the image information includes a Lab value or not. When the result of the determination in step S153 is positive, the control device 13 in step S154 determines whether both of the two Lab values included in the image information are registered in the color conversion table 126 or not. When the result of the determination in step S154 is positive, the control device 13 in step S155 prints the color-gradient image represented by the image information according to a first color conversion flow. The first color conversion flow in the third modification example is the same as the first color conversion flow in the first embodiment and therefore will not be described further.

Meanwhile, when the result of the determination in step S153 is negative, that is, when the image information includes a spot color name, the control device 13 in step S156 determines whether both of the two spot color names included in the image information are registered in the color conversion table 126 or not. When the result of the determination in step S156 is positive, the control device 13 in step S157 prints the color-gradient image represented by the image information according to a fourth color conversion flow.

Figure 36:
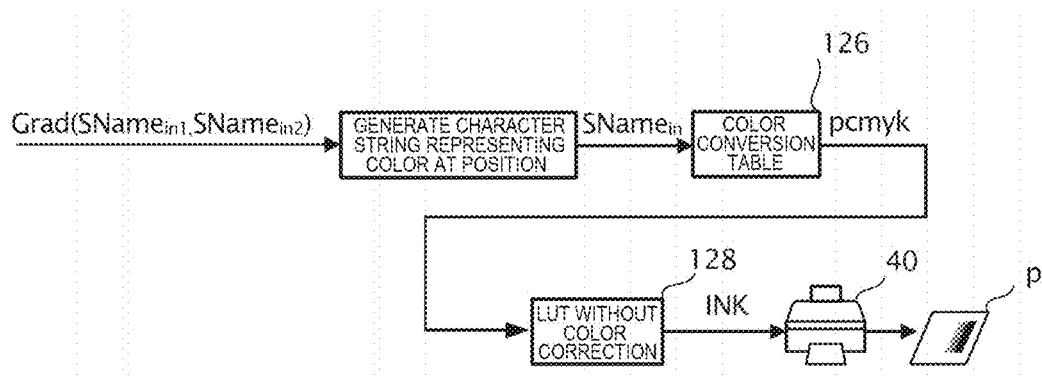
FIG. 36 shows a fourth color conversion flow.

FIG. 36 shows the fourth color conversion flow. In the fourth color conversion flow, the control device 13 generates a character string $SName_{in}$ representing the color at a position in the color-gradient image where the spot color is designated, based on the image information Grad($SName_{in1}$, $SName_{in2}$) and position information representing the position. $SName_{in1}$ is the spot color name representing the color displayed at the one end of the image. $SName_{in2}$ is the spot color name representing the color displayed at the other end. For example, the control device 13 generates the character string $SName_{in}$ in the following manner.

$$SName_{in}=SName_{in1}\&":"\&string(100-a)\&"\%,"\&SName_{in2}\&":"\&string(a)\&"\%"$$

Here, a is a value included in the position information. For example, it is assumed that the spot color name representing the color displayed at the one end is "Pantone P 41-8C", that the spot color name representing the color displayed at the other end is "Pantone P 97-8C", and that the position information represents a position away from the one end by 10% of the length from the one end to the other end. In this case, the control device 13 generates "Pantone P 41-8C:90%, Pantone P 97-8C:10%" as the character string $SName_{in}$.

The control device 13 converts the character string $SName_{in}$ into the registered cmyk value pcmyk, using the color conversion table 126. More specifically, the control device 13 specifies a character string representing a color close to the color represented by the character string $SName_{in}$, and acquires the cmyk value pcmyk by interpolation based on the specified character string and the registered cmyk value pcmyk corresponding to the specified character string. For example, it is assumed that the character string $SName_{in}$ is the foregoing "Pantone P 41-8C: 90%, Pantone P 97-8C:10%" and that the following contents are registered in the color conversion table 126.

Pantone P 41-8C pcmyk_SP1
Pantone P 97-8C pcmyk_SP2
Pantone P 41-8C:75%, Pantone P 97-8C:25% pcmyk_R1
Pantone P 41-8C:50%, Pantone P 97-8C:50% pcmyk_R2
Pantone P 41-8C:25%, Pantone P 97-8C:75% pcmyk_R3

The control device 13 specifies "Pantone P 41-8C" and "Pantone P 41-8C:75%, Pantone P 97-8C:25%" as colors close to the close represented by "Pantone P 41-8C:90%, Pantone P 97-8C:10%". The control device 13 then acquires the cmyk value pcmyk by interpolation based on "Pantone P 41-8C", "Pantone P 41-8C:75%, Pantone P 97-8C:25%", the registered cmyk value pcmyk_SP1 corresponding to "Pantone P 41-8C", and the registered cmyk value pcmyk_R1 corresponding to "Pantone P 41-8C:75%, Pantone P 97-8C:25%". The control device 13 then converts the resulting cmyk value pcmyk into the amount of ink used INK, using the LUT without color correction 128. The subsequent processing is the same as in the first color conversion flow in the first embodiment and therefore will not be described further.

Back to FIG. 35, when the result of the determination in step S152 is negative, the control device 13 in step S158 determines whether the image information includes a spot color name or not. When the result of the determination in step S158 is positive, the control device 13 in step S159 converts the spot color name into the Lab value, using the color library 124. When the result of the determination in step S156 is negative, that is, when one of the two spot color names is not registered or neither of them is registered in the color conversion table 126, the control device 13 similarly executes the processing in step S159.

After executing the processing in step S159, the control device 13 in step S160 prints the color-gradient image represented by the image information according to a second color conversion flow. Similarly, when the result of the determination in step S158 is negative, the control device 13 executes the processing in step S160. Similarly, when the result of the determination in step S154 is negative, that is, when one of the two Lab values is not registered or neither of them is registered in the color conversion table 126, the control device 13 executes the processing in step S160. The second color conversion flow in the third modification example is the same as the second color conversion flow in the first embodiment and therefore will not be described further.

When the result of the determination in step S151 is negative, that is, when the image information includes a CMYK value, the control device 13 in step S161 prints the color-gradient image represented by the image information according to a third color conversion flow. The third color conversion flow in the third modification example is the same as the third color conversion flow in the first embodiment and therefore will not be described further.

After finishing the processing in step S155, step S157, step S160, or step S161, the control device 13 ends the series of processing steps shown in FIG. 35.

C.4. Other Modification Examples

In the foregoing configurations, the first spot color is an example of the "first color" and the second spot color is an example of the "second color". However, this is not limiting. One or both of the first color and the second color may be a color represented by a certain Lab value that is not a spot color. For example, the acceptance unit 131 may accept, as the first information, a Lab value arbitrarily set by the user, instead of a cyan Lab value, a magenta Lab value, a yellow Lab value, a black Lab value, or a color prescribed by the PANTONE and DIC or similar color sample charts. The same applies to the second information.

In the foregoing configurations, the third generation unit 138 equally divides the first line segment by a number greater than the accepted number. However, the third generation unit 138 may unevenly divide the first line segment. For example, in step S2, the control device 13 may accept a drag operation to drag the user intermediate point position display icon 228 to the left or right. On accepting the drag operation, the control device 13 updates the color conversion table generation screen 220 in such a way that the user intermediate point position display icon 228 is located at the position corresponding to the drag operation. The control device 13 also updates the user intermediate point Lab value R_Lab corresponding to the user intermediate point position display icon 228 updated in position, according to the position of the user intermediate point position display icon 228 after the update.

Deciding the position of the user intermediate point in response to the operation by the user enables the color conversion table 126 to be generated as intended by the user. For example, it is assumed that the user's intention is to increase the color reproduction accuracy near one end of a color-gradient image while being all right with a certain degree of color reproduction accuracy near the other end. As the user performs an operation to bring the position of the user intermediate point position display icon 228 closer to the one end, the control device 13 can generate the color conversion table 126 as intended by the user.

In the foregoing configurations, the first printer 40 and the second printer 50 are described as inkjet printers. However, this is not limiting. For example, an electrophotographic printer such as a laser printer using a toner as a color material, a three-dimensional printer, or a display device or the like may be used. The display device is, for example, a display or a projector.

In the foregoing configurations, the cost function $f(\Delta cmyk)$ is described as being expressed by the equation (5). However, this is not limiting. The cost function $f(\Delta cmyk)$ may be, for example, the equation (5) minus the cost Co, or may be the equation (5) minus $w \times V^2$. The equation (5) includes $\Delta E_{00}^2$ but may include $\Delta E_{00}$ instead of $\Delta E_{00}^2$. Similarly, the equation (5) includes $w \times V^2$ but may include $w \times V$ instead of $w \times V^2$.

In the foregoing configurations, when executing the processing to generate the calibration DLP 127, the control device 13a may omit the execution of at least one of steps S122 and S123.

In the foregoing configurations, the host device 10 can be regarded as a color conversion information generation program configured to cause a computer to function as each part of the host device 10 or as a computer-readable recording medium storing this color conversion information generation program. The recording medium is, for example, a non-transitory recording medium and can include an optical recording medium such as CD-ROM and any known recording medium such as semiconductor recording medium or magnetic recording medium. In the foregoing configurations, the host device 10 may also be specified as the method for generating color conversion information according to each of the embodiments and modification examples.

What is claimed is:

1. A method for generating color conversion information comprising causing a computer to execute:
   an acceptance step of accepting first information prescribing a first color in a first color space and second information prescribing a second color in the first color space;
   a first generation step of generating one or a plurality of intermediate points located on a first line segment connecting a first coordinate value representing the first color in the first color space and a second coordinate value representing the second color in the first color space, based on a plurality of reference points arranged in a grid-like form in the first color space;
   a first conversion step of converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information;
   a setting step of setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value;
   a specification step of specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value;
   a second generation step of generating modified conversion information for converting a coordinate value in the first color space into a coordinate value in the second color space, based on the first conversion information;
   a third generation step of generating a fourth coordinate value located on the first line segment, based on an operation by a user; and
   a fourth generation step of generating color conversion information for converting the first information into a fifth coordinate value in the second color space, converting the second information into a sixth coordinate value in the second color space, and converting information about the fourth coordinate value into a seventh coordinate value in the second color space, based on the modified conversion information,
   the first generation step including
   generating one or a plurality of the intermediate points in such a way that a number of the intermediate points corresponding to the plurality of reference points is one or fewer,
   the second generation step including
   generating the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

2. The method for generating color conversion information according to claim 1, wherein
   the setting step includes:
   causing a color measurement device to measure a color of an output image outputted from the first output device according to the first converted coordinate value, and acquiring a result of the measuring as a measured color coordinate value in the first color space;
   converting the first converted coordinate value into a fourth converted coordinate value in the first color space, using second conversion information for converting a coordinate value in the second color space into a coordinate value in the first color space;
   deciding a target coordinate value in the first color space, based on a difference between the first coordinate value and the measured color coordinate value, and on the fourth converted coordinate value;
   searching for a fifth converted coordinate value that satisfies a condition that a color difference between a sixth converted coordinate value in the first color space converted from the fifth converted coordinate value in the second color space, using the second conversion information, and the target coordinate value, is smaller than a color difference between the fourth converted coordinate value and the target coordinate value; and
   setting a difference between the fifth converted coordinate value and the first converted coordinate value, as the first adjustment value.

3. The method for generating color conversion information according to claim 1, wherein
   the third generation step includes:
   accepting a number of the fourth coordinate values to be generated, in response to an operation by the user; and
   generating coordinate values in the number equally dividing the first line segment by a number greater than the number by 1, as the fourth coordinate values.

4. The method for generating color conversion information according to claim 1, wherein
   the specification step includes:
   interpolating the third adjustment value corresponding to the third coordinate value, based on the first adjustment value corresponding to the first coordinate value and the second adjustment value corresponding to the second coordinate value, and thus specifying the third adjustment value.

5. The method for generating color conversion information according to claim 1, further comprising causing the computer to execute:
   a second conversion step of, when image information included in an output command supplied to the first output device represents a color-gradient image successively changing in color according to a position from one end of the image to the other end, converting information about a coordinate value in the first color space corresponding to a position in the color-gradient image into a coordinate value in the second color space, using the color conversion information; and an output control step of causing the first output device to output a color corresponding to the position, according to the coordinate value in the second color space converted by the second conversion step.

6. The method for generating color conversion information according to claim 5, wherein the output control step includes:

when an output command including image information representing a color-gradient image successively changing in color according to a position from one end of the image to the other end is supplied to a second output device outputting an image corresponding to a coordinate value in the second color space, causing the second output device to output a color corresponding to a position in the color-gradient image, according to a coordinate value in the second color space resulting from converting information about a coordinate value in the first color space corresponding to the position in the color-gradient image by the second conversion step.

7. The method for generating color conversion information according to claim 6, further comprising:

a third conversion step of converting the coordinate value in the second color space converted by the second conversion step, into a correction value, using calibration color conversion information representing a correspondence between a coordinate value in the second color space and a correction value that causes a color of an image outputted from the second output device according to the coordinate value to be closer to a color of an image outputted from the first output device, wherein the output control step includes causing the second output device to output the color corresponding to the position according to the correction value converted by the third conversion step.

8. A non-transitory computer-readable storage medium storing a color conversion information generation program, the program causing a computer to function as:

an acceptance unit accepting first information prescribing a first color in a first color space and second information prescribing a second color in the first color space;

a first generation unit generating one or a plurality of intermediate points located on a first line segment connecting a first coordinate value representing the first color in the first color space and a second coordinate value representing the second color in the first color space, based on a plurality of reference points arranged in a grid-like form in the first color space;

a first conversion unit converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information;

a setting unit setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value;

a specification unit specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value;

a second generation unit generating modified conversion information for converting a coordinate value in the first color space into a coordinate value in the second color space, based on the first conversion information;

a third generation unit generating a fourth coordinate value located on the first line segment, based on an operation by a user; and a fourth generation unit generating color conversion information for converting the first information into a fifth coordinate value in the second color space, converting the second information into a sixth coordinate value in the second color space, and converting information about the fourth coordinate value into a seventh coordinate value in the second color space, based on the modified conversion information, the first generation unit generating one or a plurality of the intermediate points in such a way that a number of the intermediate points corresponding to the plurality of reference points is one or fewer, the second generation unit generating the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

9. A color conversion information generation device comprising:

an acceptance unit accepting first information prescribing a first color in a first color space and second information prescribing a second color in the first color space;

a first generation unit generating one or a plurality of intermediate points located on a first line segment connecting a first coordinate value representing the first color in the first color space and a second coordinate value representing the second color in the first color space, based on a plurality of reference points arranged in a grid-like form in the first color space;

a first conversion unit converting the first coordinate value into a first converted coordinate value in a second color space, using first conversion information for converting a coordinate value in the first color space into a coordinate value in the second color space, and converting the second coordinate value into a second converted coordinate value in the second color space, using the first conversion information;

a setting unit setting a first adjustment value in such a way that a first output device outputting an image corresponding to a coordinate value in the second color space outputs the first color according to a coordinate value resulting from adjusting the first converted coordinate value by the first adjustment value, and setting a second adjustment value in such a way that the first output device outputs the second color according to a coordinate value resulting from adjusting the second converted coordinate value by the second adjustment value;
a specification unit specifying a third adjustment value used when the first output device performs an output corresponding to a coordinate value resulting from adjusting a third converted coordinate value converted from a third coordinate value in the first color space representing the intermediate point by the first conversion information, based on the first adjustment value and the second adjustment value;
a second generation unit generating modified conversion information for converting a coordinate value in the first color space into a coordinate value in the second color space, based on the first conversion information;
a third generation unit generating a fourth coordinate value located on the first line segment, based on an operation by a user; and
a fourth generation unit generating color conversion information for converting the first information into a fifth coordinate value in the second color space, converting the second information into a sixth coordinate value in the second color space, and converting information about the fourth coordinate value into a seventh coordinate value in the second color space, based on the modified conversion information, the first generation unit generating one or a plurality of the intermediate points in such a way that a number of the intermediate points corresponding to the plurality of reference points is one or fewer, the second generation unit generating the modified conversion information in such a way that, when a coordinate value on the first line segment is converted into a coordinate value in the second color space by the modified conversion information, the coordinate value resulting from the conversion reflects one of the first adjustment value, the second adjustment value, and the third adjustment value.

* * * * *